(12) United States Patent
Wang et al.

(10) Patent No.: US 10,906,475 B2
(45) Date of Patent: Feb. 2, 2021

(54) PROMPT METHOD AND PORTABLE DEVICE

(71) Applicant: Huawei Technologies Co., Ltd., Shenzhen (CN)

(72) Inventors: Yu Wang, Beijing (CN); Huangwei Wu, Shenzhen (CN); Xiaohan Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/650,072

(22) PCT Filed: Sep. 28, 2017

(86) PCT No.: PCT/CN2017/104049
§ 371 (c)(1),
(2) Date: Mar. 24, 2020

(87) PCT Pub. No.: WO2019/061177
PCT Pub. Date: Apr. 4, 2019

(65) Prior Publication Data
US 2020/0269769 A1 Aug. 27, 2020

(51) Int. Cl.
*B60R 11/02* (2006.01)
*B60R 11/00* (2006.01)

(52) U.S. Cl.
CPC ...... *B60R 11/0241* (2013.01); *B60R 11/0252* (2013.01); *B60R 11/0258* (2013.01); *B60R 2011/0057* (2013.01)

(58) Field of Classification Search
CPC combination set(s) only.
See application file for complete search history.

(56) References Cited

U.S. PATENT DOCUMENTS

| | | | |
|---|---|---|---|
| 6,509,888 B1 | 1/2003 | Tuovinen et al. | |
| 2002/0100782 A1 | 8/2002 | Marvin | |
| 2012/0173313 A1* | 7/2012 | Cortegiano | G06Q 30/0267 705/14.1 |

(Continued)

FOREIGN PATENT DOCUMENTS

| | | |
|---|---|---|
| CN | 2424970 Y | 3/2001 |
| CN | 1360689 A | 7/2002 |

(Continued)

*Primary Examiner* — Phung-Hoang J Nguyen
(74) *Attorney, Agent, or Firm* — Conley Rose, P.C.

(57) ABSTRACT

This application provides a prompt method, applied to a portable device adsorbed on a magnetic holder. The method includes: a display of the portable device being off; and detecting, by the portable device, that a parameter related to a magnetic induction intensity deviates from a preset threshold range, lightening the display of the portable device when, before, or after outputting a voice prompt, and displaying, on the display, prompt information about moving the portable device. By using this method, a user can learn, in time, that the adsorption of the portable device on the magnetic holder is unstable, and move the portable device based on the prompt information, so that the portable device can be stably adsorbed on the magnetic holder, thereby effectively preventing the portable device from sliding down from the magnetic holder.

20 Claims, 59 Drawing Sheets

(56) References Cited

U.S. PATENT DOCUMENTS

2014/0300722 A1* 10/2014 Garcia .................. G06F 3/0482
348/77
2018/0052949 A1* 2/2018 Pettersson ............... G06F 30/13
2019/0294163 A1* 9/2019 Ueno ................ B60W 60/0057

FOREIGN PATENT DOCUMENTS

| CN | 101751074 A | 6/2010 |
| CN | 204272219 U | 4/2015 |
| CN | 206149348 U | 5/2017 |
| EP | 2311688 A1 | 4/2011 |
| KR | 101700339 B1 | 1/2017 |

* cited by examiner

CONT. FROM FIG. 4a-2

CONT. FROM FIG. 4b-3

CONT. FROM FIG. 4c-3

$(M_{X1}, M_{Y1}, M_{Z1})$

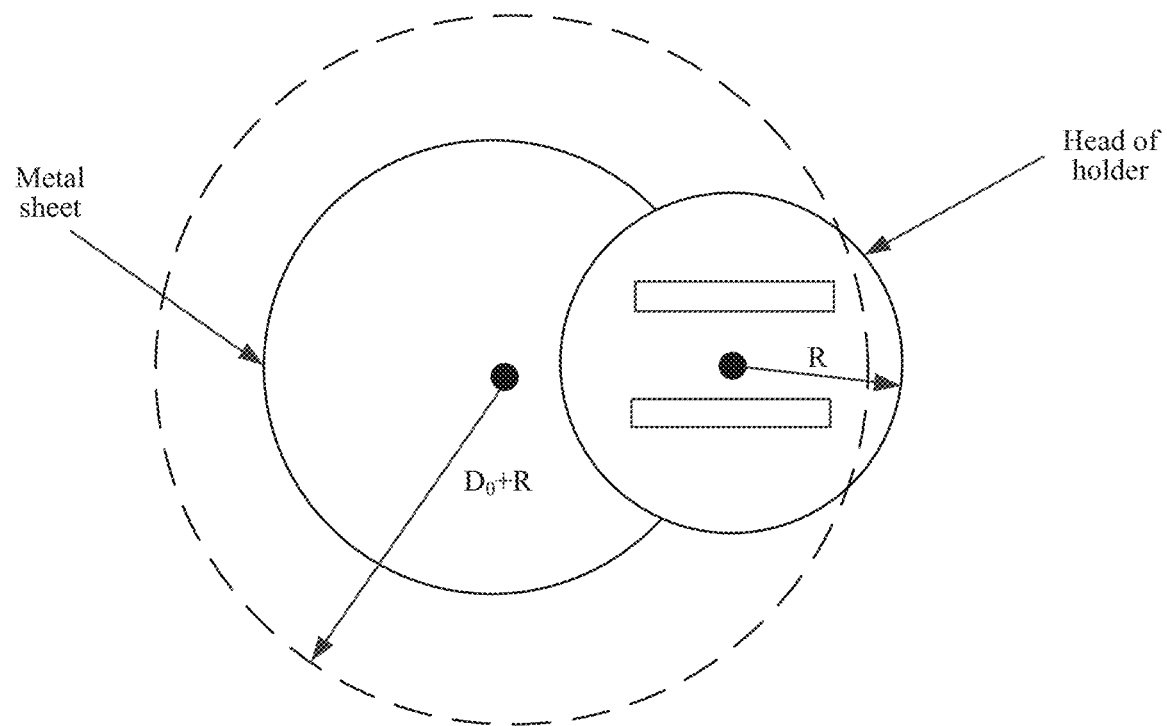

FIG. 11d

| A portable device obtains component values of a magnetic induction intensity in a plurality of directions by using a magnetic field sensor of the portable device | ⟵ S1210 |

| Determine whether component values in each direction among the component values in the plurality of directions deviate from a preset threshold range corresponding to a component value in a corresponding direction | ⟵ S1220 |

FIG. 12

PROMPT METHOD AND PORTABLE DEVICE

CROSS-REFERENCE TO RELATED APPLICATIONS

This application is a U.S. National Stage of International Patent Application No. PCT/CN2017/104049 filed Sep. 28, 2017, which is hereby incorporated by reference in its entirety.

TECHNICAL FIELD

This application relates to the electromagnetic field, and in particular, to a prompt method and a portable device.

BACKGROUND

Currently, an increasing quantity of drivers place portable devices in a proper location in vehicles through in-vehicle holders, so that the portable devices (for example, a mobile phone, a navigator, and a tablet) can be conveniently and safely used to perform operations such as call answering or viewing navigation information. The drivers may directly operate portable devices fixed on the in-vehicle holders, and may also conveniently take the portable devices down for using. The in-vehicle holders may be classified into a clip holder, a slot holder, a magnetic holder, and the like based on a manner for fixing the portable devices.

The magnetic holders have advantages such as easy to place and take down the portable devices, easy to adjust an attitude of the portable devices, and difficult to cause a surface scratch of the portable devices. Therefore, the magnetic holders have a broad application foreground. A working principle of the magnetic holder is that a magnet in the holder is magnetically adsorbed with a metal sheet attached on a portable device, so that the portable device is fixed. When magnetic stability between the magnetic holder and the portable device reduces due to some reasons, for example, when driving on a rugged section, magnetic adherence between the magnetic holder and the portable device reduces because vehicles bump, or when taking the mobile phone down from the magnetic holder and then places the mobile phone on the holder again, the driver does not notice a placement location of the portable device on the holder, the portable device may easily move and even slide down from the holder.

SUMMARY

This application provides a method for determining magnetic adsorption stability and a portable device, to resolve a problem that stability cannot be improved when a portable device is placed on a magnetic holder in the prior art.

According to a first aspect, this application provides a prompt method, applied to a portable device adsorbed on a magnetic holder. The method includes: a display of the portable device being off; and detecting, by the portable device, that a parameter related to a magnetic induction intensity deviates from a preset threshold range, lightening the display of the portable device when, before, or after outputting a voice prompt, and displaying, on the display, prompt information about moving the portable device.

By using the prompt method provided in this application, the display of the portable device is off, and the portable device determines, by detecting that the parameter related to the magnetic induction intensity deviates from the preset threshold range, that absorption of the portable device on the magnetic holder is unstable, and then outputs the voice prompt. The portable device lightens the display of the portable device when, before, or after outputting the voice prompt, and displays the prompt information about moving the portable device, on the display, so that a user can move the portable device in time. Therefore, the portable device can be stably adsorbed on the magnetic holder, thereby effectively preventing the portable device from sliding down from the magnetic holder.

In a possible implementation, the parameter related to the magnetic induction intensity includes an adsorption site, and the preset threshold range includes a boundary range of a security zone; and the detecting, by the portable device, that a parameter related to a magnetic induction intensity deviates from a preset threshold range includes:

obtaining, by the portable device, the magnetic induction intensity by using a magnetic field sensor of the portable device, and determining the adsorption site based on the magnetic induction intensity; and determining that the adsorption site deviates from the boundary range of the security zone.

In a possible implementation, the parameter related to the magnetic induction intensity includes component values of the magnetic induction intensity in a plurality of directions, and component values in each direction among the component values in the plurality of directions correspond to one preset threshold range; and the detecting, by the portable device, that a parameter related to a magnetic induction intensity deviates from a preset threshold range includes:

obtaining, by the portable device, the component values of the magnetic induction intensity in the plurality of directions by using a magnetic field sensor of the portable device; and determining that a component value in at least one direction among the component values in the plurality of directions deviates from a preset threshold range corresponding to the component value in the at least one direction.

In a possible implementation, the parameter related to the magnetic induction intensity includes variations of component values of the magnetic induction intensity in a plurality of directions, and variations of component values in each direction among the variations of the component values in the plurality of directions correspond to one preset threshold range; and the detecting, by the portable device, that a parameter related to a magnetic induction intensity deviates from a preset threshold range includes:

obtaining, by the portable device, variations of component values of the magnetic induction intensity in a plurality of directions by using a magnetic field sensor of the portable device; and determining that a variation of a component value in at least one direction among the variations of the component values in the plurality of directions deviates from the preset threshold range corresponding to the variation of the component value in the at least one direction.

In a possible implementation, the displaying prompt information about moving the portable device, on the display includes:

displaying the security zone and a current adsorption site of the portable device on the display;

displaying a text indicating a moving direction or a graph representation indicating a moving direction, on the display; or displaying, on the display, a text indicating a moving direction or a graph representation indicating a moving direction, the security zone, and a current adsorption site of the portable device.

In a possible implementation, the method further includes:

turning off, by the portable device, the display when detecting that the parameter related to the magnetic induction intensity is in the preset threshold range and after outputting prompt information; or turning off, by the portable device, the display when detecting that the parameter related to the magnetic induction intensity is in the preset threshold range.

In a possible implementation, when outputting the prompt information, the portable device is in a locked state; or when outputting the prompt information, the portable device is in an unlocked state.

According to a second aspect, this application provides another prompt method, applied to a portable device adsorbed on a magnetic holder. The method includes:

displaying, by the portable device, an interaction interface on the display, where the interaction interface includes an unlock interface, a standby screen, a lock screen, a non-home screen, a home screen, or an application interface; and detecting, by the portable device, that a parameter related to a magnetic induction intensity deviates from a preset threshold range, stopping displaying the interaction interface of the portable device when, before, or after outputting a voice prompt, and displaying, on the display, prompt information about moving the portable device.

By using the prompt method provided in this application, the display of the portable device is in the interaction interface, and the portable device determines, by detecting that the parameter related to the magnetic induction intensity deviates from the preset threshold range, that absorption of the portable device on the magnetic holder is unstable, and then outputs the voice prompt. The portable device stops displaying the interaction interface when, before, or after outputting the voice prompt, and displays the prompt information about moving the portable device, on the display, so that a user can move the portable device in time. Therefore, the portable device can be stably adsorbed on the magnetic holder, thereby effectively preventing the portable device from sliding down from the magnetic holder.

In a possible implementation, the parameter related to the magnetic induction intensity includes an adsorption site, and the preset threshold range includes a boundary range of a security zone; and the detecting, by the portable device, that a parameter related to a magnetic induction intensity deviates from a preset threshold range includes:

obtaining, by the portable device, the magnetic induction intensity by using a magnetic field sensor of the portable device, and determining the adsorption site based on the magnetic induction intensity; and determining that the adsorption site deviates from the boundary range of the security zone.

In a possible implementation, the parameter related to the magnetic induction intensity includes component values of the magnetic induction intensity in a plurality of directions, and component values in each direction among the component values in the plurality of directions correspond to one preset threshold range; and the detecting, by the portable device, that a parameter related to a magnetic induction intensity deviates from a preset threshold range includes:

obtaining, by the portable device, the component values of the magnetic induction intensity in the plurality of directions by using a magnetic field sensor of the portable device; and determining that a component value in at least one direction among the component values in the plurality of directions deviates from a preset threshold range corresponding to the component value in the at least one direction.

In a possible implementation, the parameter related to the magnetic induction intensity includes variations of component values of the magnetic induction intensity in a plurality of directions, and variations of component values in each direction among the variations of the component values in the plurality of directions correspond to one preset threshold range; and the detecting, by the portable device, that a parameter related to a magnetic induction intensity deviates from a preset threshold range includes:

obtaining, by the portable device, variations of component values of the magnetic induction intensity in a plurality of directions by using a magnetic field sensor of the portable device; and determining that a variation of a component value in at least one direction among the variations of the component values in the plurality of directions deviates from the preset threshold range corresponding to the variation of the component value in the at least one direction.

In a possible implementation, the displaying prompt information about moving the portable device, on the display includes:

displaying the security zone and a current adsorption site of the portable device on the display;

displaying a text indicating a moving direction or a graph representation indicating a moving direction, on the display; or displaying, on the display, a text indicating a moving direction or a graph representation indicating a moving direction, the security zone, and a current adsorption site of the portable device.

In a possible implementation, the method further includes:

displaying, by the portable device, the interaction interface of the portable device when detecting that the parameter related to the magnetic induction intensity is in the preset threshold range and after outputting prompt information; or displaying, by the portable device, the interaction interface of the portable device when detecting that the parameter related to the magnetic induction intensity is in the preset threshold range.

In a possible implementation, when outputting the prompt information, the portable device is in a locked state; or when outputting the prompt information, the portable device is in an unlocked state.

According to a third aspect, this application provides a portable device. The portable device can implement a function performed by the portable device in the prompt method according to the first aspect, and the function may be implemented by hardware or may be implemented by hardware executing corresponding software. The hardware or software includes one or more modules or units corresponding to the foregoing function.

In a possible design, the portable device includes a magnetic field sensor, a display, a processor, and an audio output unit, where the magnetic field sensor includes a magnetic sensitive element and a signal processing circuit, where the magnetic sensitive element is configured to sense a magnetic induction intensity that is near the portable device and that is generated by a magnetic holder, and the signal processing circuit is configured to convert the sensed magnetic induction intensity into a digital signal; and the processor is configured to: control the display to be off, determine, based on the digital signal, a parameter related to the magnetic induction intensity, when detecting that the parameter related to the magnetic induction intensity deviates from a preset threshold range, lighten the display of the portable device when, before, or after outputting a voice prompt by using the audio output unit, and display, on the display, prompt information about moving the portable device.

In a possible design, the parameter related to the magnetic induction intensity includes an adsorption site, and the preset threshold range includes a boundary range of a security zone; and that the processor is configured to detect that the parameter related to the magnetic induction intensity deviates from the preset threshold range includes:

obtaining, by using the magnetic field sensor, the magnetic induction intensity generated by the magnetic holder, and determining the adsorption site based on the magnetic induction intensity; and determining that the adsorption site deviates from the boundary range of the security zone.

In a possible design, the parameter related to the magnetic induction intensity includes component values of the magnetic induction intensity in a plurality of directions, and component values in each direction among the component values in the plurality of directions corresponds to one preset threshold range; and that the processor is configured to detect that the parameter related to the magnetic induction intensity deviates from the preset threshold range includes:

obtaining, by using the magnetic field sensor, the component values of the magnetic induction intensity in the plurality of directions; and determining that a component value in at least one direction among the component values in the plurality of directions deviates from a preset threshold range corresponding to the component value in the at least one direction.

In a possible design, the parameter related to the magnetic induction intensity includes variations of component values of the magnetic induction intensity in a plurality of directions, and variations of component values in each direction among the variations of the component values in the plurality of directions correspond to one preset threshold range; and that the processor is configured to detect that the parameter related to the magnetic induction intensity deviates from the preset threshold range includes:

obtaining, by using the magnetic field sensor, the variations of the component values of the magnetic induction intensity in the plurality of directions; and determining that a variation of a component value in at least one direction among the variations of the component values in the plurality of directions deviates from the preset threshold range corresponding to the variation of the component value in the at least one direction.

In a possible design, that the processor displays the prompt information about moving the portable device, on the display includes:

displaying, by the processor, the security zone and a current adsorption site of the portable device on the display;

displaying, the processor, a text indicating a moving direction or a graph representation indicating a moving direction, on the display; or displaying, by the processor on the display, a text indicating a moving direction or a graph representation indicating a moving direction, the security zone, and a current adsorption site of the portable device.

In a possible design, the processor is further configured to:

turn off the display when the processor detects that the parameter related to the magnetic induction intensity is in the preset threshold range and after the processor outputs prompt information by using at least one of the audio output unit and the display; or turn off the display when the processor detects that the parameter related to the magnetic induction intensity is in the preset threshold range.

In a possible design, when the processor outputs the prompt information by using at least one of the audio output unit and the display, the portable device is in a locked state; or when the processor outputs the prompt information by using at least one of the audio output unit and the display, the portable device is in an unlocked state.

According to a fourth aspect, this application provides another portable device. The portable device can implement a function performed by the portable device in the prompt method according to the second aspect, and the function may be implemented by hardware or may be implemented by hardware executing corresponding software. The hardware or software includes one or more modules corresponding to the foregoing function.

In a possible design, the portable device includes a magnetic field sensor, a display, a processor, and an audio output unit, where the mimetic field sensor includes a magnetic sensitive element and a signal processing circuit, where the magnetic sensitive element is configured to sense a magnetic induction intensity that is near the portable device and that is generated by a magnetic holder, and the signal processing circuit is configured to convert the sensed magnetic induction intensity into a digital signal; and the processor is configured to: display an interaction interface of the portable device on the display, where the interaction interface includes an unlock interface, a home screen, a standby screen, a lock screen, a non-home screen, or an application interface; determine, based on the digital signal, a parameter related to the magnetic induction intensity, when detecting that the parameter related to the magnetic induction intensity deviates from a preset threshold range, skip displaying the interaction interface of the portable device on the display when, before, or after outputting a voice prompt by using the audio output unit, and display, on the display, prompt information about moving the portable device.

In a possible design, the parameter related to the magnetic induction intensity includes an adsorption site, and the preset threshold range includes a boundary range of a security zone; and that the processor is configured to detect that the parameter related to the magnetic induction intensity deviates from the preset threshold range includes:

obtaining, by using the magnetic field sensor, the magnetic induction intensity generated by the magnetic holder, and determining the adsorption site based on the magnetic induction intensity; and determining that the adsorption site deviates from the boundary range of the security zone.

In a possible design, the parameter related to the magnetic induction intensity includes component values of the magnetic induction intensity in a plurality of directions, and component values in each direction among the component values in the plurality of directions correspond to one preset threshold range; and that the processor is configured to detect that the parameter related to the magnetic induction intensity deviates from the preset threshold range includes:

obtaining, by using the magnetic field sensor, the component values of the magnetic induction intensity in the plurality of directions; and determining that a component value in at least one direction among the component values in the plurality of directions deviates from a preset threshold range corresponding to the component value in the at least one direction.

In a possible design, the parameter related to the magnetic induction intensity includes variations of component values of the magnetic induction intensity in a plurality of directions, and variations of component values in each direction among the variations of the component values in the plurality of directions correspond to one preset threshold range; and that the processor is configured to detect that the parameter related to the magnetic induction intensity deviates from the preset threshold range includes:

obtaining, by using the magnetic field sensor, the variations of the component values of the magnetic induction intensity in the plurality of directions; and determining that a variation of a component value in at least one direction among the component values in the plurality of directions deviates from the preset threshold range corresponding to the variation of the component value in the at least one direction.

In a possible design, that the processor displays the prompt information about moving the portable device, on the display includes:

displaying, by the processor, the security zone and a current adsorption site of the portable device on the display;

displaying, by the processor, a text indicating a moving direction or a graph representation indicating a moving direction, on the display; or displaying, by the processor on the display, a text indicating a moving direction or a graph representation indicating a moving direction, the security zone, and a current adsorption site of the portable device.

In a possible design, the processor is further configured to:

display the interaction interface of the portable device when the processor detects that the parameter related to the magnetic induction intensity is in the preset threshold range and after outputting the prompt information by using at least one of the audio output unit and the display; or display the interaction interface of the portable device when the processor detects that the parameter related to the magnetic induction intensity is in the preset threshold range.

In a possible design, when the processor outputs the prompt information by using at least one of the audio output unit and the display, the portable device is in a locked state; or when the processor outputs the prompt information by using at least one of the audio output unit and the display, the portable device is in an unlocked state.

According to a fifth aspect, this application provides a portable device. The device exists in a form of a chip product, a structure of the device includes a processor and a memory, the memory is configured to couple to the processor and store a program instruction and data of the device, and the processor is configured to implement the program instruction stored in the memory, so that the device performs the prompt method according to the first aspect or any possible implementation of the first aspect.

According to a sixth aspect, this application provides another portable device. The device exists in a form of a chip product, a structure of the device includes a processor and a memory, the memory is configured to couple to the processor and store a program instruction and data of the device, and the processor is configured to implement the program instruction stored in the memory, so that the device performs the prompt method according to the second aspect or any possible implementation of the second aspect.

According to a seventh aspect, this application provides a computer-readable storage medium. The storage medium includes an instruction. When the instruction is run on a portable device, the portable device is enabled to perform the prompt method according to the first aspect or any possible implementation of the first aspect.

According to an eighth aspect, this application provides another computer-readable storage medium. The storage medium includes an instruction. When the instruction is run on a portable device, the portable device is enabled to perform the prompt method according to the second aspect or any possible implementation of the second aspect.

According to a ninth aspect, this application provides a computer program product, including an instruction. When the computer program product is run on a portable device, the portable device is enabled to perform the prompt method according to the first aspect or any possible implementation of the first aspect.

According to a tenth aspect, this application provides another computer program product, including an instruction. When the computer program product is run on a portable device, the portable device is enabled to perform the prompt method according to the second aspect or any possible implementation of the second aspect.

According to an eleventh aspect, this application provides a graphical user interface on a portable device. The portable device includes a display, a memory, a plurality of application programs, and one or more processors configured to execute one or more programs stored in the memory, and the graphical user interface includes a user interface displayed in the prompt method according to the first aspect or any possible implementation of the first aspect.

According to a twelfth aspect, this application provides another graphical user interface on a portable device. The portable device includes a display, a memory, a plurality of application programs, and one or more processors configured to execute one or more programs stored in the memory, and the graphical user interface includes a user interface displayed in the prompt method according to the second aspect or any possible implementation of the second aspect.

According to the prompt method and the portable device that are provided in this application, the display of the portable device is off, and the portable device determines, by detecting that the parameter related to the magnetic induction intensity deviates from the preset threshold range, that absorption of the portable device on the magnetic holder is unstable, and then outputs the voice prompt. The portable device lightens the display of the portable device when, before, or after outputting the voice prompt, and displays, on the display, the prompt information about moving the portable device. Alternatively, the display of the portable device is in the interaction interface, and the portable device determines, by detecting that the parameter related to the magnetic induction intensity deviates from the preset threshold range, that absorption of the portable device on the magnetic holder is unstable, and then outputs the voice prompt. The portable device stops displaying the interaction interface when, before, or after outputting the voice prompt, and displays, on the display, the prompt information about moving the portable device. Therefore, a user can move the portable device in time, so that the portable device can be stably adsorbed on the magnetic holder, thereby effectively preventing the portable device from sliding down from the magnetic holder.

BRIEF DESCRIPTION OF DRAWINGS

FIG. 4a-1 to FIG. 4a-3 are schematic diagrams of an interface change of a display according to an embodiment of this application;

FIG. 4b-1 to FIG. 4b-4 are schematic diagrams of another interface change of a display according to an embodiment of this application;

FIG. 4c-1 to FIG. 4c-4 are schematic diagrams of still another interface change of a display according to an embodiment of this application;

FIG. 4d-1 to FIG. 4d-4 are schematic diagrams of yet another interface change of a display according to an embodiment of this application;

FIG. 6c-1 and FIG. 6c-2 are schematic diagrams of still another interface change of a display according to an embodiment of this application;

FIG. 6d-1 and FIG. 6d-2 are schematic diagrams of yet another interface change of a display according to an embodiment of this application;

FIG. 6e-1 and FIG. 6e-2 are schematic diagrams of yet still another interface change of a display according to an embodiment of this application;

FIG. 6f-1 and FIG. 6f-2 are schematic diagrams of still yet another interface change of a display according to an embodiment of this application;

FIG. 7a-1 to FIG. 7a-3 are schematic diagrams of an interface change of a display according to an embodiment of this application;

FIG. 7b-1 to FIG. 7b-4 are schematic diagrams of another interface change of a display according to an embodiment of this application;

FIG. 7c-1 to FIG. 7c-4 are schematic diagrams of still another interface change of a display according to an embodiment of this application;

FIG. 7d-1 to FIG. 7d-4 are schematic diagrams of yet another interface change of a display according to an embodiment of this application;

FIG. 11d is a schematic diagram showing that a portable device is adsorbed on a security zone on a magnetic holder according to an embodiment of this application;

FIG. 12 is a flowchart of another detection method according to an embodiment of this application;

DESCRIPTION OF EMBODIMENTS

The following describes the technical solutions in the embodiments of this application with reference to the accompanying drawings in the embodiments of this application.

It should be noted that the portable device in the embodiments of this application may be a mobile phone, a tablet, a wearable device, and the like. The portable device may include an acceleration sensor and a magnetic field sensor. The acceleration sensor may measure a moving acceleration of the portable device, the magnetic field sensor may detect a magnetic field intensity at a location in which the magnetic field sensor is located, and the acceleration sensor and the magnetic field sensor may store detected data in a memory of the portable device. The magnetic holder in the embodiments of this application may include one or more magnets, for example, a magnet or an electromagnet. The magnet may be circular, square, cylindrical, or the like. The magnetic holder may fix the portable device through magnetic adsorption. For example, a metal sheet attached on the portable device is adsorbed on the magnetic holder through a magnet included in the magnetic holder, thereby fixing the portable device. A manufacturing material of the metal sheet may be magnetic metals such as iron, cobalt, and nickel. A shape of the metal sheet may be a quadrate, a rectangularity, an ellipse, a sector, or the like. A manner in which the metal sheet is attached on the portable device may be that the metal sheet is embedded in a housing of the portable device, the metal sheet is adhered on an inner surface or an outer surface of the housing of the portable device, the metal sheet is embedded in a protective case of the portable device, the metal sheet is adhered on an inner surface or an outer surface of the protective case of the portable device, and the like.

Figure 1:
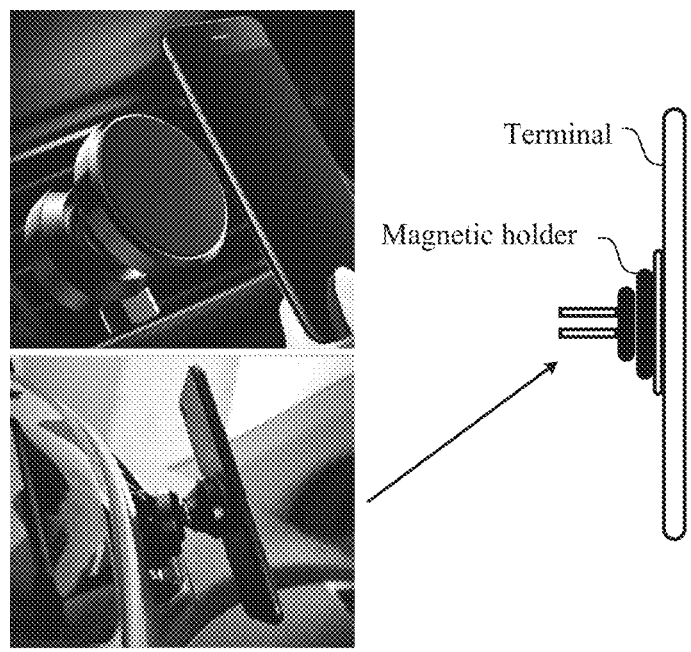
FIG. 1 is a schematic diagram of an application scenario of a prompt method according to an embodiment of this application.

The prompt method provided in the embodiments of this application may be applied to the following scenarios FIG. 1 is a schematic diagram of an application scenario of a prompt method according to an embodiment of this application. When driving a vehicle, a user fixes a portable device by using a magnetic holder, to facilitate viewing navigation information displayed on the portable device. A circular magnet is disposed at an end at which the magnetic holder is in contact with the portable device, and a circular metal sheet is adhered on a housing of the portable device. The circular metal sheet on the portable device is adsorbed on the magnetic holder through the circular magnet included in the magnetic holder, thereby fixing the portable device.

It should be noted that in the plurality of embodiments provided in this application, when performing the prompt method provided in this application, an initial state of a display of the portable device may be an off state, or may be displaying an interaction interface of the portable device. For example, the interaction interface may include an unlock interface, a home screen, a standby screen, a lock screen, a non-home screen, or an application interface. The following describes the prompt method provided in this application based on different initial states of the display by using the plurality of embodiments.

Figure 2:
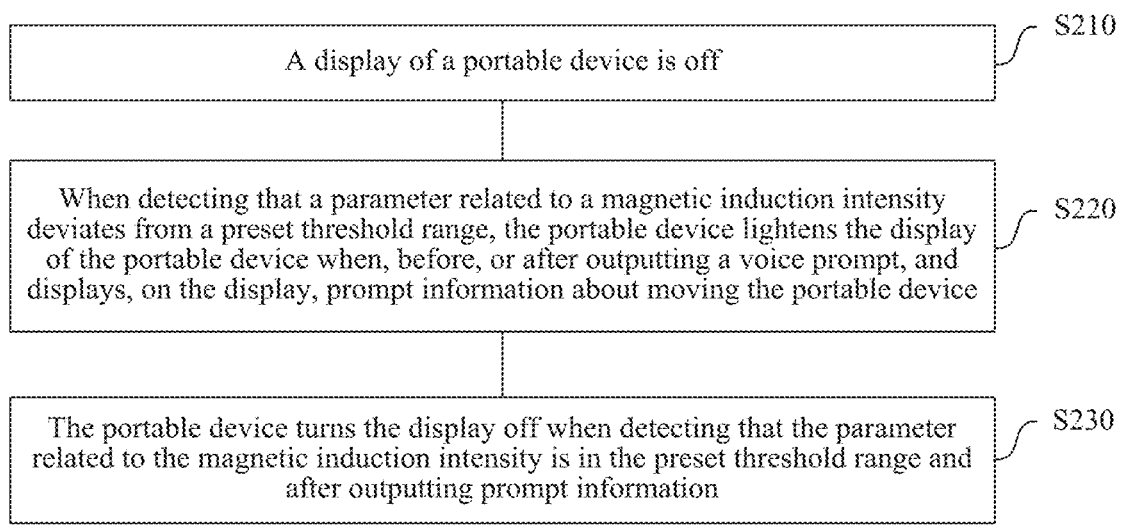
FIG. 2 is a flowchart of a prompt method according to an embodiment of this application.

FIG. 2 is a flowchart of a prompt method according to an embodiment of this application. As shown in FIG. 2, the method includes the following steps.

Step S210. A display of a portable device is off.

In a plurality of different scenarios, the display of the portable device adsorbed on the magnetic holder is off. For example, after locking the screen of the portable device, a user places the portable device on the magnetic holder.

Alternatively, if the user does not perform any operation on the portable device adsorbed on the magnetic holder in a period of time, the screen of the portable device is locked automatically, and the display of the portable device is off after the screen is locked.

Step S220. When detecting that a parameter related to a magnetic induction intensity deviates from a preset threshold range, the portable device lightens the display of the portable device when, before, or after outputting a voice prompt, and displays, on the display, prompt information about moving the portable device.

In this step, if the portable device detects that the parameter related to the magnetic induction intensity deviates from the preset threshold range, it may be determined that adsorption of the portable device on the magnetic holder is unstable, and further the user is prompted that a location of the portable device needs to be adjusted.

For example, an output voice prompt is used to prompt the user that the adsorption of the portable device on the magnetic holder is unstable, and the location of the portable device needs to be adjusted. For example, content of the voice prompt is that "the adsorption of the portable device on the magnetic holder is unstable, please move the portable device according to the prompt".

For example, the displaying the prompt information about moving the portable device, on the display may include: displaying a security zone and a current adsorption site of the portable device on the display; displaying a text indicating a moving direction or a graph representation indicating a moving direction, on the display; or displaying, on the display, a text indicating a moving direction or a graph representation indicating a moving direction, the security zone, and a current adsorption site of the portable device. The user may adjust the location of the portable device based on the prompt information that is about moving the portable device and that is displayed on the display, so that the portable device is stably adsorbed on the magnetic holder.

Figure 3A:
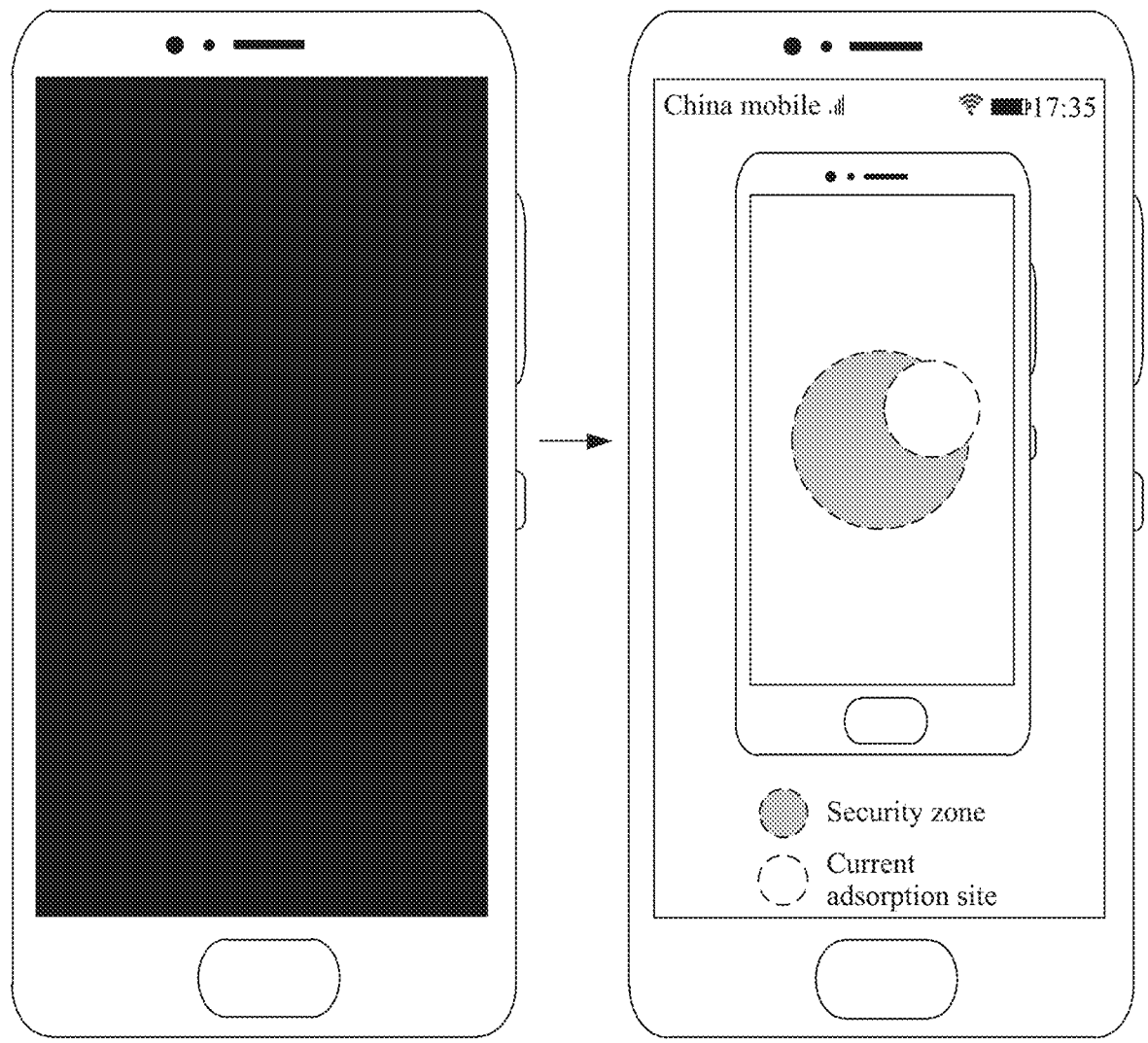
FIG. 3a is a schematic diagram of an interface change of a display according to an embodiment of this application.

For example, as shown in FIG. 3a, a display of a portable device is off the portable device detects that a parameter related to a magnetic induction intensity deviates from a preset threshold range, lightens the display of the portable device when, before, or after outputting a voice prompt, and displays a security zone and a current adsorption site of the portable device on the display. The security zone may be a circular area in which a metal sheet that is adsorbed at a back facet of a mobile phone is located, and the current adsorption site is a circular area in which one end at which the magnetic holder is in contact with a back facet of a terminal is located. In FIG. 3a, a part of the circular area indicating the current adsorption site is located outside the circular area indicating the security zone, a user may move the portable device based on this, until an adsorption site of the portable device on the magnetic holder is totally located inside the security zone.

Figure 3B:
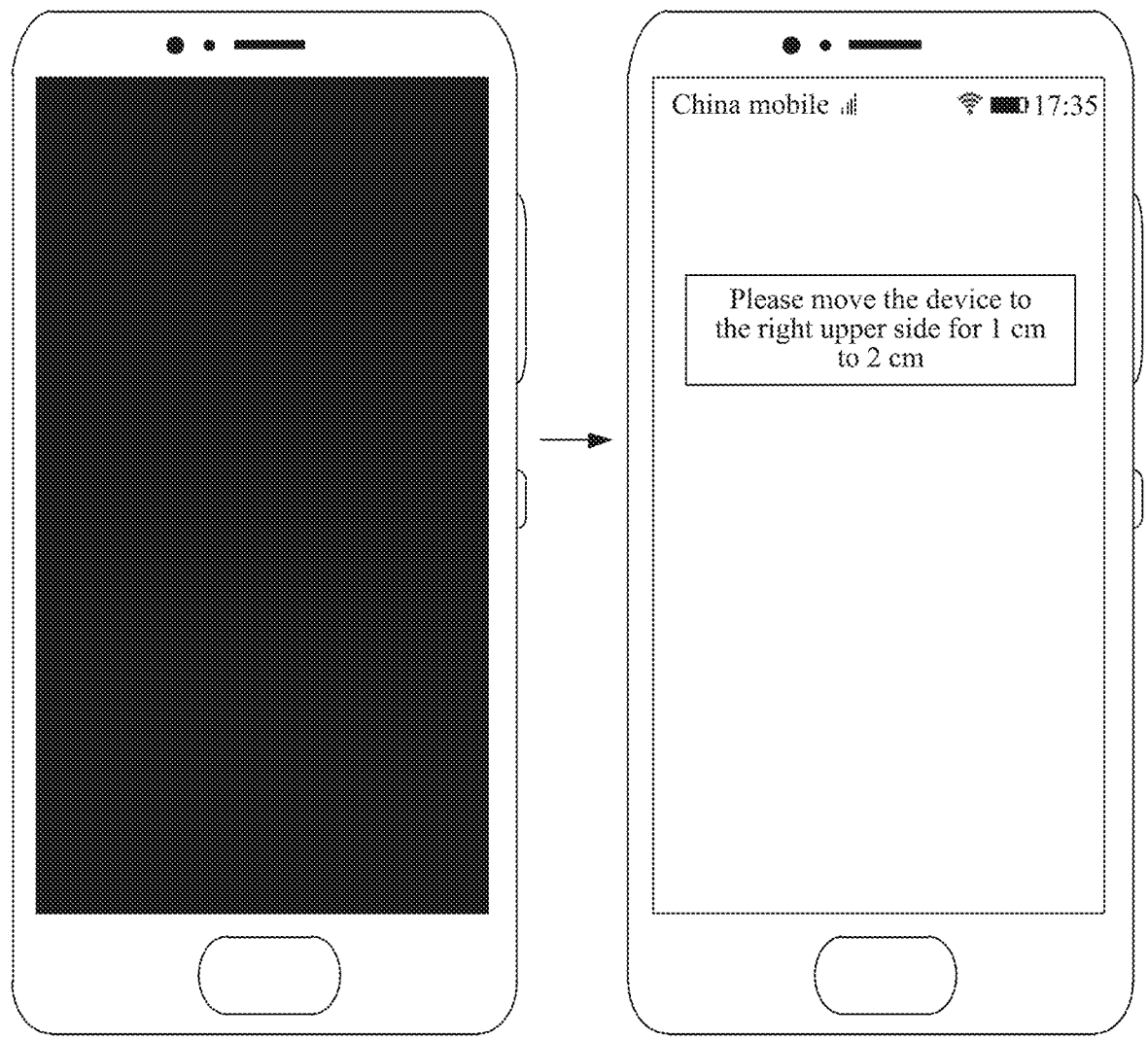
FIG. 3b is a schematic diagram of another interface change of a display according to an embodiment of this application.

For another example, as shown in FIG. 3b, a display of a portable device is off, the portable device detects that a parameter related to a magnetic induction intensity deviates from a preset threshold range, lightens the display of the portable device when, before, or after outputting a voice prompt, and displays, on the display, a text "please move the device to the right upper side for 1 cm to 2 cm" indicating a moving direction.

Figure 3C:
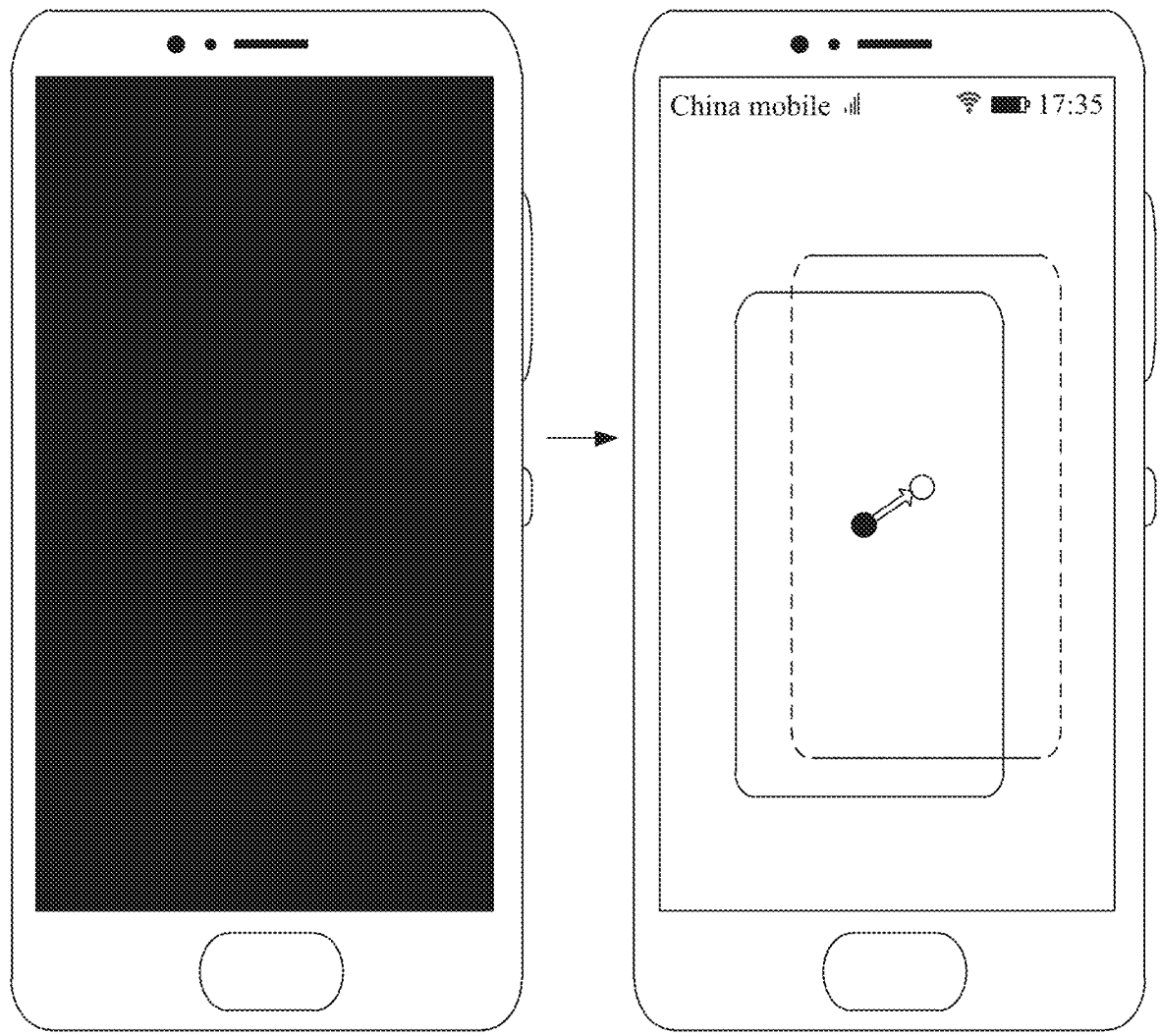
FIG. 3c is a schematic diagram of still another interface change of a display according to an embodiment of this application.

For another example, as shown in FIG. 3c, a display of a portable device is off, the portable device detects that a parameter related to a magnetic induction intensity deviates from a preset threshold range, lightens the display of the portable device when, before, or after outputting a voice prompt, and displays, on the display, a graph representation indicating the moving direction. The graph representation may include an arrow indicating the moving direction, a current location of the portable device, and a destination location that is shown by using a dashed line and to which the portable device moves.

Figure 3D:
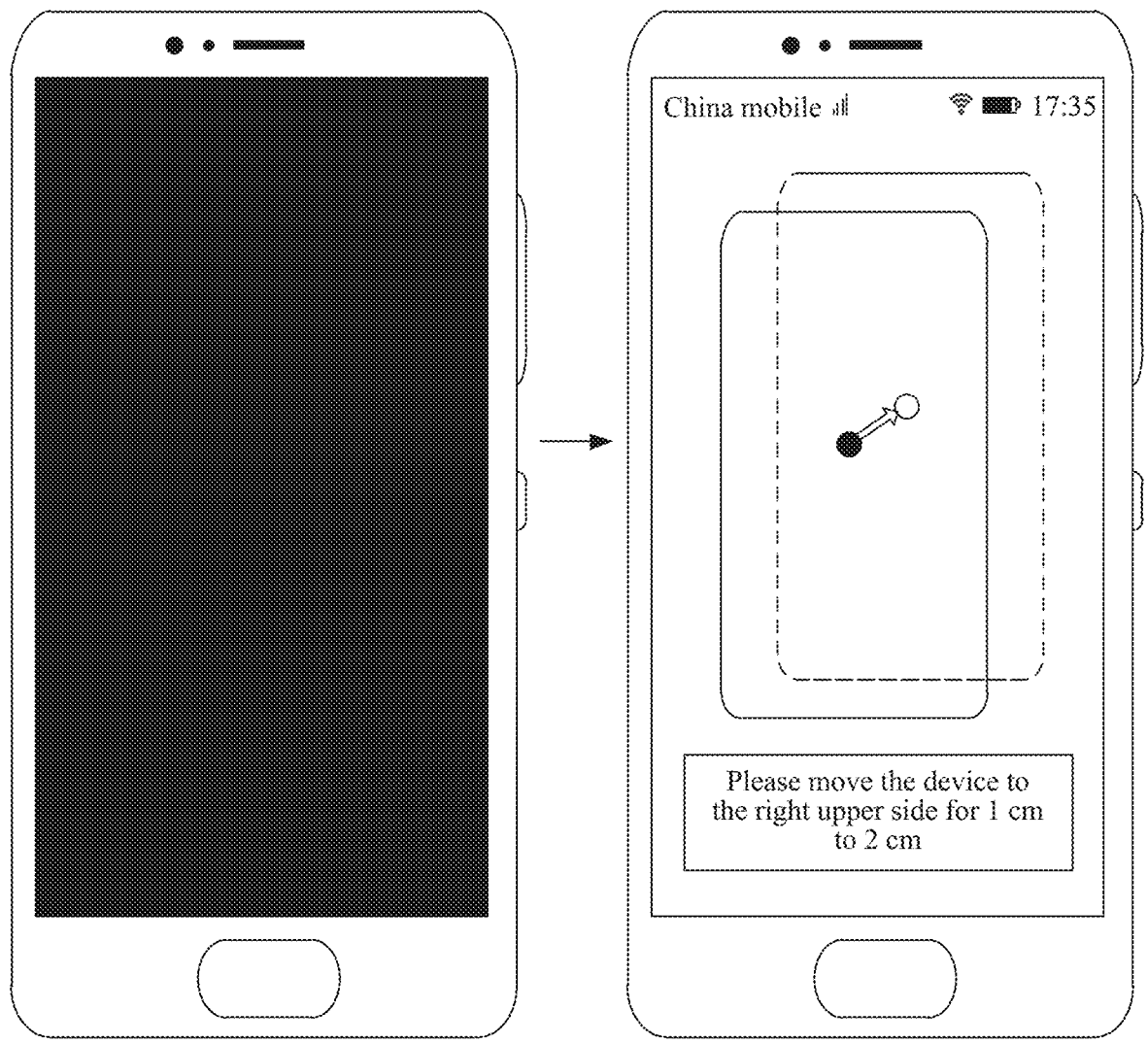
FIG. 3d is a schematic diagram of yet another interface change of a display according to an embodiment of this application.

For another example, as shown in FIG. 3d, a display of a portable device is off, the portable device detects that a parameter related to a magnetic induction intensity deviates from a preset threshold range, lightens the display of the portable device when, before, or after outputting a voice prompt, and displays, on the display, the text that indicates the moving direction and that is shown in FIG. 3b and the graph representation that indicates the moving direction and that is shown in FIG. 3c.

Figure 3E:
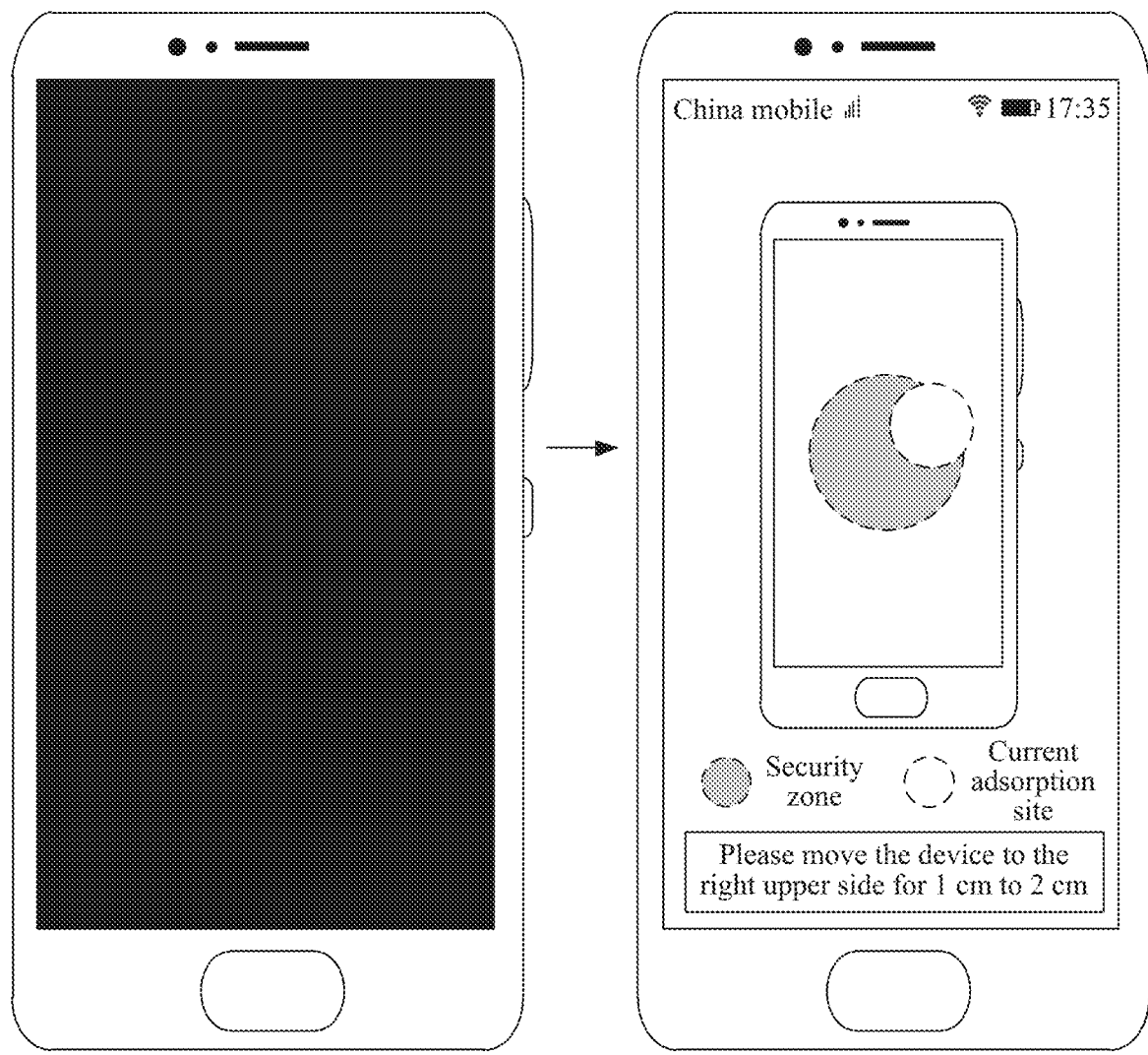
FIG. 3e is a schematic diagram of yet still another interface change of a display according to an embodiment of this application.

For another example, as shown in FIG. 3e, a display of a portable device is off, the portable device detects that a parameter related to a magnetic induction intensity deviates from a preset threshold range, lightens the display of the portable device when, before, or after outputting a voice prompt, and displays, on the display, the text that indicates the moving direction and that is shown in FIG. 3b, the security zone shown in FIG. 3b, and the current adsorption site of the portable device.

Figure 3F:
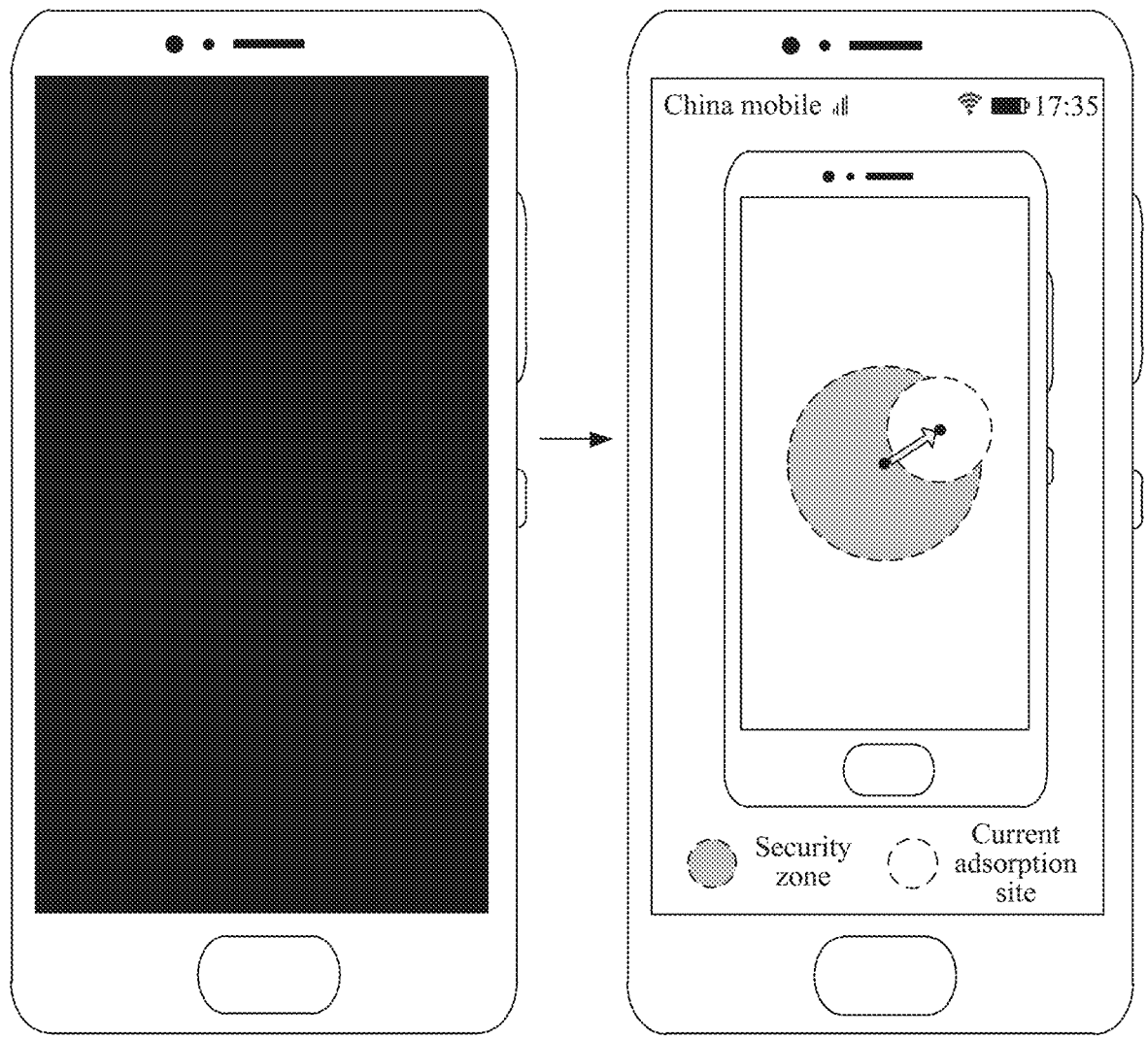
FIG. 3f is a schematic diagram of still yet another interface change of a display according to an embodiment of this application.

For another example, as shown in FIG. 3f, a display of a portable device is off, the portable device detects that a parameter related to a magnetic induction intensity deviates from a preset threshold range, lightens the display of the portable device when, before, or after outputting a voice prompt, and displays, on the display, a graph representation indicating a moving direction, for example, an arrow, the security zone shown in FIG. 3b, and a current adsorption site of the portable device.

Step S230. The portable device turns the display off when detecting that the parameter related to the magnetic induction intensity is in the preset threshold range and after outputting prompt information.

In this step, when detecting that the parameter related to the magnetic induction intensity is in the preset threshold range, the portable device may determine that the portable device is stably adsorbed on the magnetic holder, further, outputs the prompt information, to prompt the user that the portable device is already stably absorbed on the magnetic holder, and turns the display off.

For example, the outputting the prompt information may include: outputting voice prompt information, or displaying the prompt information on the display.

Figures 1, 4A:
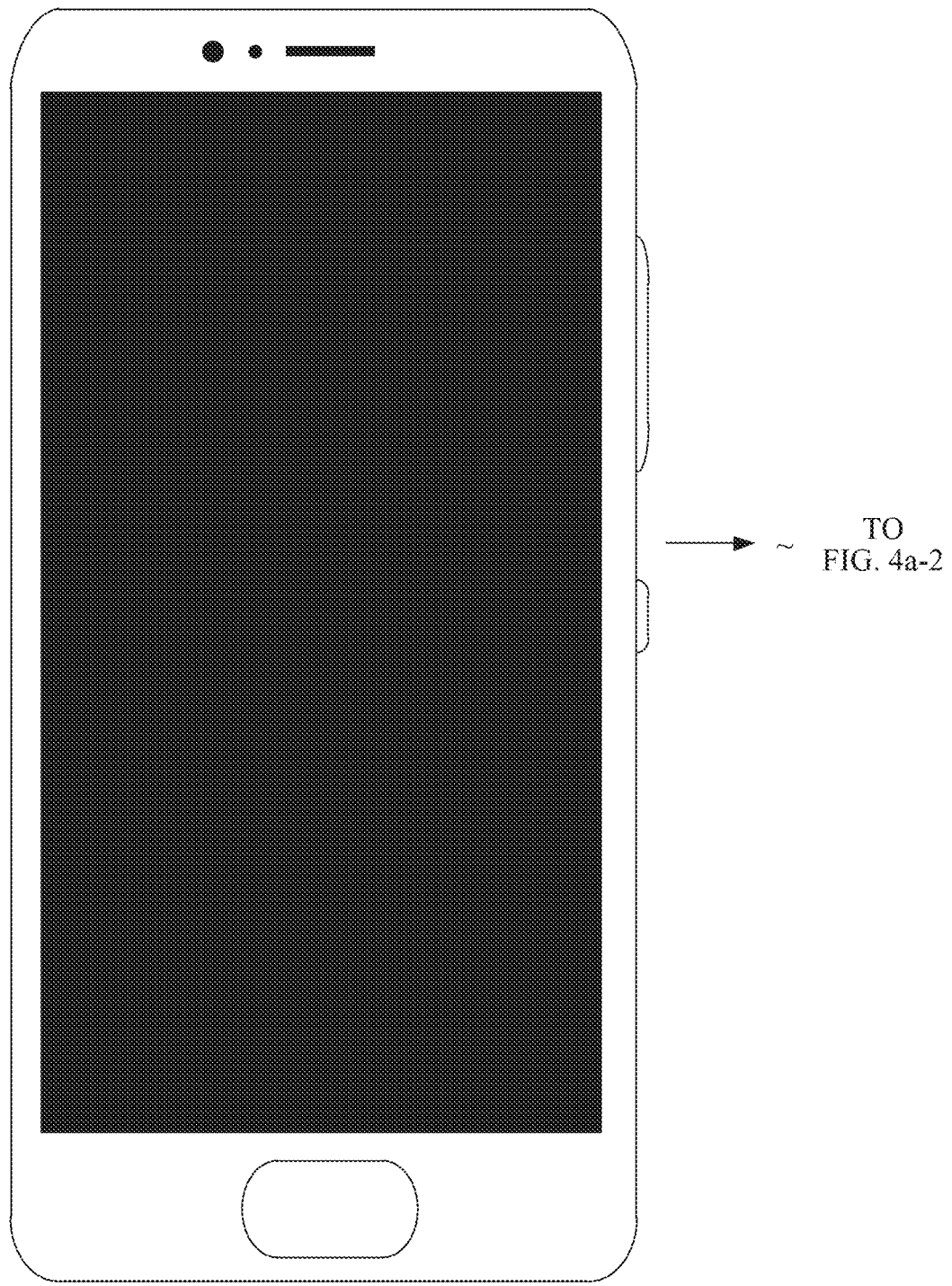
Figures 2, 4A:
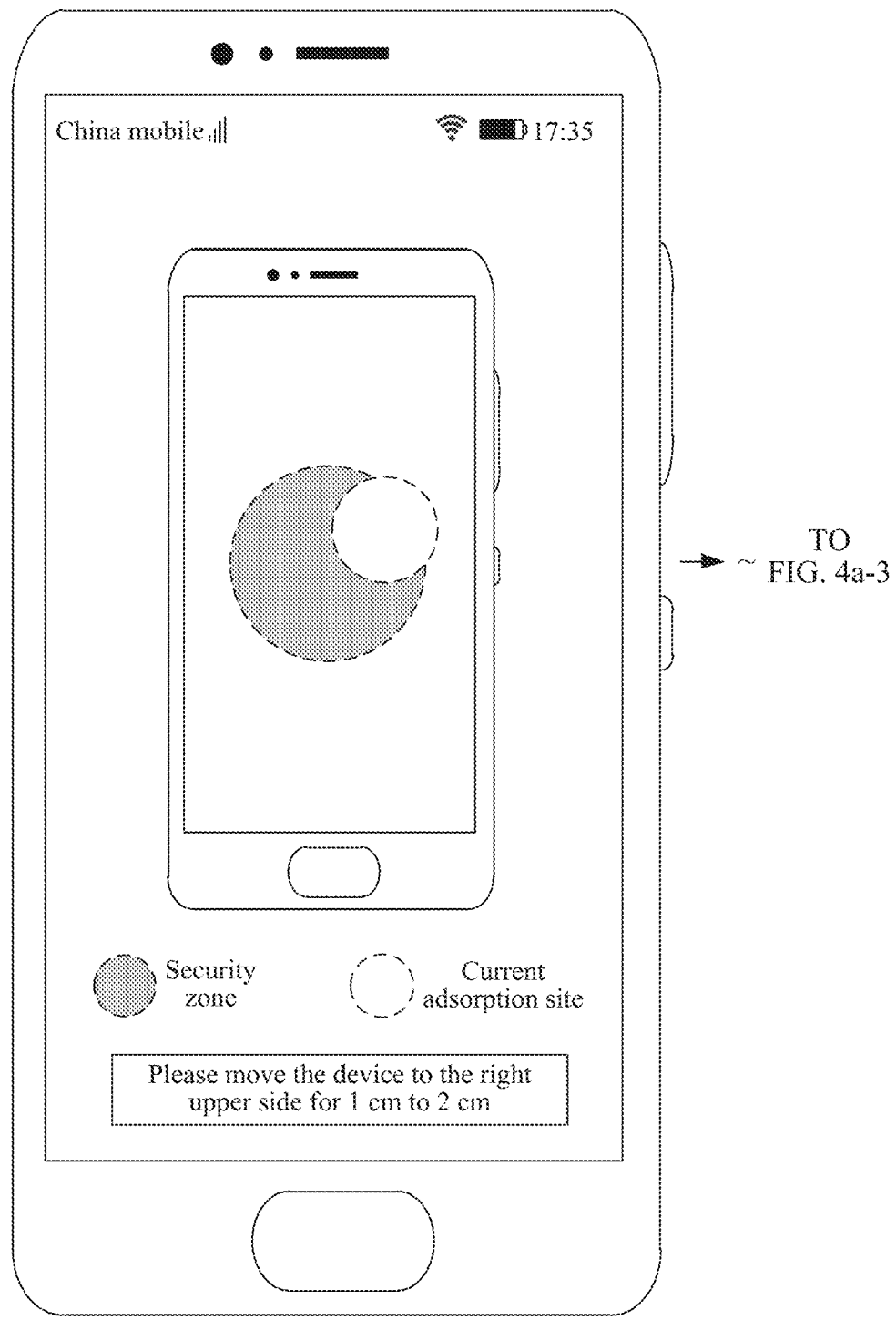
Figures 3, 4A:
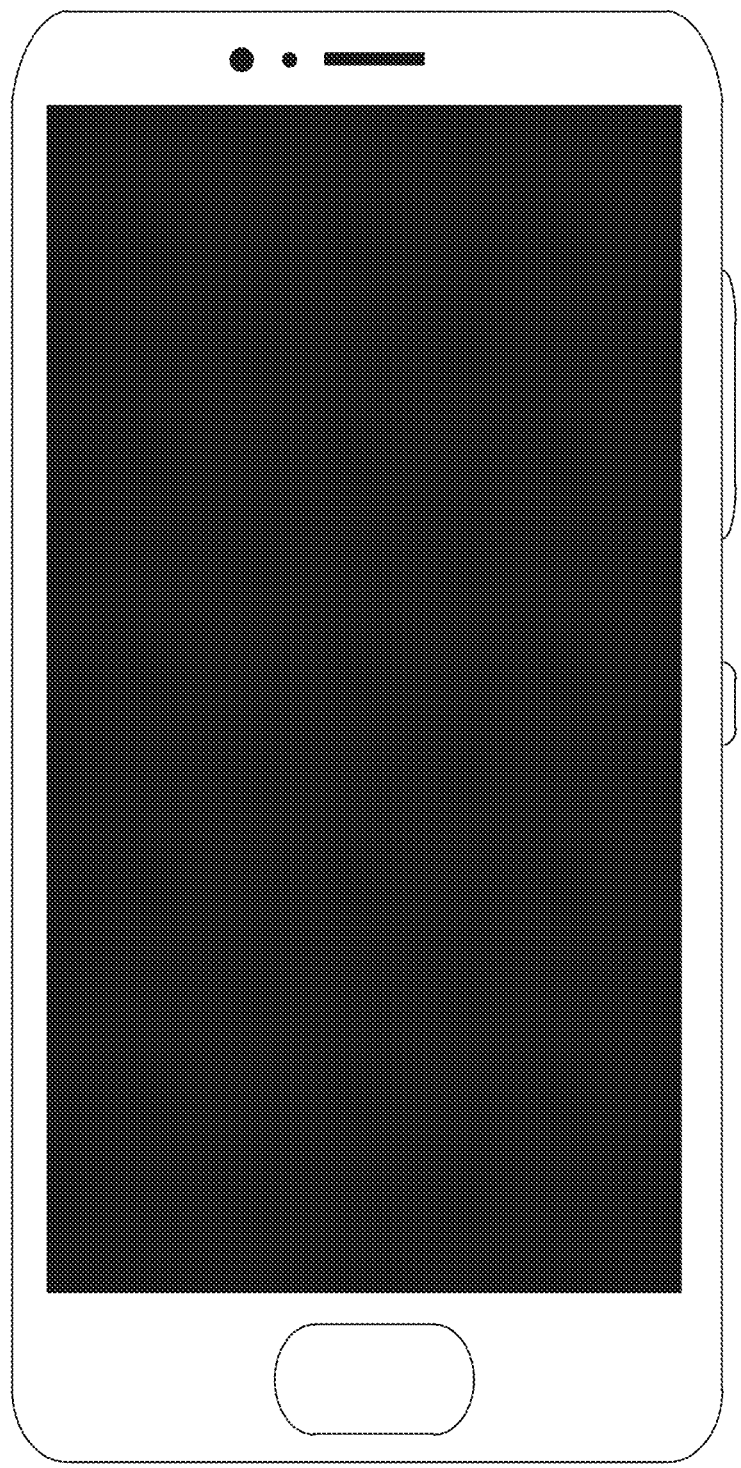
Figures 1, 4B:
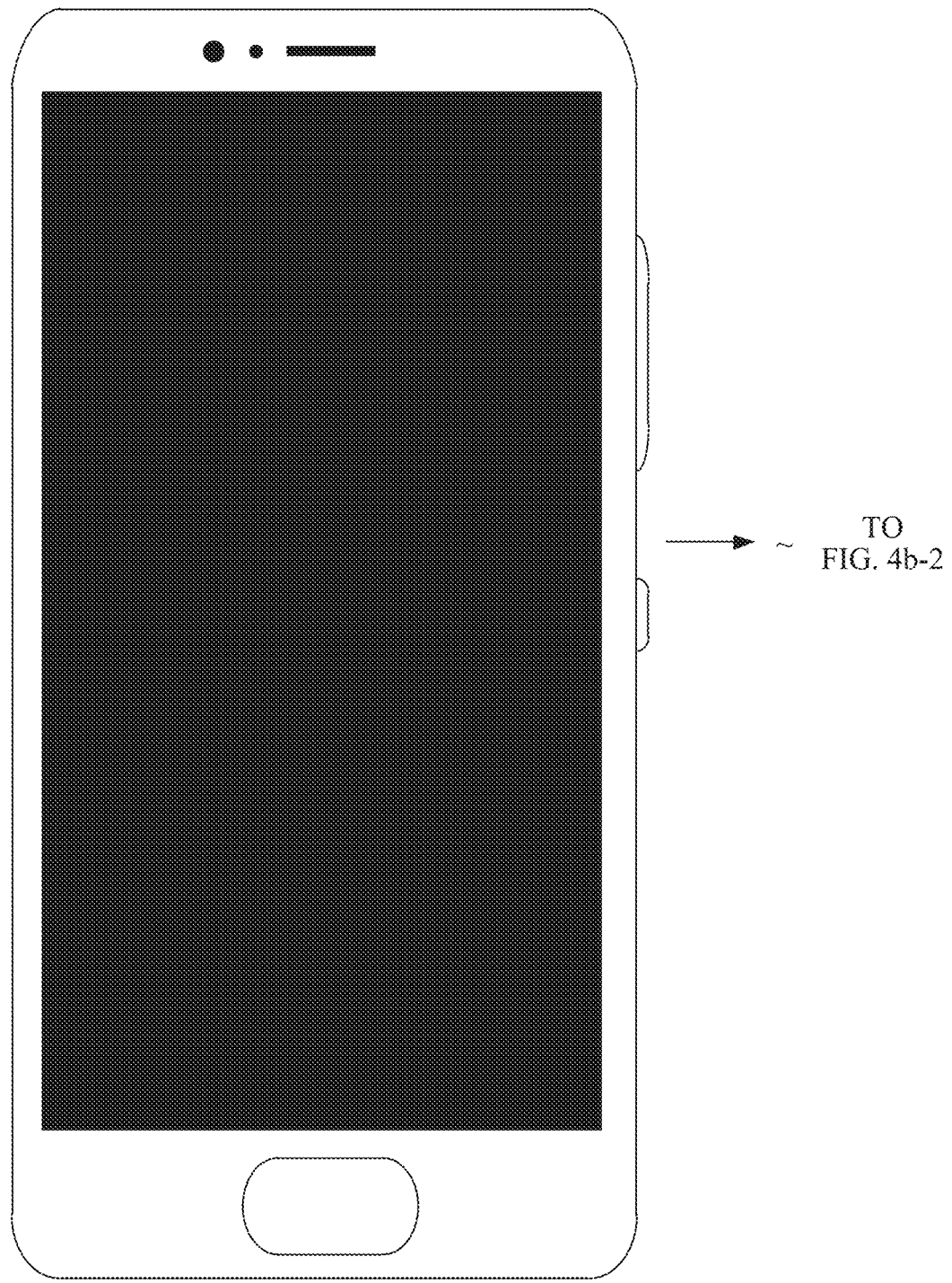
Figures 2, 4B:
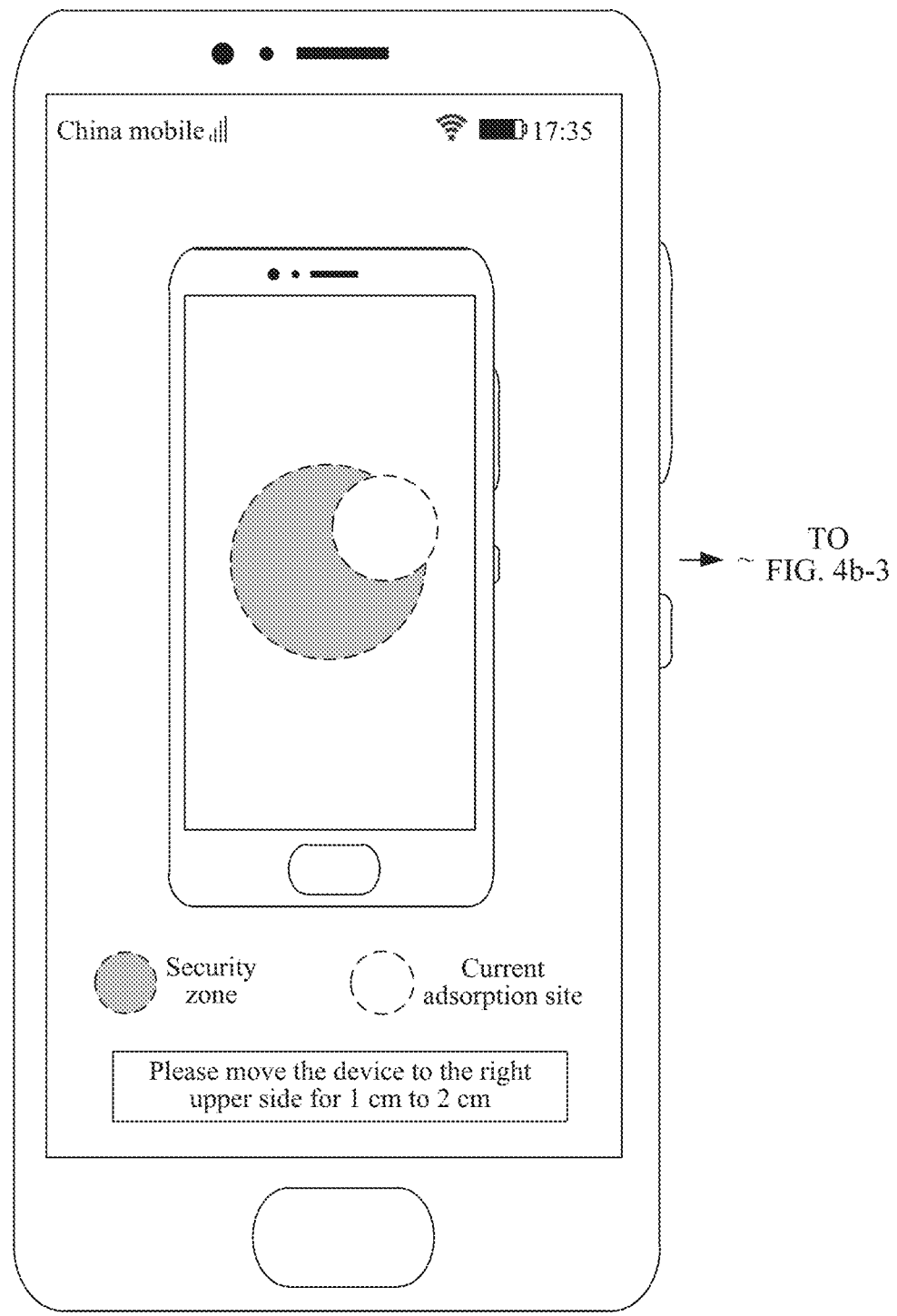
Figures 3, 4B:
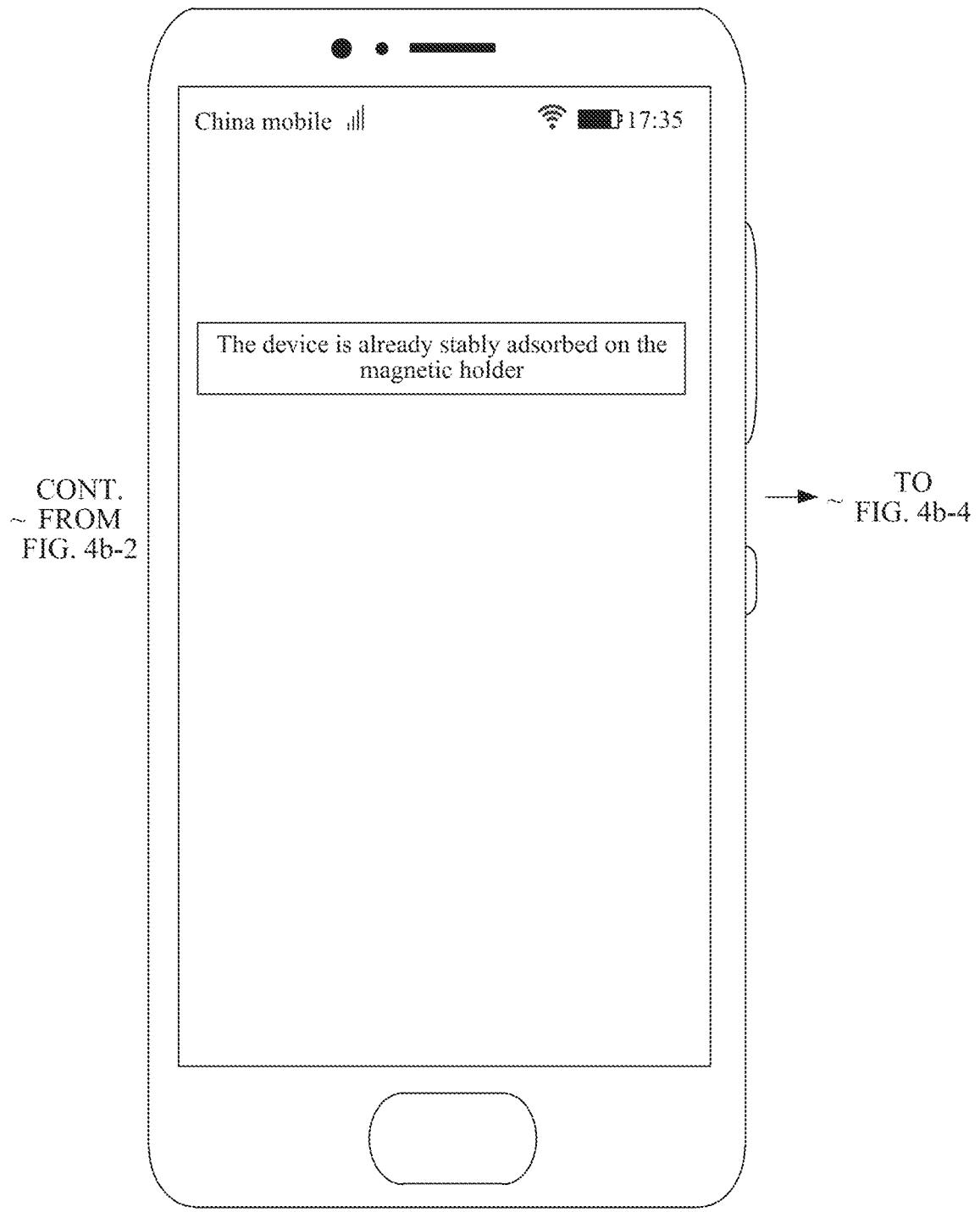

For example, as shown in FIG. 4a-1 to FIG. 4a-3, a display of a portable device is off, the portable device detects that a parameter related to a magnetic induction intensity deviates from a preset threshold range, lightens the display of the portable device when, before, or after outputting a voice prompt, and displays, on the display, the text that indicates the moving direction and that is shown in FIG. 3b, the security zone shown in FIG. 3b, and a current adsorption site of the portable device. The portable device outputs the voice prompt information "the device is already stably absorbed on the magnetic holder" when detecting that the parameter related to the magnetic induction intensity is in the preset threshold range and turns the display off. Alternatively, as shown in FIG. 4b-1 to FIG. 4b-4, the portable device displays the prompt information "the device is already stably absorbed on the magnetic holder" on the display, and turns the display off.

It should be noted that in this embodiment of this application, step S230 may further be: The portable device turns the display off when detecting that the parameter related to the magnetic induction intensity is in the preset threshold range. To be specific, the portable device may choose not to output the prompt information but to directly turn the display off when detecting that the parameter related to the magnetic induction intensity is in the preset threshold range. For example, a changing state of the display of the portable device is shown in FIG. 4a-1 to FIG. 4a-3.

In addition, in step S220 and step S230, in a process in which the portable device detects that the parameter related to the magnetic induction intensity deviates from the preset threshold range to the portable device detects that the parameter related to the magnetic induction intensity is in the preset threshold range, the portable device may display the current adsorption site of the portable device on the magnetic holder and the security zone, on the display in real time, to facilitate quickly moving the portable device to the security zone by a user.

Figures 4, 4B:
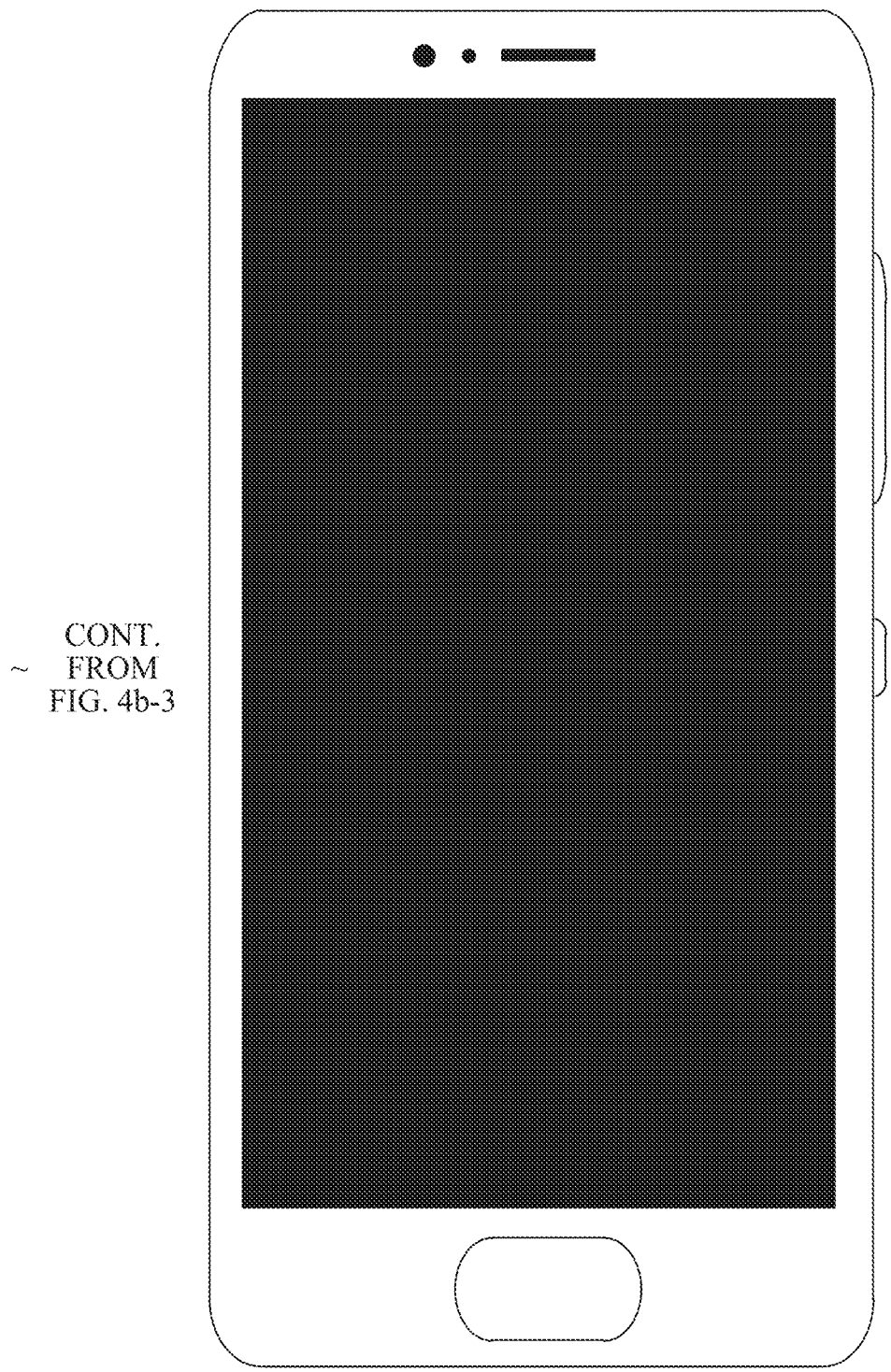
Figures 1, 4C:
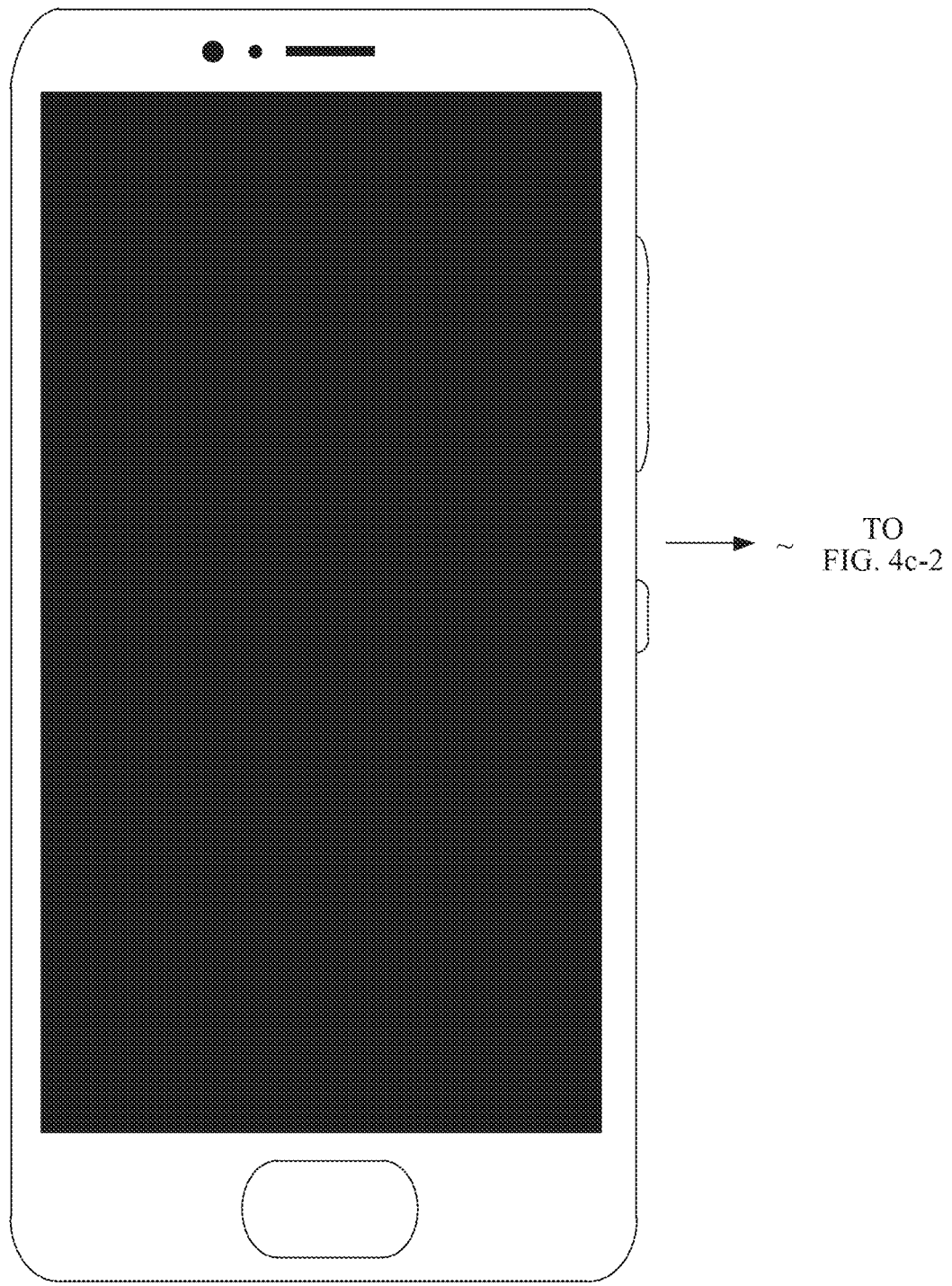
Figures 2, 4C:
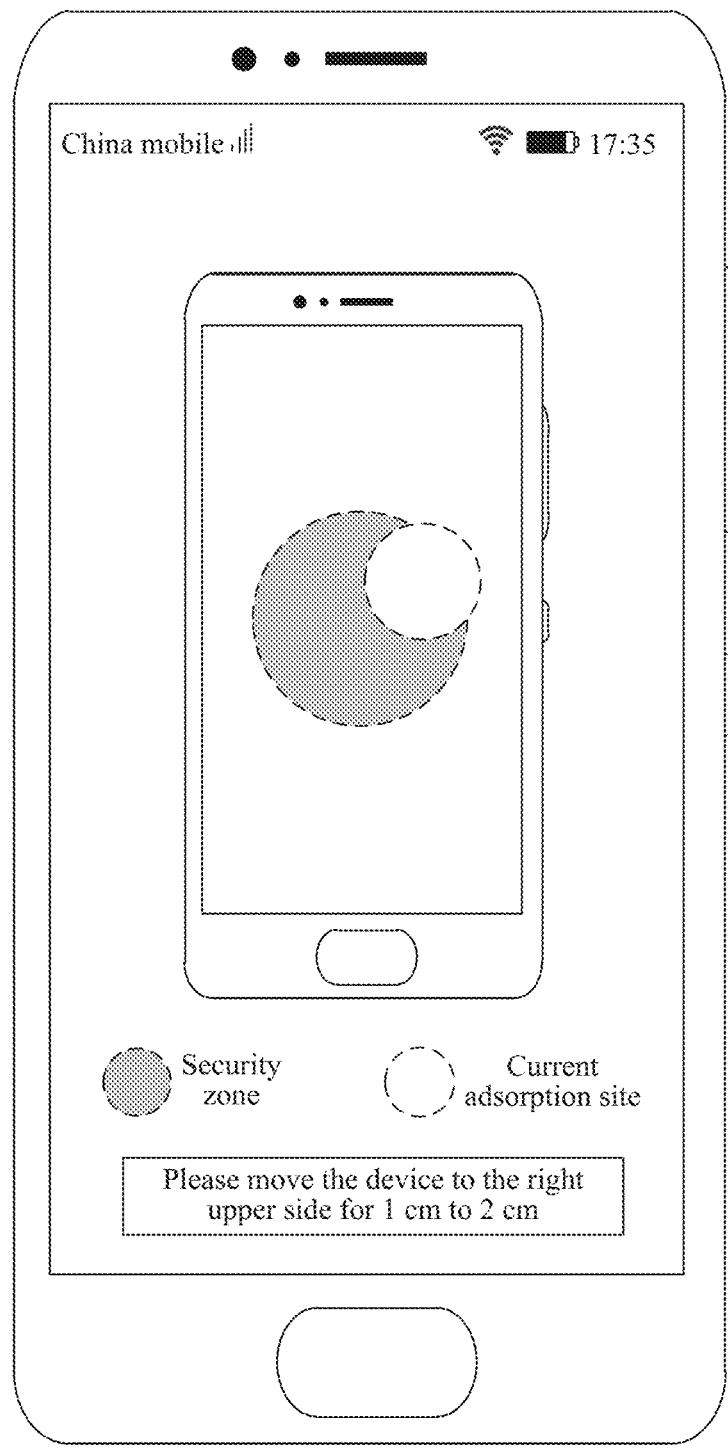
Figures 3, 4C:
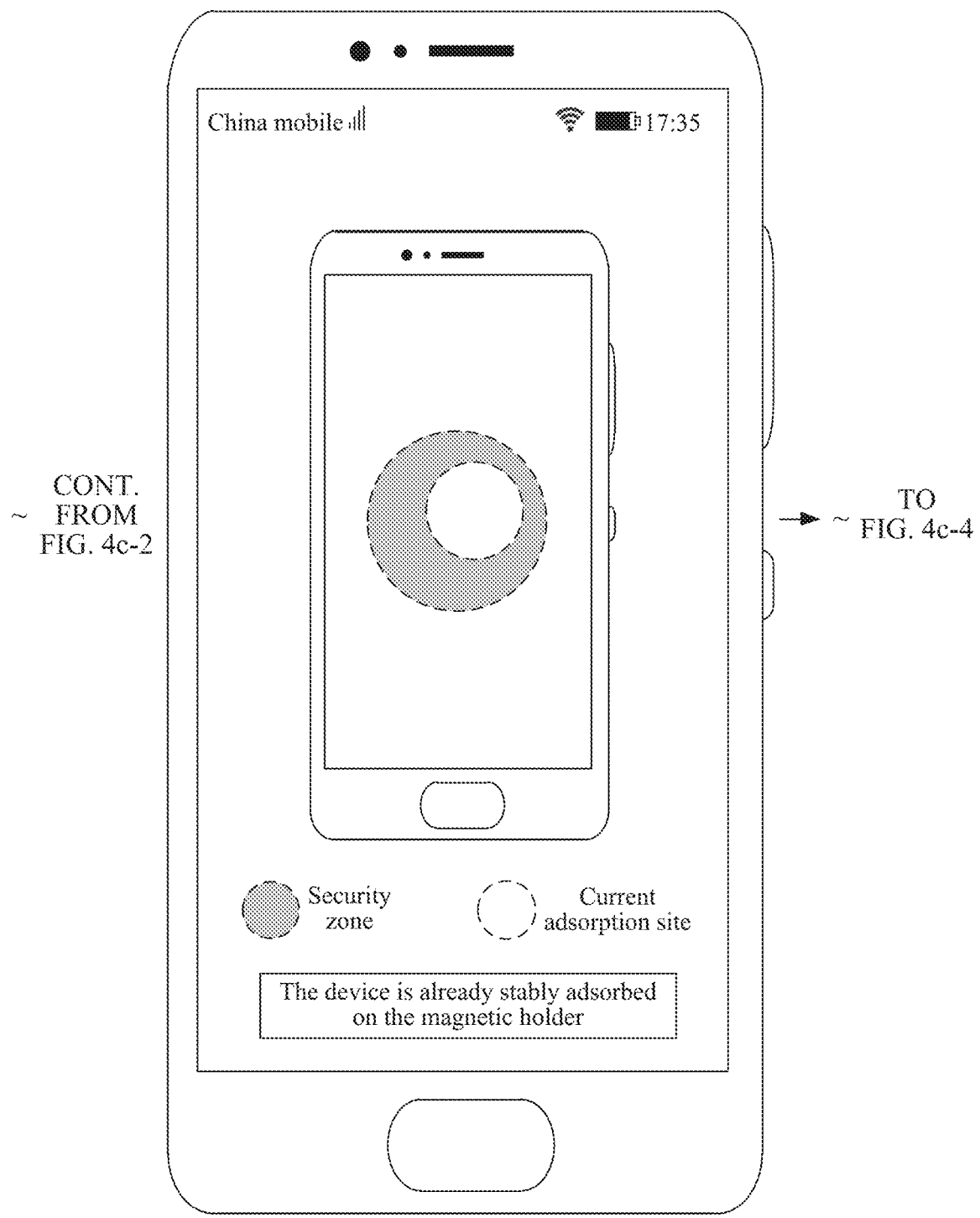
Figures 4, 4C:
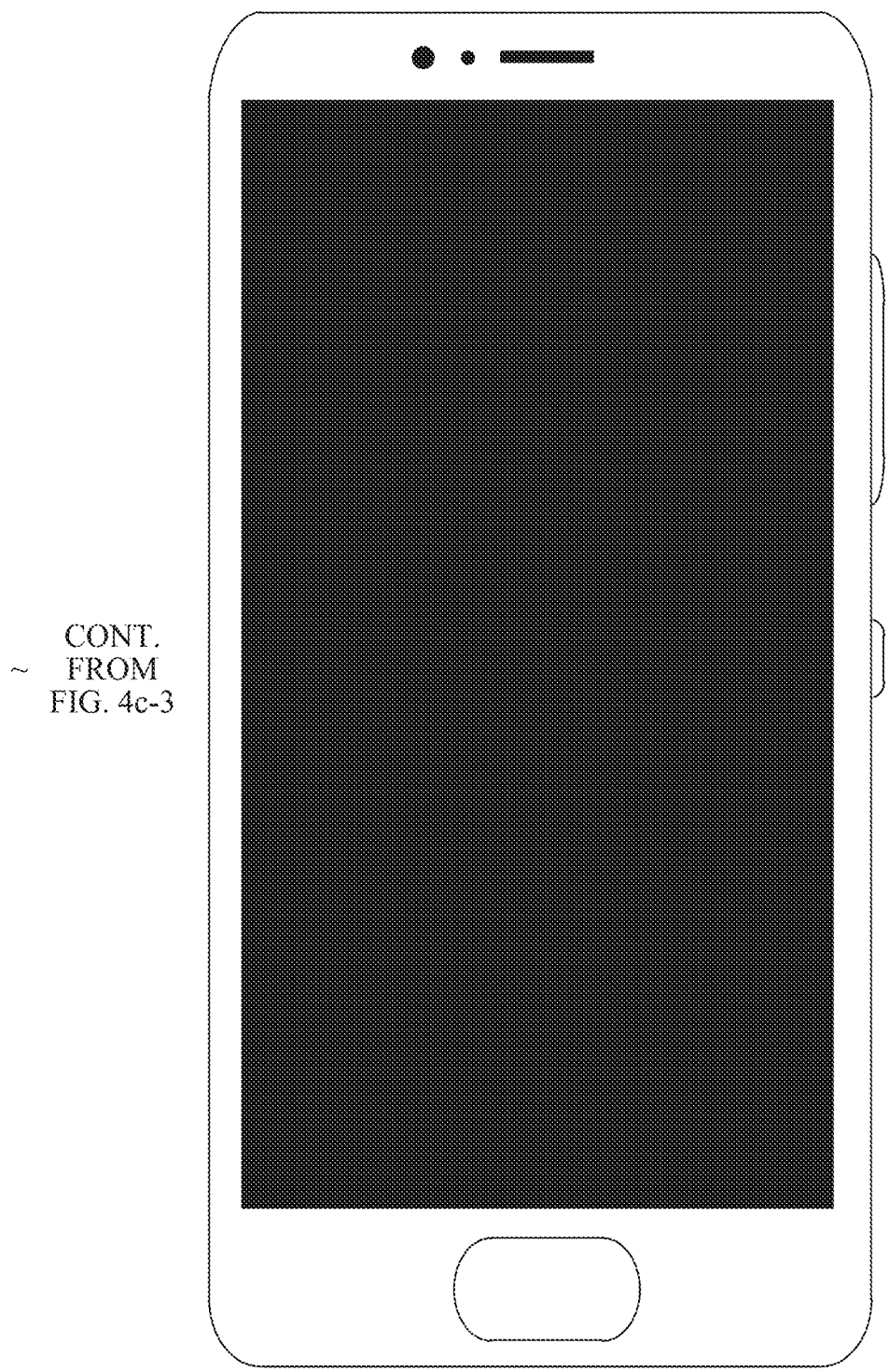

For example, as shown in FIG. 4c-1 to FIG. 4c-4, a display of a portable device is off, and the portable device detects that a parameter related to a magnetic induction intensity deviates from a preset threshold range, lightens the display of the portable device when, before, or after outputting a voice prompt, and displays, on the display, the text that indicates the moving direction and that is shown in FIG. 3b, the security zone shown in FIG. 3b, and the current adsorption site of the portable device. The portable device detects that the parameter related to the magnetic induction intensity is in the preset threshold range, displays, on the display, the security zone and an updated current adsorption site of the portable device, displays the prompt information "the device is already stably absorbed on the magnetic holder", and turns the display off.

Alternatively, the portable device detects that the parameter related to the magnetic induction intensity deviates from the threshold range, and displays, on the display, the current adsorption site of the portable device on the magnetic holder and the security zone. The portable device detects, by using an acceleration sensor, that the portable device does not move, but the parameter related to the magnetic induction intensity still deviates from the threshold range, and displays the updated adsorption site and the security zone on the display. The portable device does not display the updated adsorption site and the security zone any more when detecting that the parameter related to the magnetic induction intensity is in the threshold range, but turns the display off, or outputs the prompt information and turns the display off.

Figures 1, 4D:
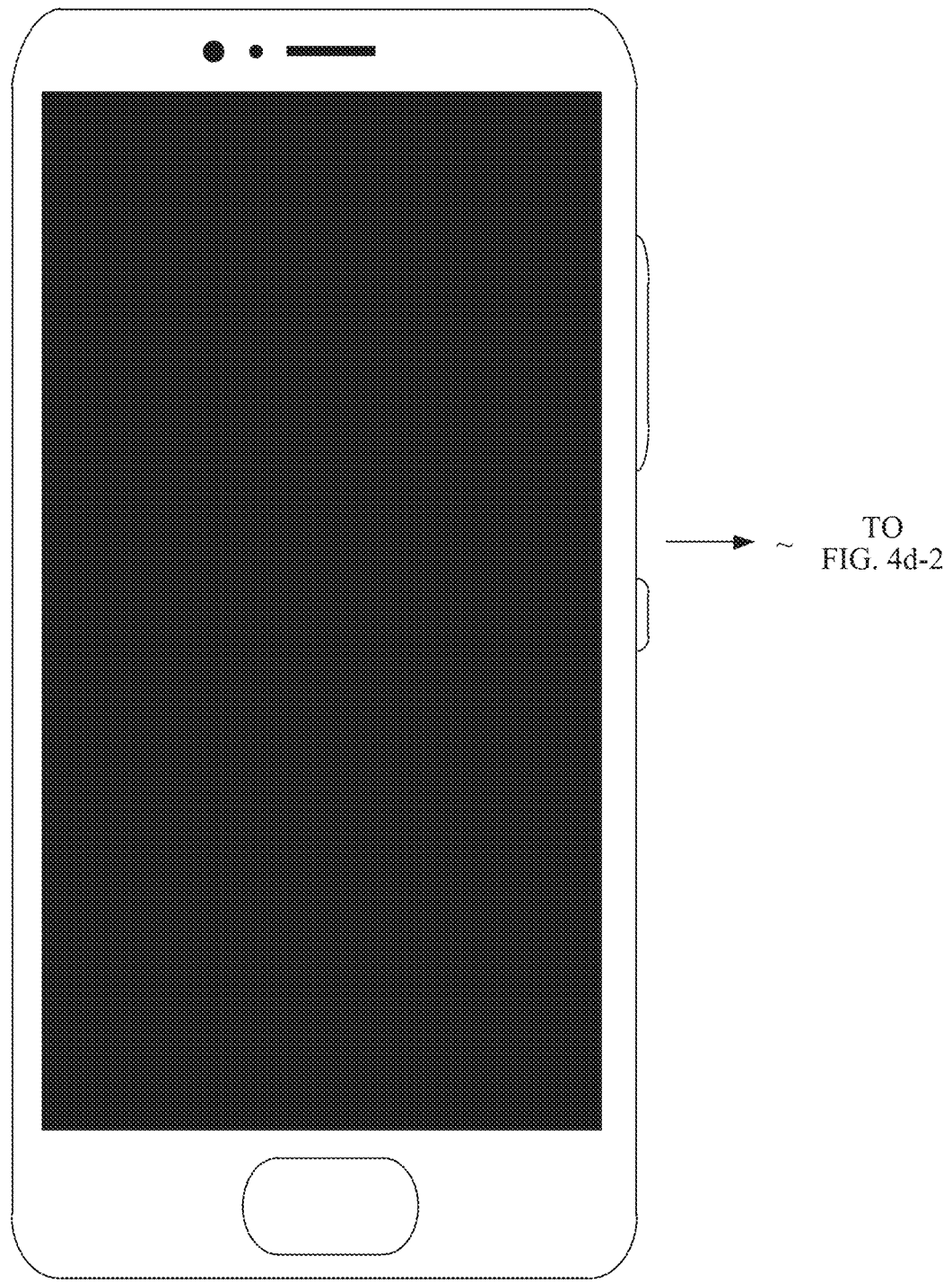
Figures 2, 4D:
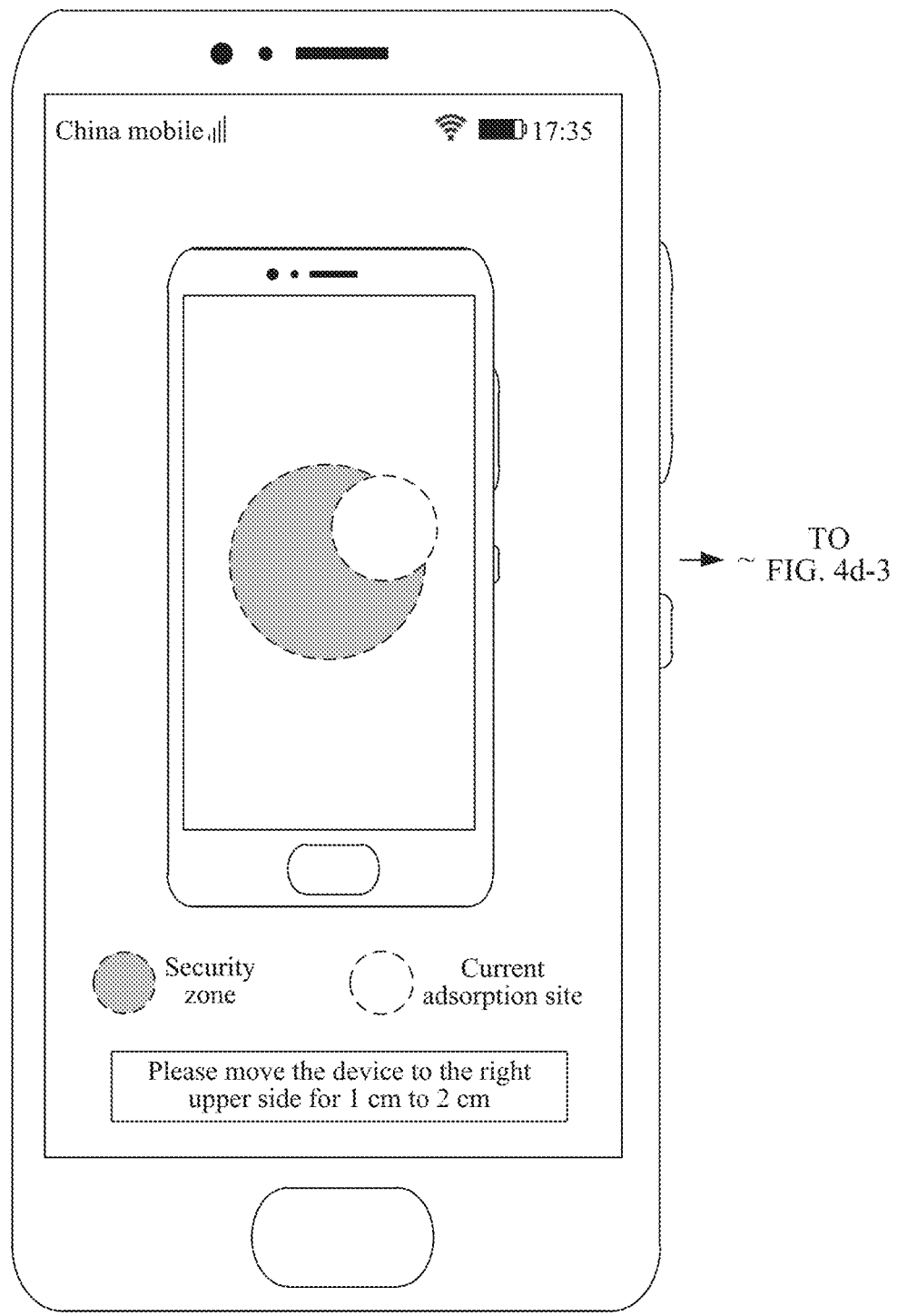
Figures 3, 4D:
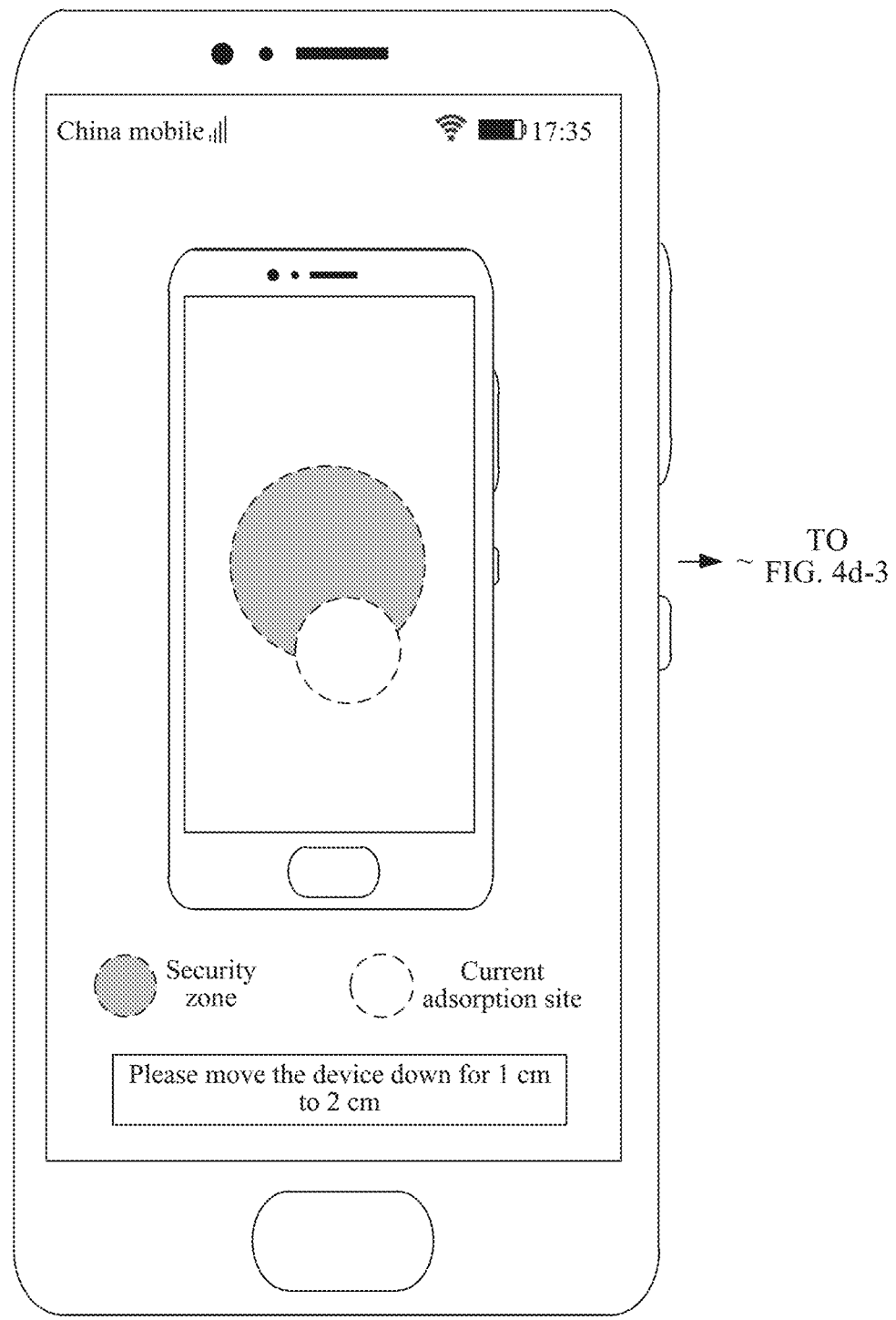
Figures 4, 4D:
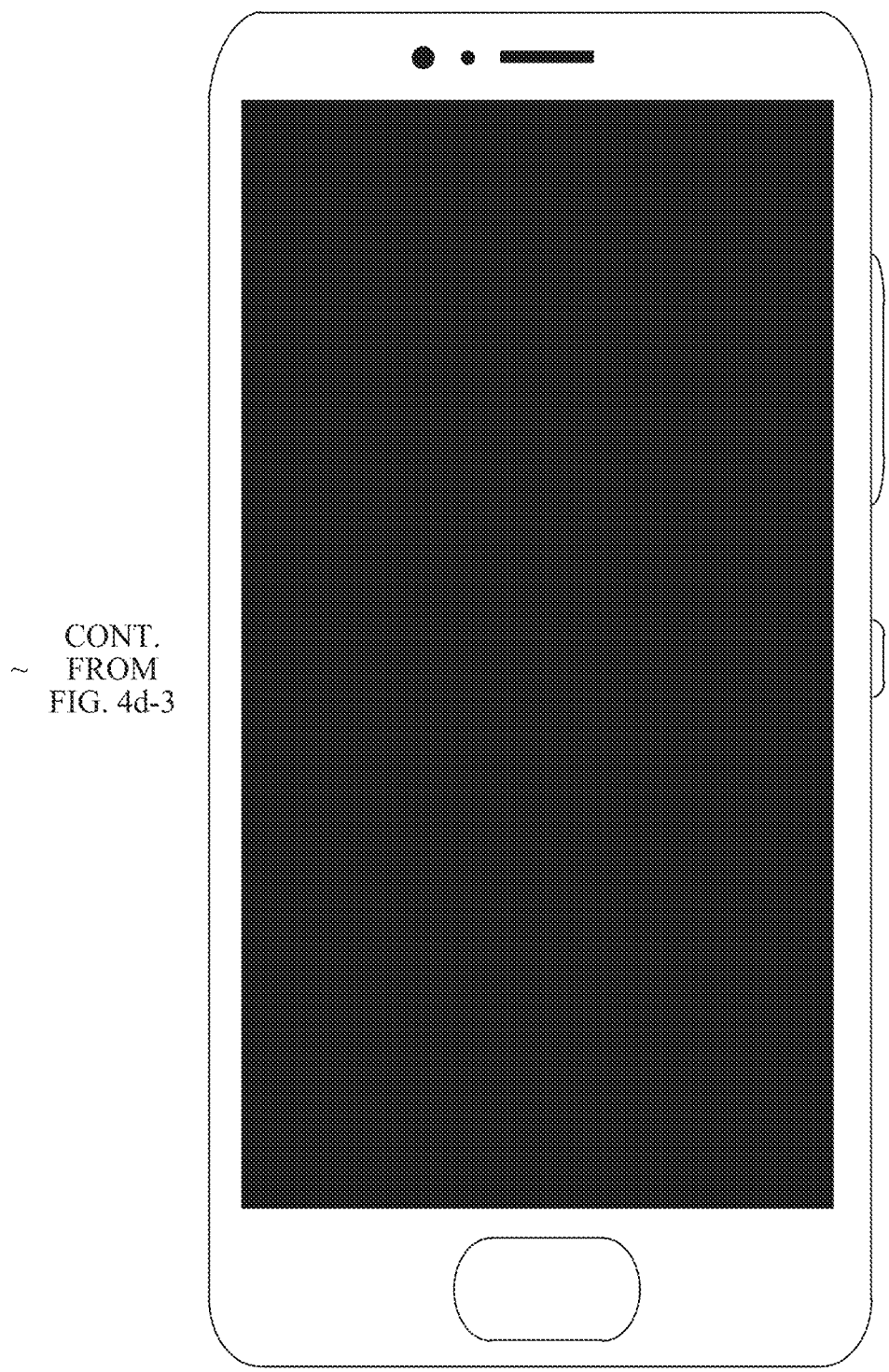

For example, as shown in FIG. 4d-1 to FIG. 4d-4, a display of a portable device is off, the portable device detects that a parameter related to a magnetic induction intensity deviates from a preset threshold range, lightens the display of the portable device when, before, or after outputting a voice prompt, and displays, on the display, the text that indicates the moving direction and that is shown in FIG. 3b, the security zone shown in FIG. 3b, and the current adsorption site of the portable device. Then the user moves a location of the portable device, but a parameter that is related to the magnetic induction intensity and that is of a portable device whose location has been moved still deviates from the threshold range. Therefore, the portable device displays, on the display, an updated text "please move the device downward for 1 cm to 2 cm" that indicates a moving direction, an updated adsorption site, and the security zone. Then, the user moves the portable device again to a proper location, and the portable device detects that the parameter related to the magnetic induction intensity is in the threshold range, and turns the display off.

In addition, in step S220 and step S230, when outputting the prompt information, where the outputting the prompt information includes outputting a voice prompt and displaying the prompt information on the display, the portable device may be in a locked state or an unlocked state.

According to the prompt method that is provided in the embodiments of this application and that is applied to the portable device adsorbed on the magnetic holder, the display of the portable device is off, and the portable device determines, by detecting that the parameter related to the magnetic induction intensity deviates from the preset threshold range, that absorption of the portable device on the magnetic holder is unstable, and then outputs the voice prompt. The portable device lightens the display of the portable device when, before, or after outputting the voice prompt, and displays the prompt information about moving the portable device, on the display, so that a user can move the portable device in time. Therefore, the portable device can be stably adsorbed on the magnetic holder, thereby effectively preventing the portable device from sliding down from the magnetic holder.

Figure 5:
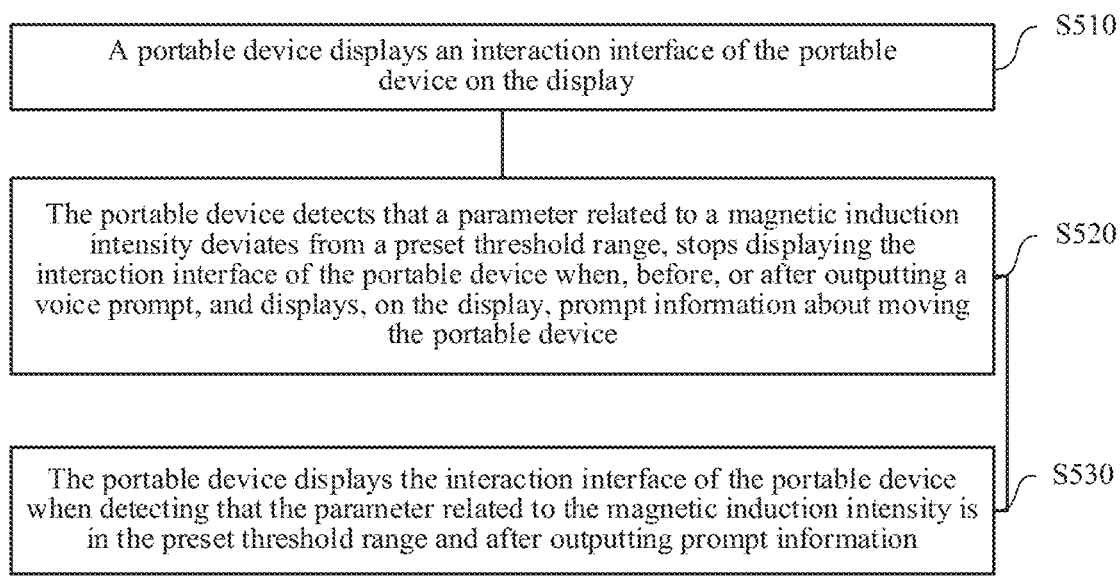
FIG. 5 is a flowchart of another prompt method according to an embodiment of this application.

FIG. 5 is a flowchart of another prompt method according to an embodiment of this application. As shown in FIG. 5, the method includes the following steps.

Step S510. A portable device displays an interaction interface on the display, where the interaction interface includes an unlock interface, a standby screen, a lock screen, a non-home screen, a home screen, or an application interface.

In a plurality of different scenarios, an interaction interface is displayed on the display of the portable device absorbed on the magnetic holder, where the interaction interface includes an unlock interface, a standby screen, a lock screen, a non-home screen, a home screen, or an application interface. For example, a user presses a home (Home) key of a portable device that is originally in a lock screen state. In this case, an unlock interface is displayed on the display of the portable device. Alternatively, after user powers on and unlocks the portable device, the home screen is displayed on the display of the portable device. Alternatively, a user is using an application in the portable device. In this case, the application interface is displayed on the display of the portable device. The standby screen indicates a page displayed during standby of the mobile phone. The non-home screen indicates an interaction interface other than the unlock interface, the standby screen, the lock screen, the home screen, and an application interface.

Step S520. The portable device detects that a parameter related to a magnetic induction intensity deviates from a preset threshold range, stops displaying the interaction interface when, before, or after outputting a voice prompt, and displays, on the display, prompt information about moving the portable device.

In this step, if the portable device detects that the parameter related to the magnetic induction intensity deviates from the preset threshold range, the portable device may determine that adsorption of the portable device on the magnetic holder is unstable, and further prompts the user that a location of the portable device needs to be adjusted.

For example, an output voice prompt is used to prompt the user that the adsorption of the portable device on the magnetic holder is unstable, and the location of the portable device needs to be adjusted. For example, content of the voice prompt is that "the adsorption of the portable device on the magnetic holder is unstable, please move the portable device according to the prompt".

For example, the displaying the prompt information about moving the portable device, on the display may include: displaying a security zone and a current adsorption site of the portable device on the display; displaying a text indicating a moving direction or a graph representation indicating a moving direction, on the display; or displaying, on the display, a text indicating a moving direction or a graph representation indicating a moving direction, the security zone, and a current adsorption site of the portable device. The user may adjust the location of the portable device based on the prompt information that is about moving the portable device and that is displayed on the display, so that the portable device is stably adsorbed on the magnetic holder.

Figure 6A:
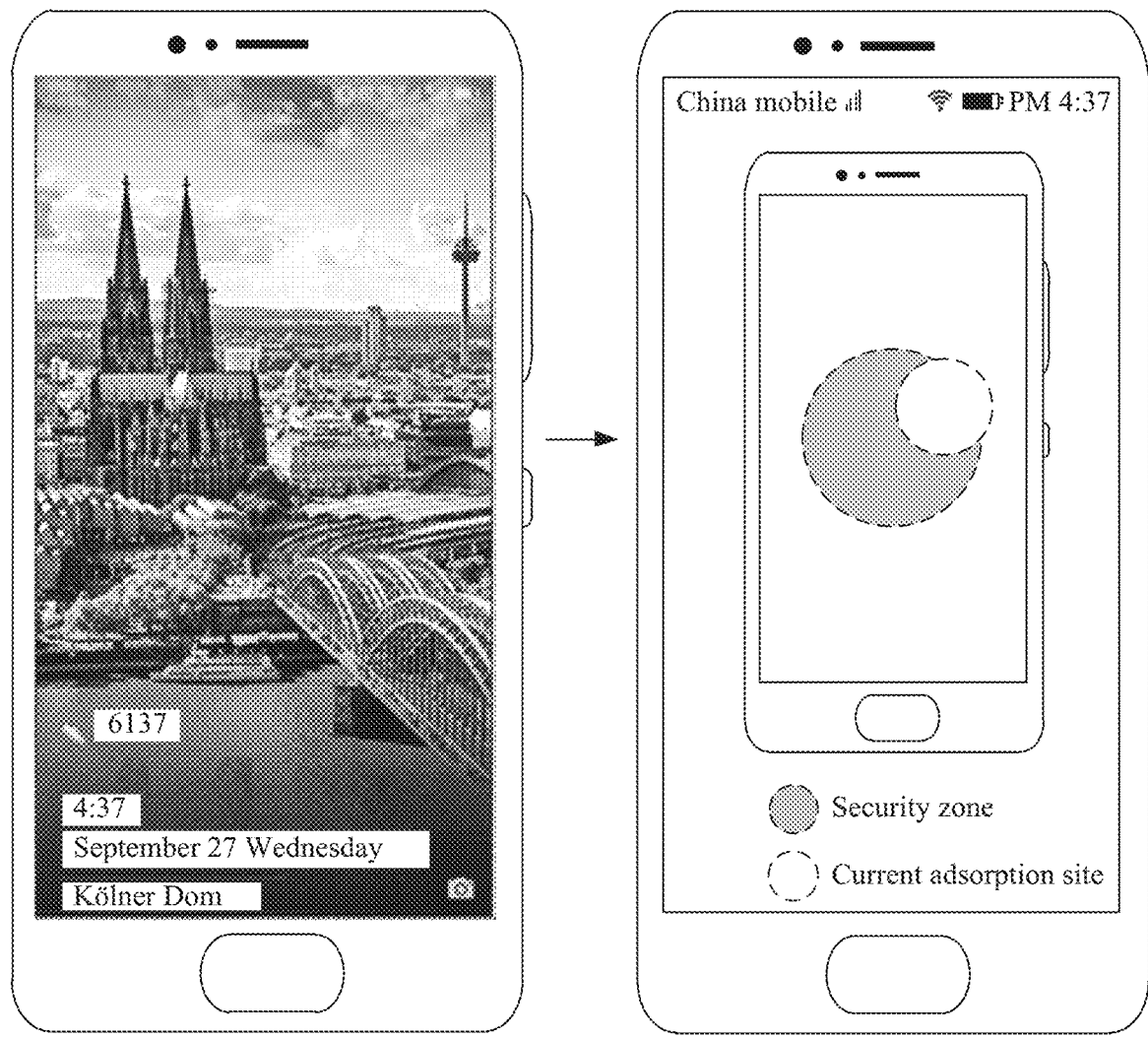
FIG. 6a is a schematic diagram of an interface change of a display according to an embodiment of this application.

For example, as shown in FIG. 6a, the portable device displays an unlock interface on the display. The portable device detects that a parameter related to a magnetic induction intensity deviates from a preset threshold range, stops displaying the interaction interface when, before, or after outputting a voice prompt, and displays, on the display, the security zone shown in FIG. 3a and a current adsorption site of the portable device.

Figure 6B:
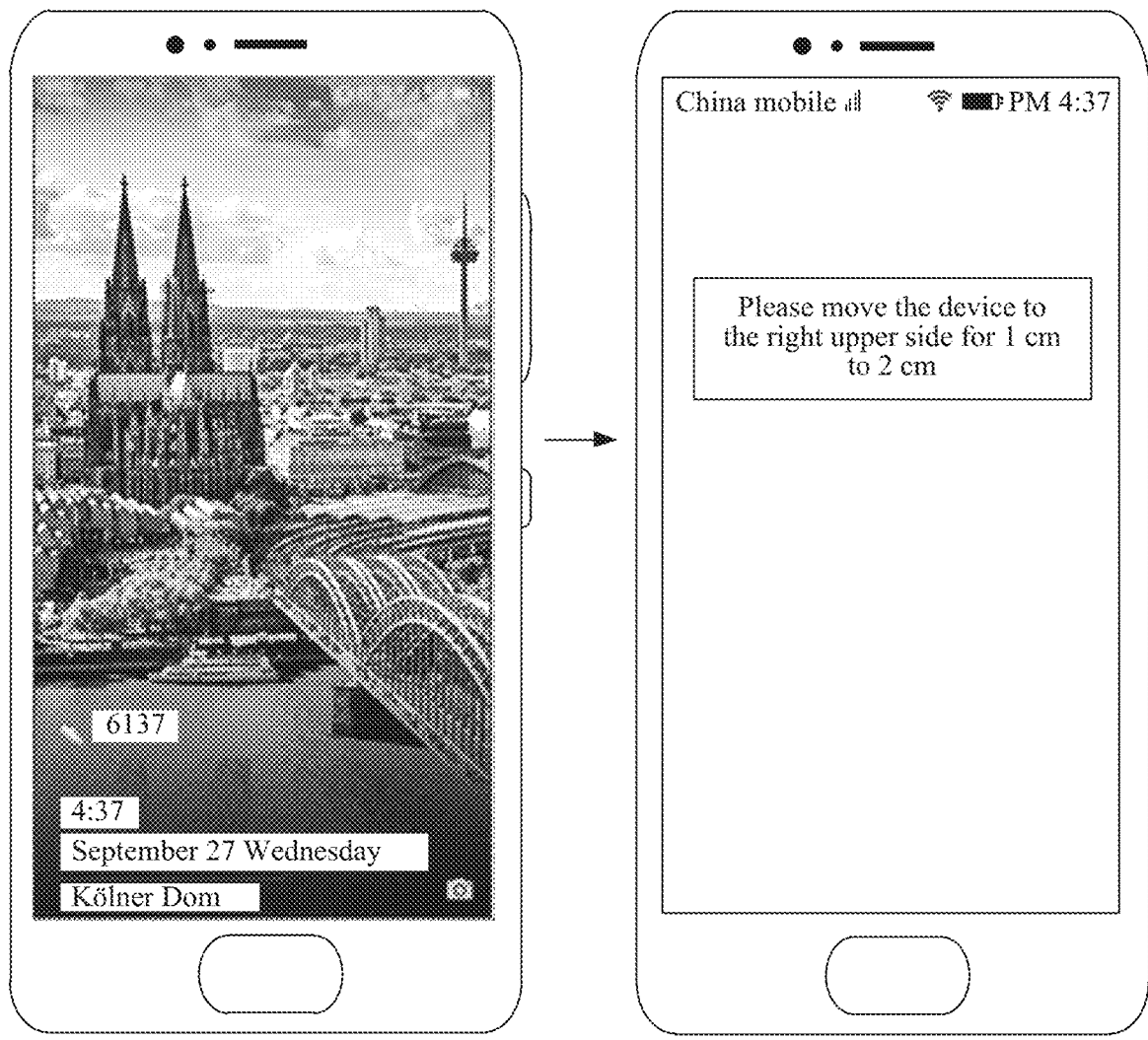
FIG. 6b is a schematic diagram of another interface change of a display according to an embodiment of this application.

For another example, as shown in FIG. 6b, the portable device displays an unlock interface on the display. The portable device detects that a parameter related to a magnetic induction intensity deviates from a preset threshold range, stops displaying the interaction interface when, before, or after outputting a voice prompt, and displays, on the display, the text that indicates the moving direction and that is shown in FIG. 3b.

Figures 1, 6C:
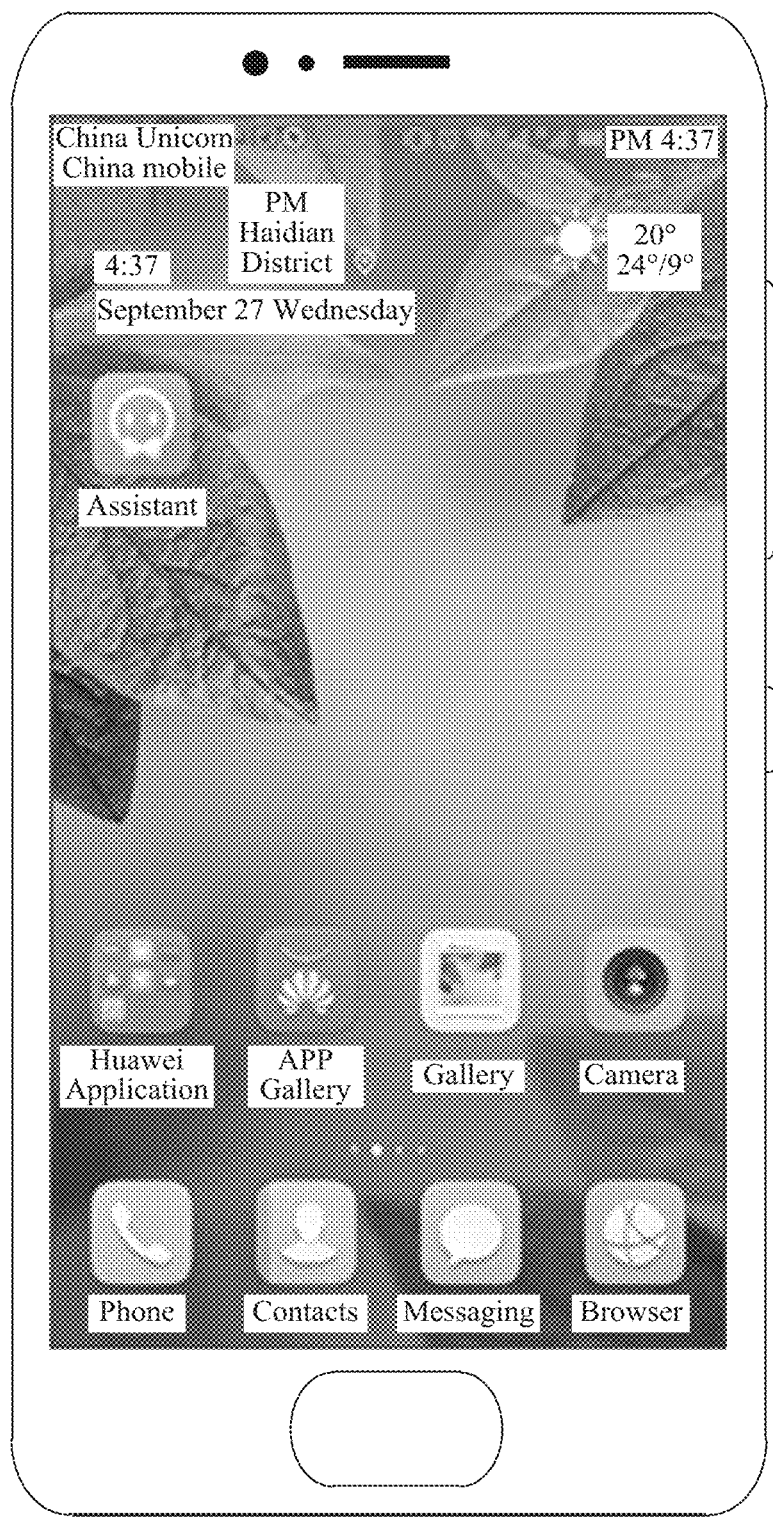
Figures 2, 6C:
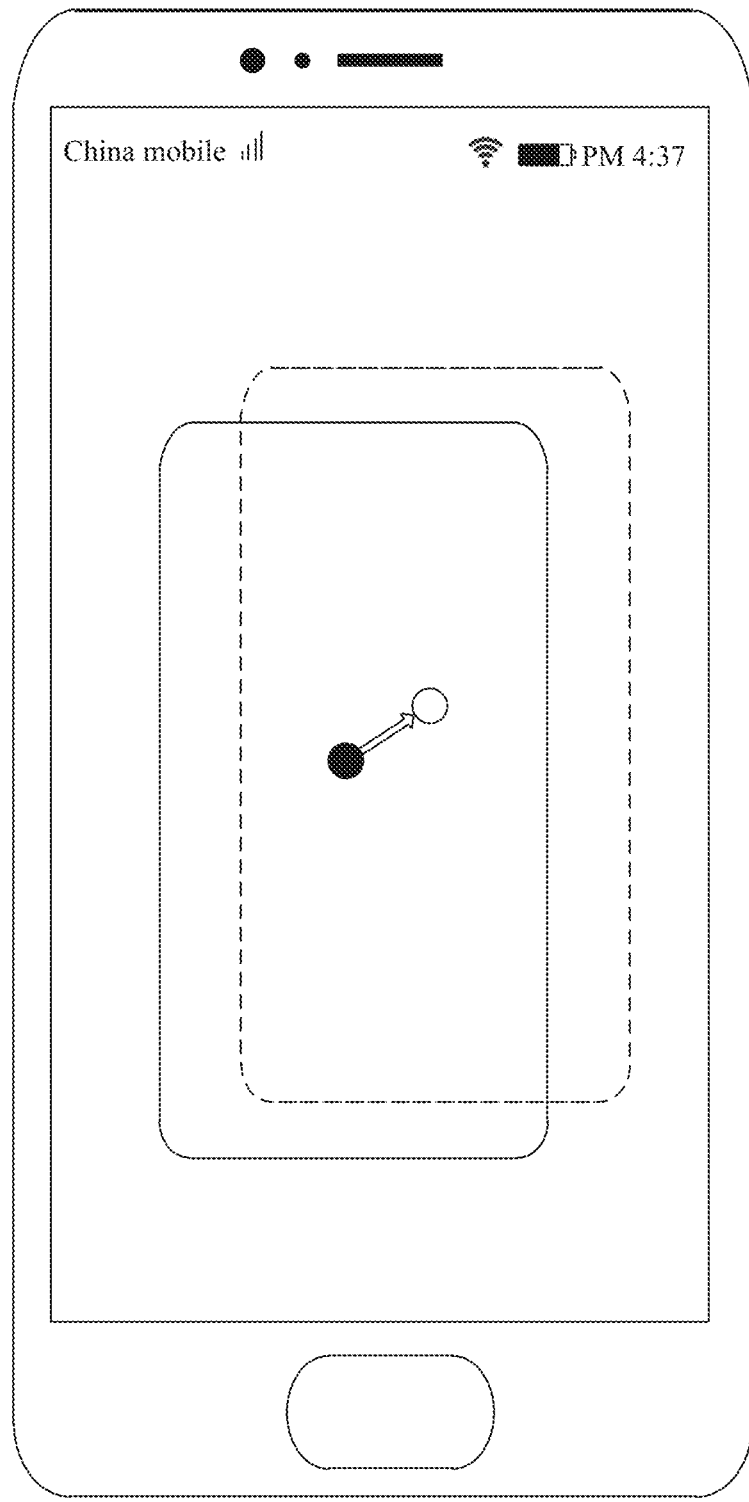

For still another example, as shown in FIG. 6c-1 and FIG. 6c-2, the portable device displays a home screen on the display. The portable device detects that a parameter related to a magnetic induction intensity deviates from a preset threshold range, stops displaying the interaction interface when, before, or after outputting a voice prompt, and displays, on the display, a graph representation that indicates the moving direction and that is shown in FIG. 3c.

Figures 1, 6D:
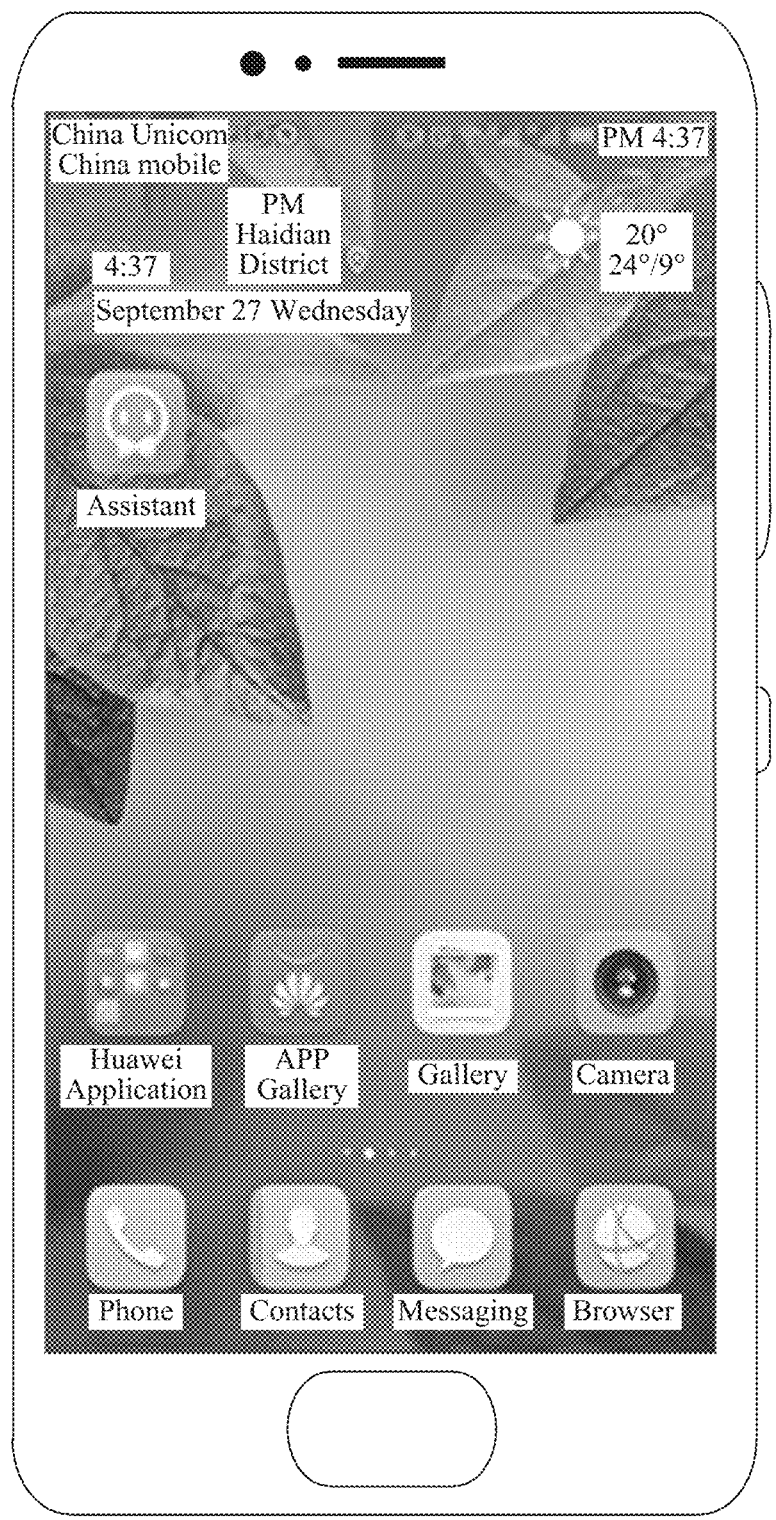
Figures 2, 6D:
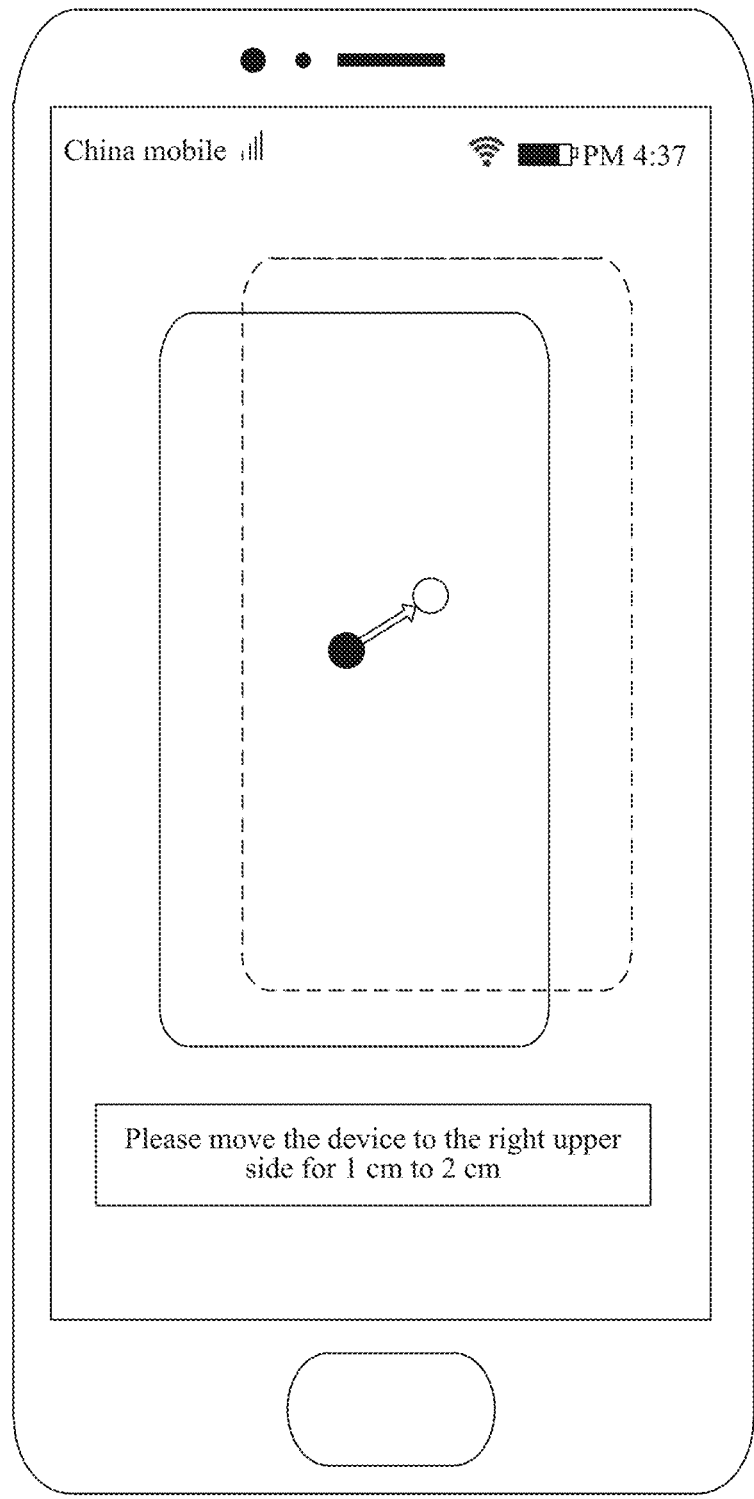

For yet another example, as shown in FIG. 6d-1 and FIG. 6d-2, the portable device displays a home screen on the display. The portable device detects that a parameter related to a magnetic induction intensity deviates from a preset threshold range, stops displaying the interaction interface when, before, or after outputting a voice prompt, and displays, on the display, the text indicating the moving direction and the graph representation indicating the moving direction, where the text and the graph representation are shown in FIG. 3d.

Figures 1, 6E:
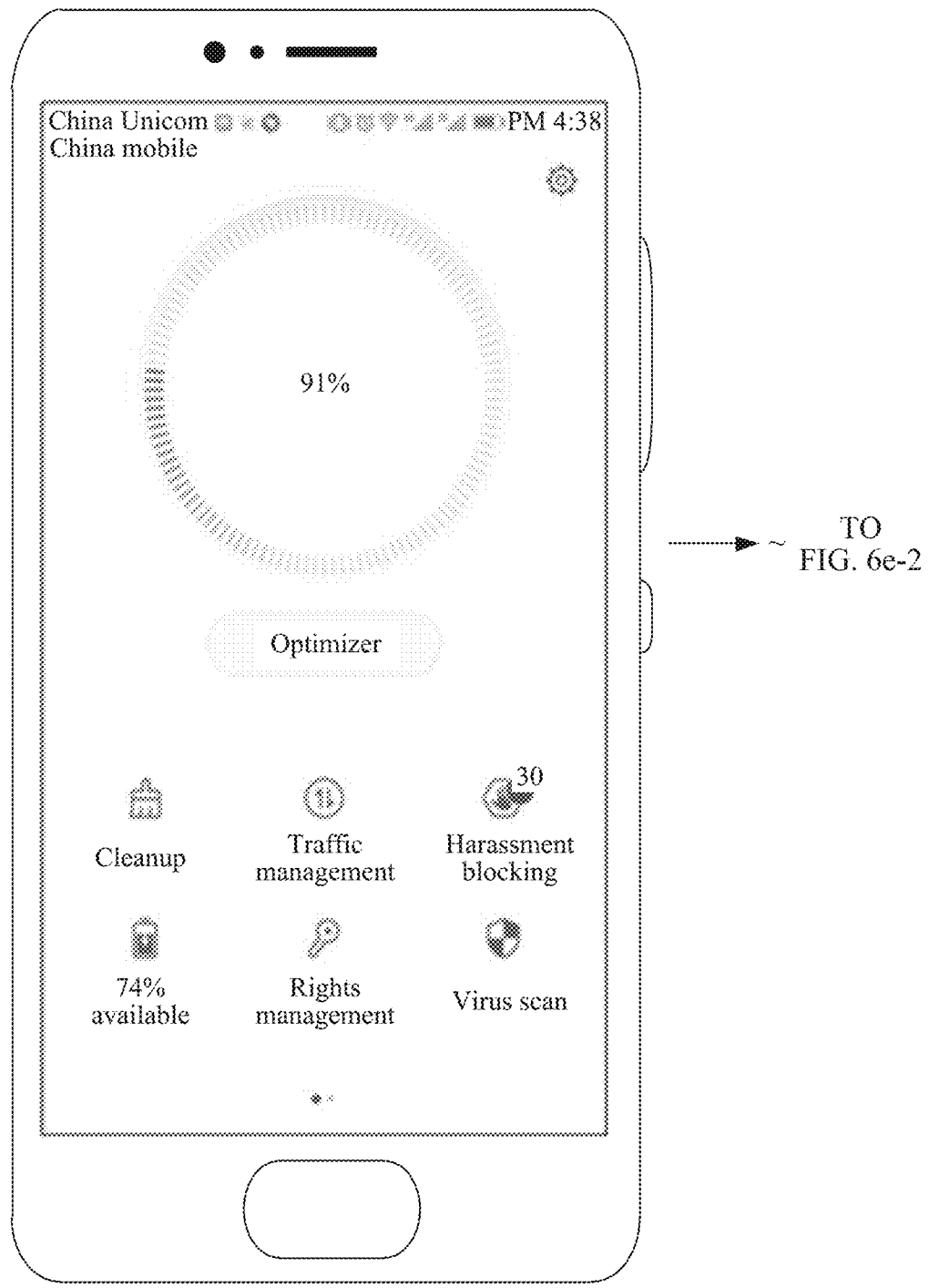
Figures 2, 6E:
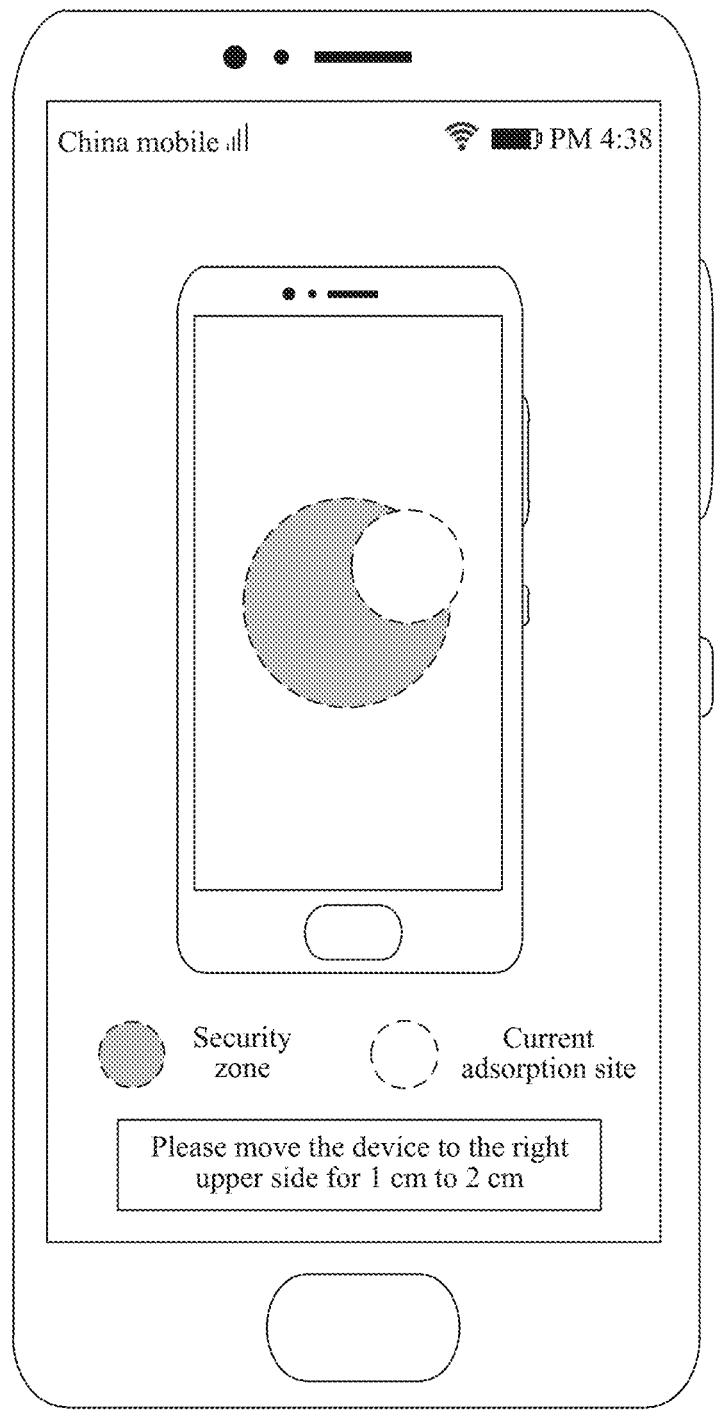

For another example, as shown in FIG. 6e-1 and FIG. 6e-2, the portable device displays an application interface on the display. The portable device detects that a parameter related to a magnetic induction intensity deviates from a preset threshold range, stops displaying the interaction interface when, before, or after outputting a voice prompt, and displays, on the display, the text indicating the moving direction, the security zone, and the current adsorption site of the portable device, where the text, the security zone, and the current adsorption site are shown in FIG. 3e.

Figures 1, 6F:
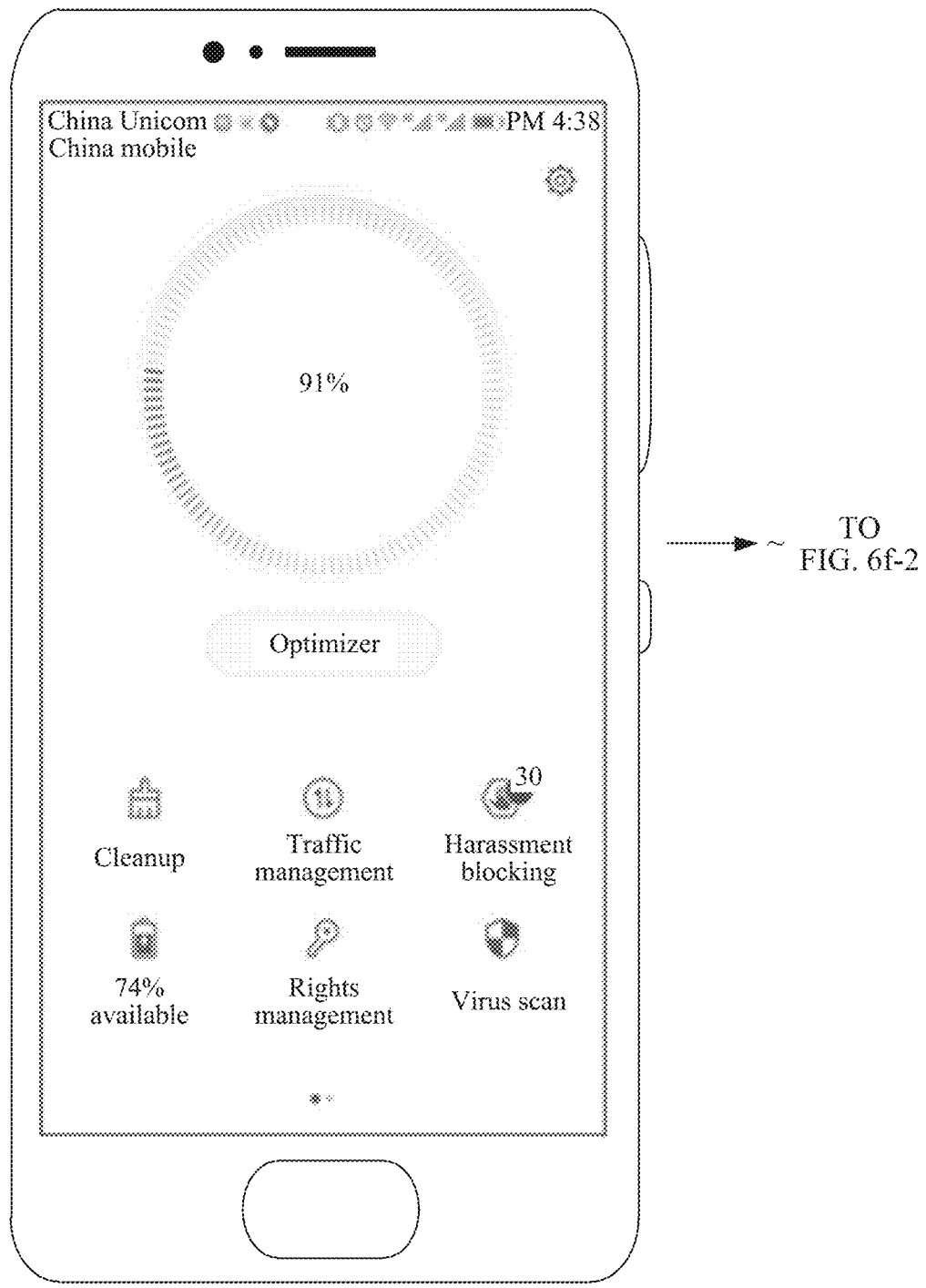
Figures 2, 6F:
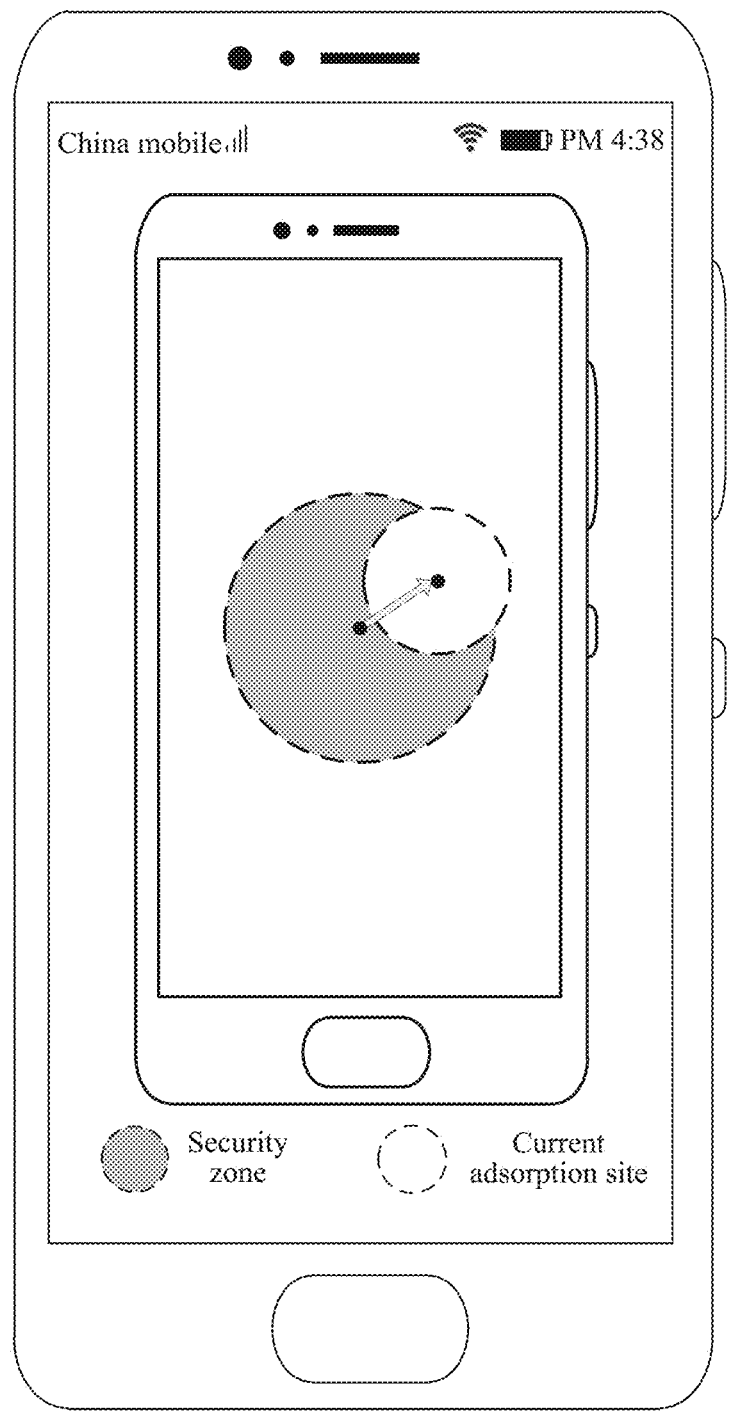

For still another example, as shown in FIG. 6f-1 and FIG. 6f-2, the portable device displays an application interface on the display. The portable device detects that a parameter related to a magnetic induction intensity deviates from a preset threshold range, stops displaying the interaction interface when, before, or after outputting a voice prompt, and displays, on the display, the graph representation indicating the moving direction, the security zone, and the current adsorption site of the portable device, where the graph representation, the security zone, and the current adsorption site are shown in FIG. 3f.

It should be noted that a switching process that is of the interaction interface of the portable device and that is displayed on the display in FIG. 6a, FIG. 6b, FIG. 6c-1 and FIG. 6c-2, FIG. 6d-1 and FIG. 6d-2, FIG. 6e-1 and FIG. 6e-2, FIG. 6f-1 and FIG. 6f-2, and FIG. 7e is described by using an example in which the switching process occurs within 60 s. It should be understood that the process may also occur in 1 min, 2 min, or any other time segment.

Step S530. The portable device displays the interaction interface when detecting that the parameter related to the magnetic induction intensity is in the preset threshold range and after outputting prompt information.

It should be understood that the "interaction interface" in S510, the "interaction interface" in S520, and the "interaction interface" in S530 may be the same or may be different.

Whether two interaction interfaces are the same or different usually do not consider a change in time on the top of the display, a change in a power level value, and a change in signal strength.

Optionally, a difference between the two interaction interfaces may consider the change in time on the top of the display, the change in the power level value, and a change in the signal strength. In this case, the "interaction interface" in S510, the "interaction interface" in S520, and the "interaction interface" in S530 are usually different from each other.

In step S530, if the portable device detects that the parameter related to the magnetic induction intensity is in the preset threshold range, the portable device may determine that the portable device is stably adsorbed on the magnetic holder, further outputs the prompt information, to prompt the user that the portable device is already stably absorbed on the magnetic holder, and displays the interaction interface of the portable device.

The interaction interface displayed in step S530 may be the interaction interface displayed on the portable device in step S510, so that the user can continue performing the original operations.

For example, the outputting the prompt information may include: outputting voice prompt information, or displaying the prompt information on the display.

Figures 1, 7A:
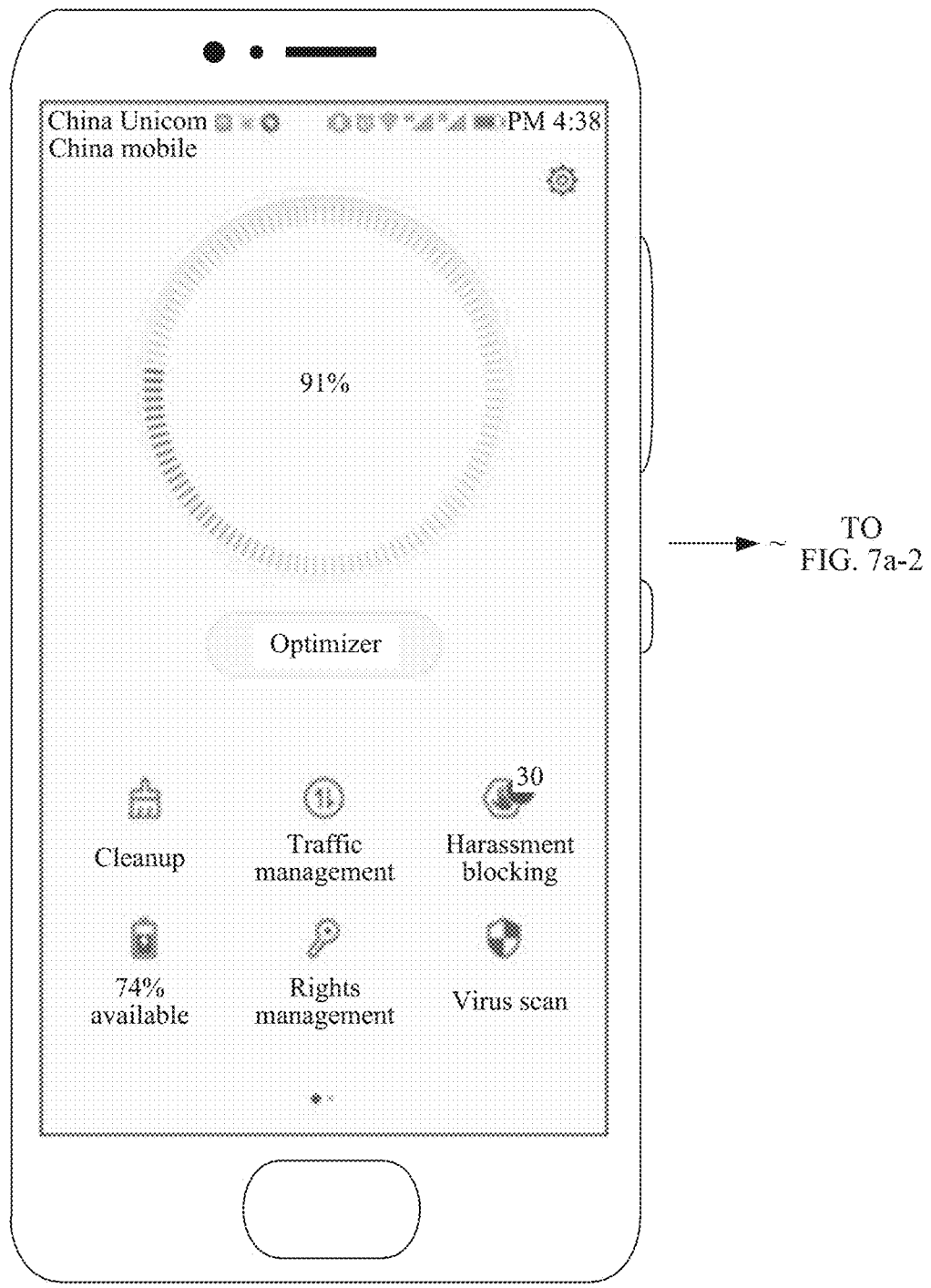
Figures 2, 7A:
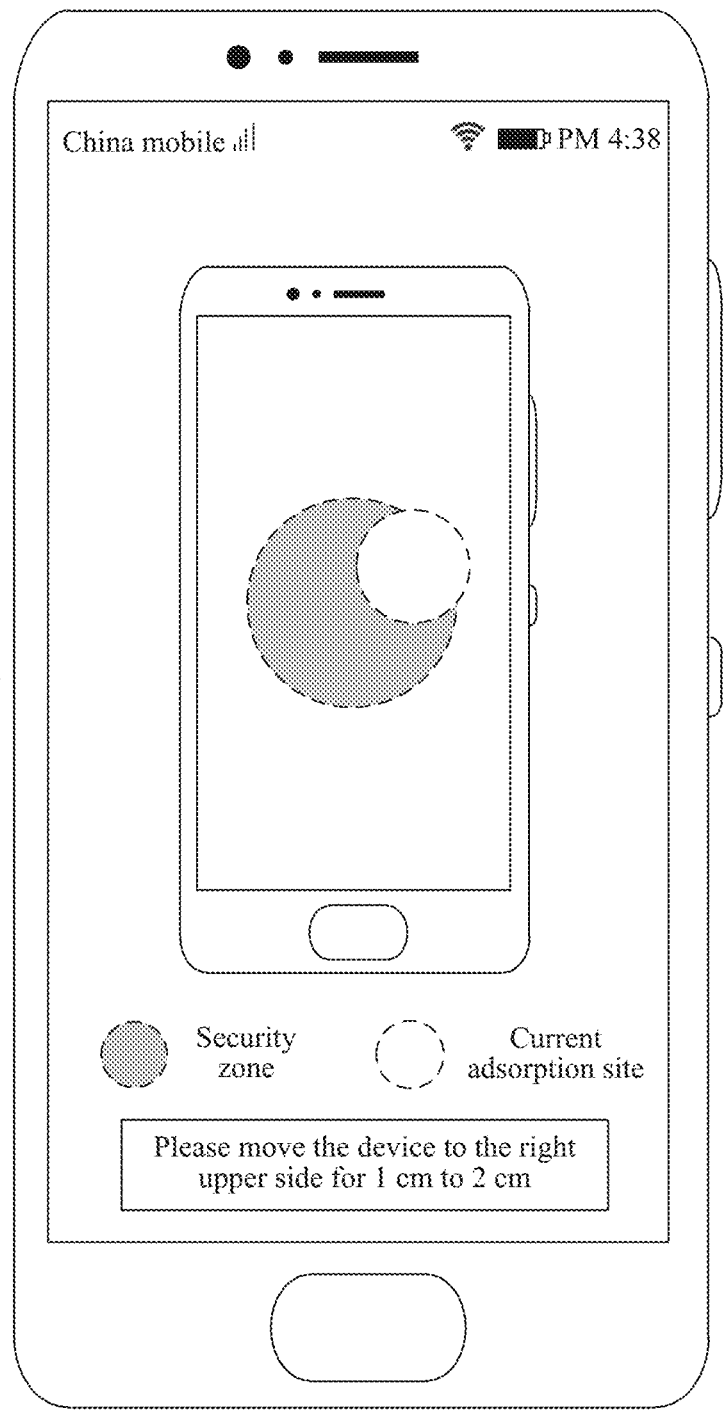
Figures 3, 7A:
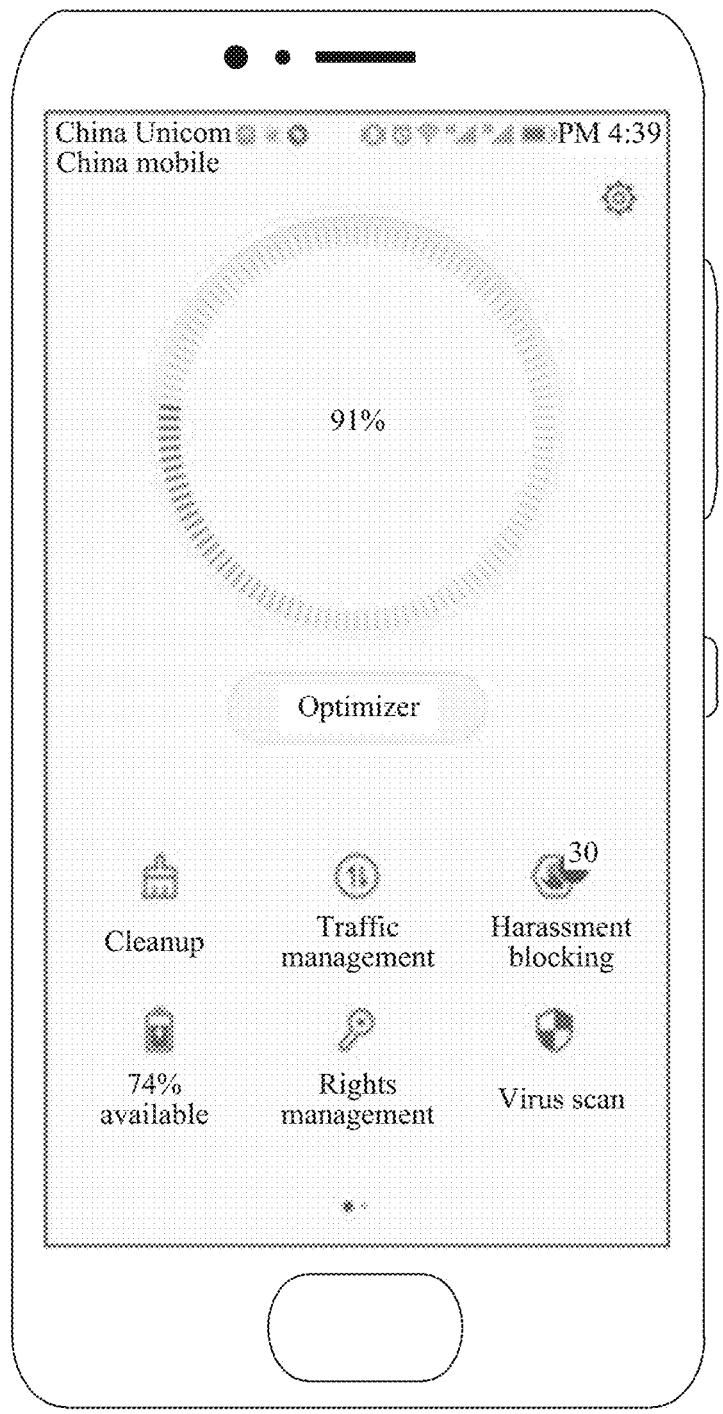
Figures 1, 7B:
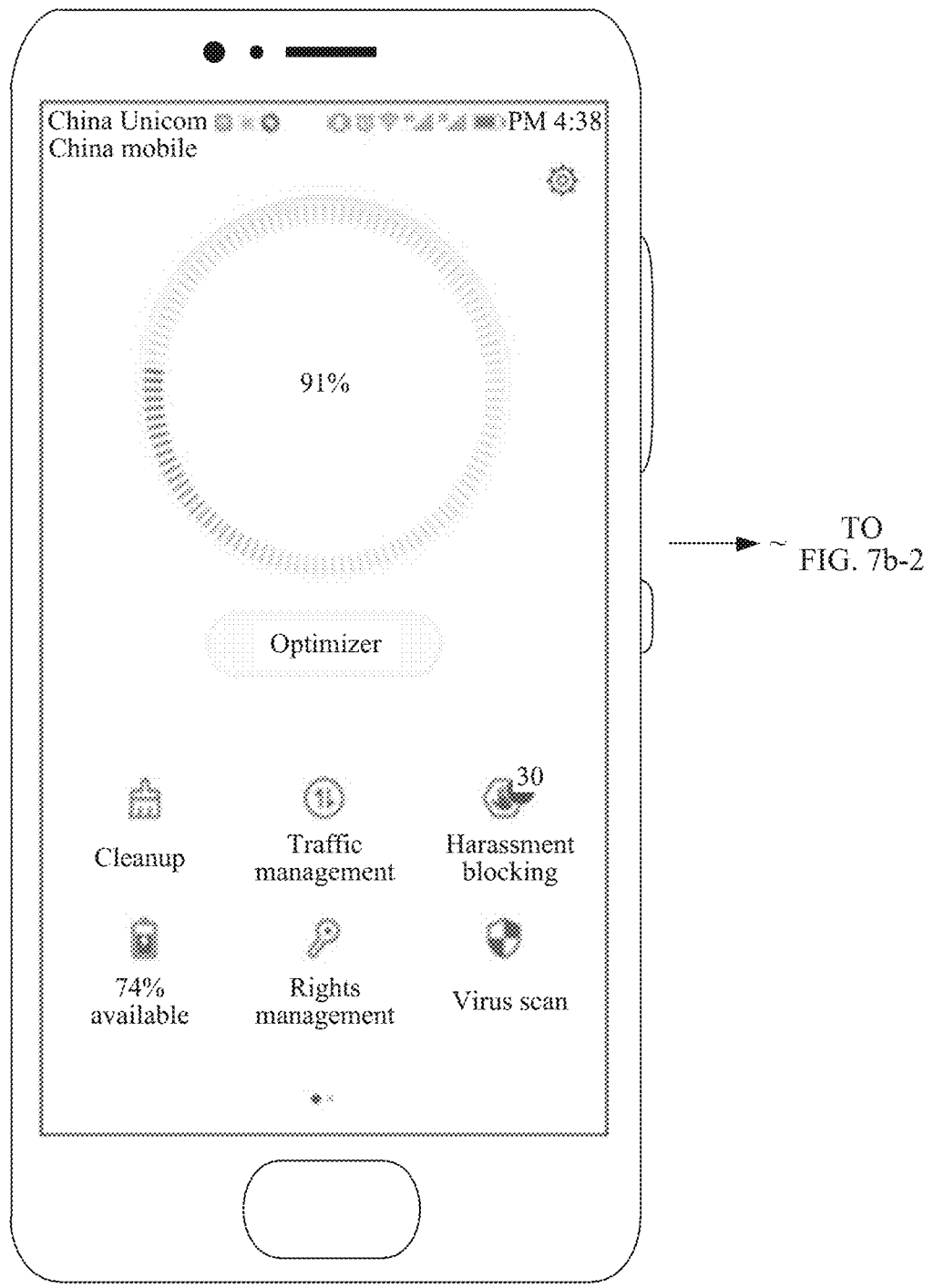
Figures 2, 7B:
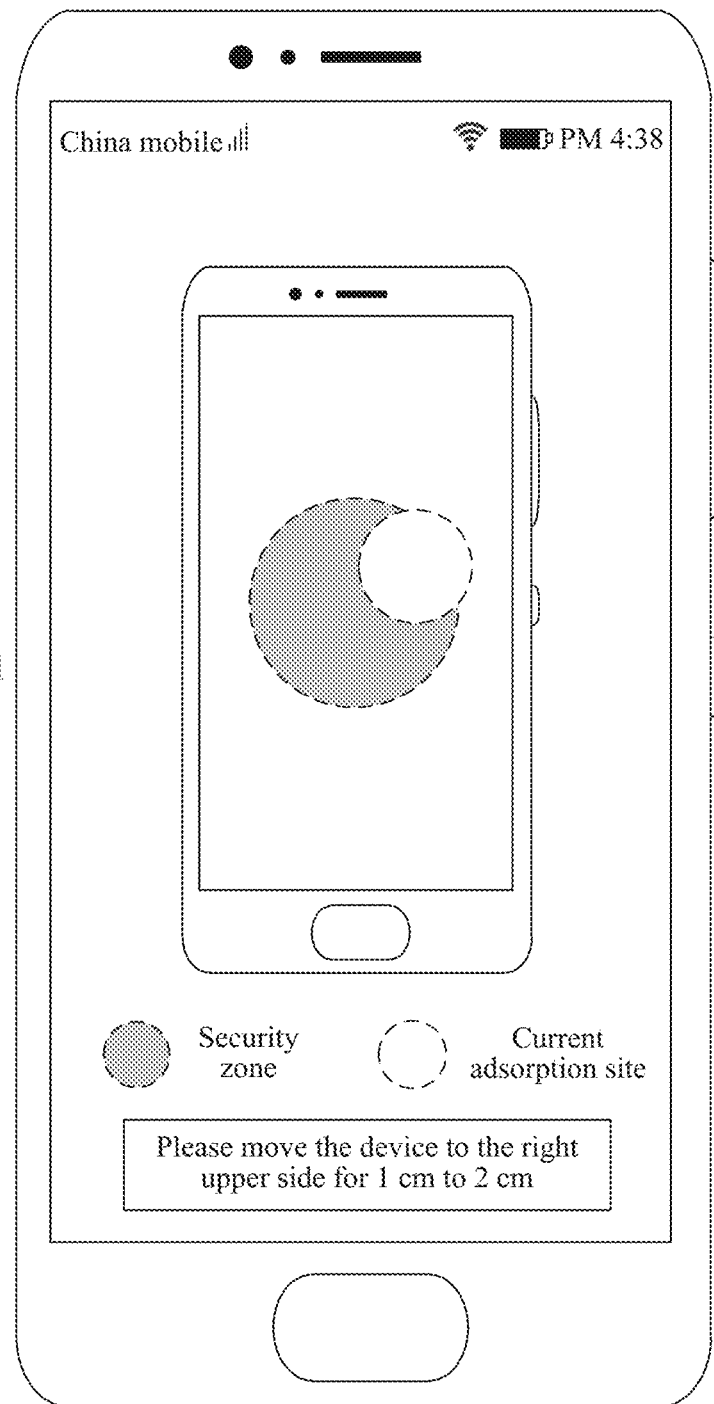
Figures 3, 7B:
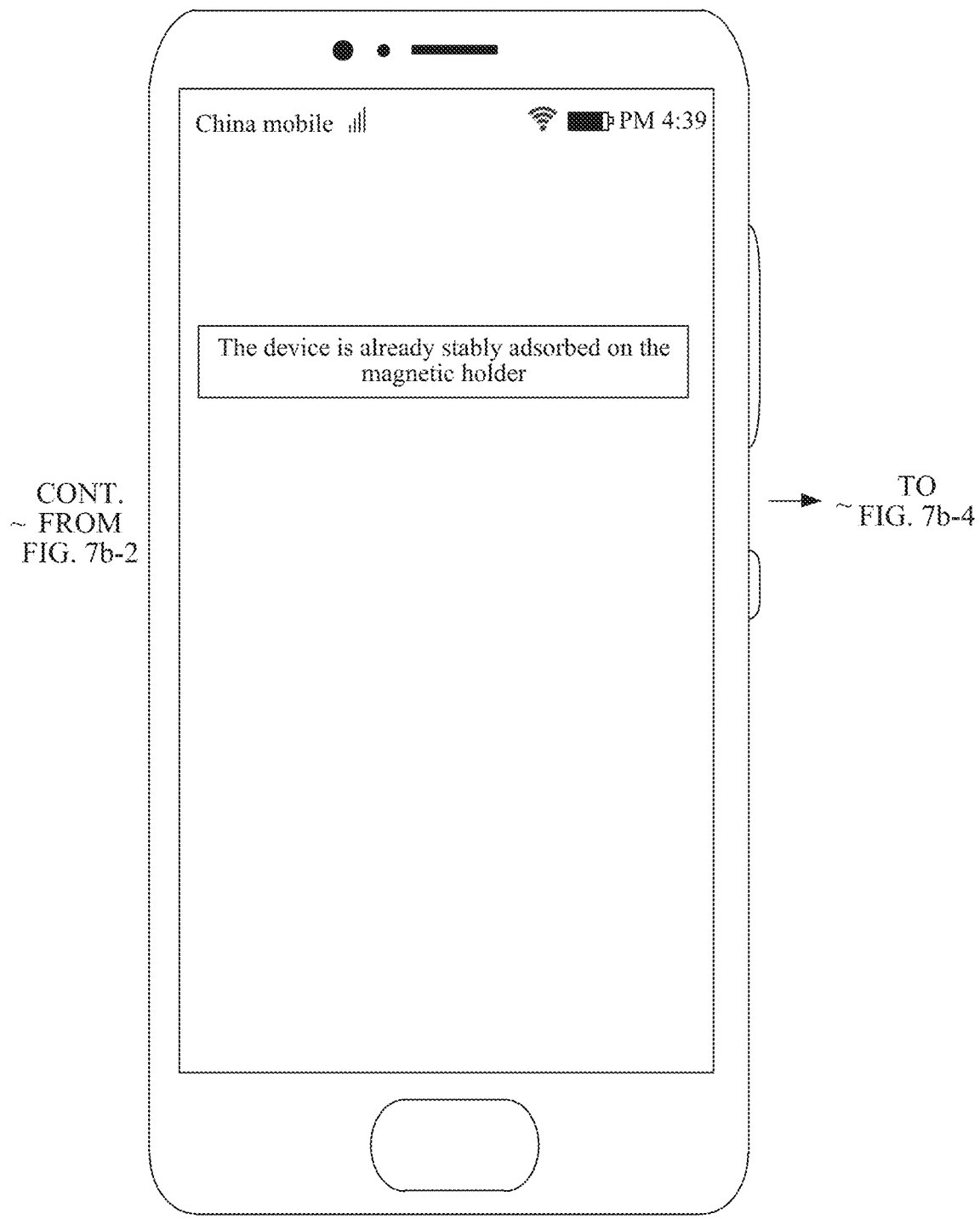
Figures 4, 7B:
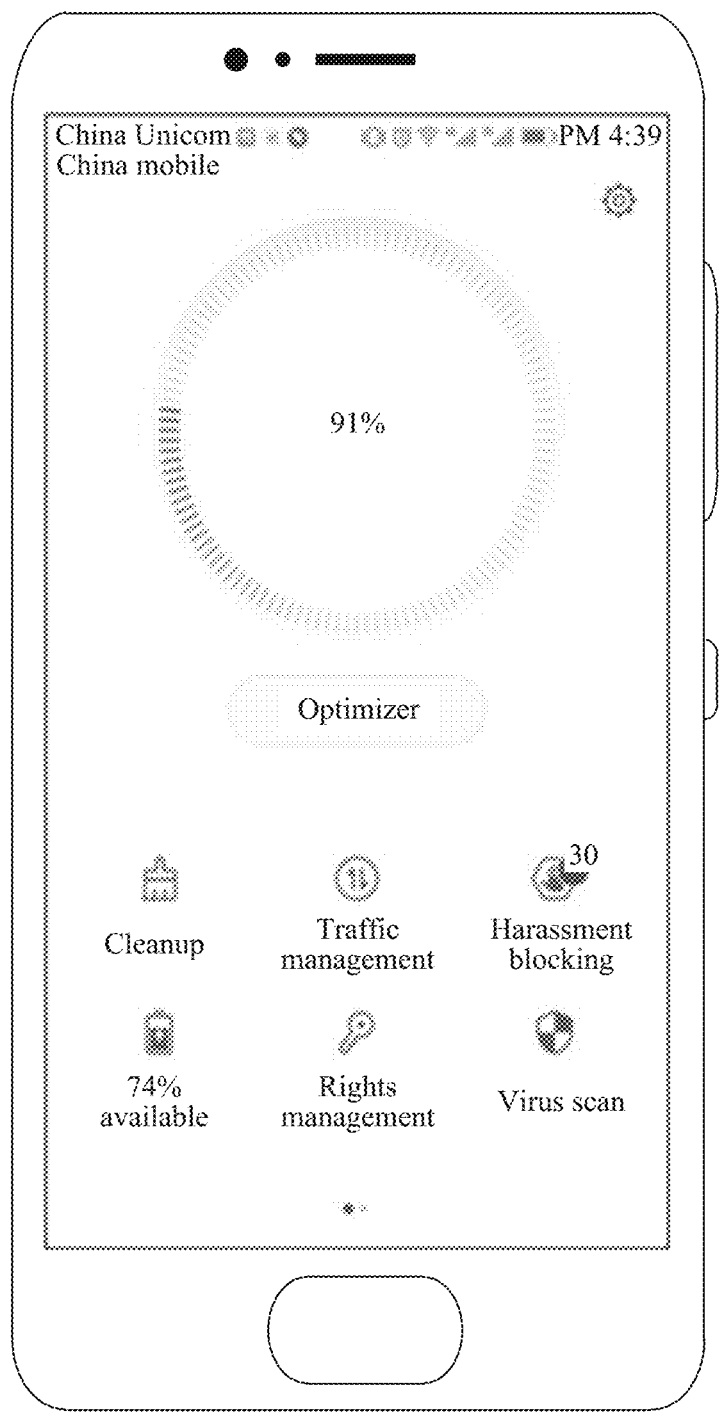

For example, as shown in FIG. 7a-1 to FIG. 7a-3, the portable device displays an application interface on the display. The portable device detects that a parameter related to a magnetic induction intensity deviates from a preset threshold range, stops displaying the interaction interface when, before, or after outputting a voice prompt, and displays, on the display, the text indicating the moving direction, the security zone, and the current adsorption site of the portable device, where the text, the security zone, and the current adsorption site are shown in FIG. 4a-1 to FIG. 4a-3. The portable device outputs the voice prompt information "the device is already stably absorbed on the magnetic holder" when detecting that the parameter related to the magnetic induction intensity is in the preset threshold range and displays the application interface. Alternatively, as shown in FIG. 7b-1 to FIG. 7b-4, the portable device displays the prompt information "the device is already stably absorbed on the magnetic holder" on the display, and displays the application interface.

It should be noted that in this embodiment of this application, step S530 may further be: The portable device displays the interaction interface when detecting that the parameter related to the magnetic induction intensity is in the preset threshold range. To be specific, the portable device may choose not to output the prompt information but to directly display the interaction interface when detecting that the parameter related to the magnetic induction intensity is in the preset threshold range. (In this case, the change in time on the top of the display, the change in the power level value, and the change in the signal strength are ignored). For example, changes of the display of the portable device are shown in FIG. 7a-1 to FIG. 7a-3.

In addition, in step S520 and step S530, in a process in which the portable device detects that the parameter related to the magnetic induction intensity deviates from the preset threshold range to the portable device detects that the parameter related to the magnetic induction intensity is in the preset threshold range, the portable device may display the current adsorption site of the portable device on the magnetic holder and the security zone, on the display in real time, to facilitate quickly moving the portable device to the security zone by a user.

Figures 1, 7C:
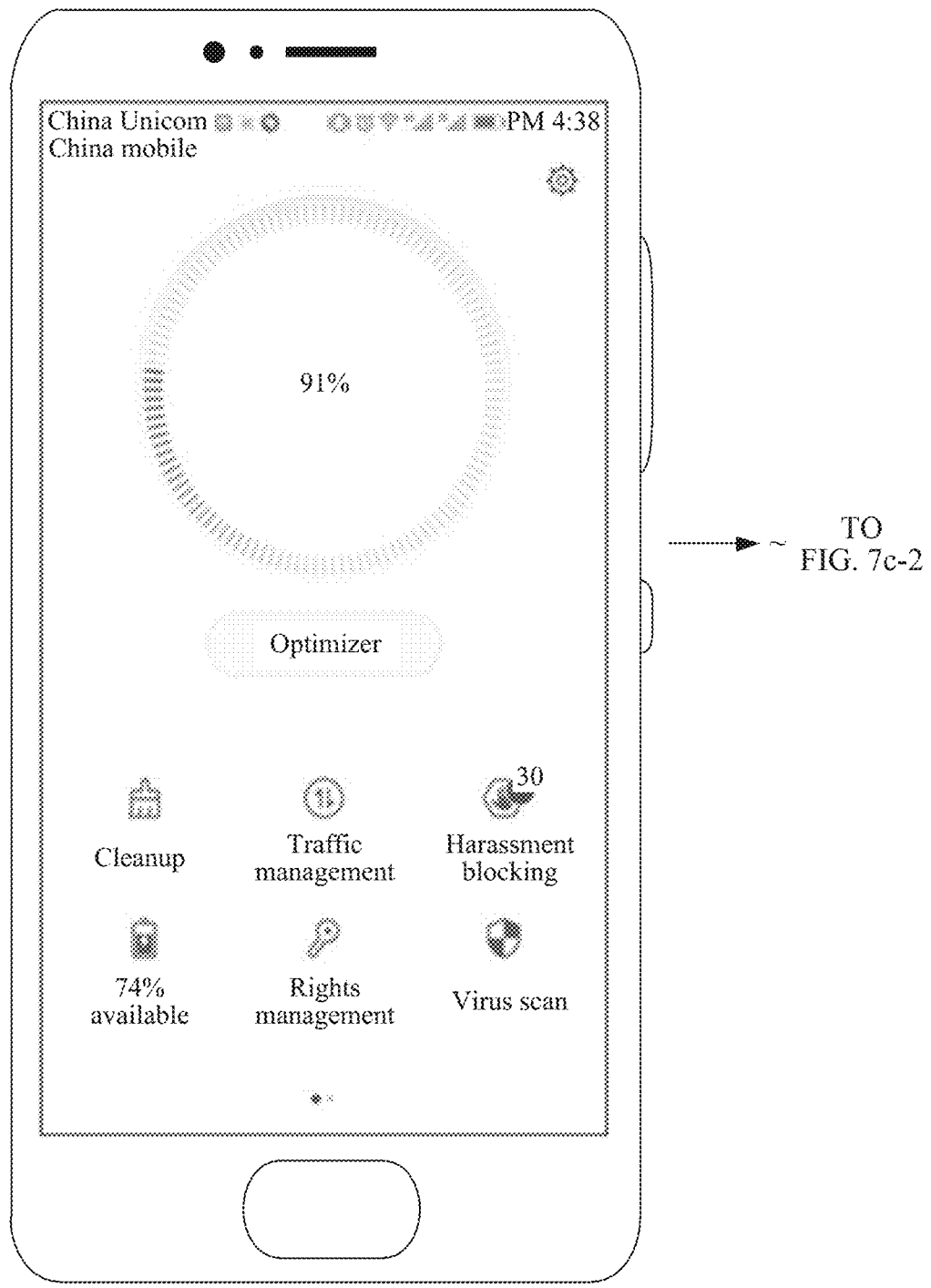
Figures 2, 7C:
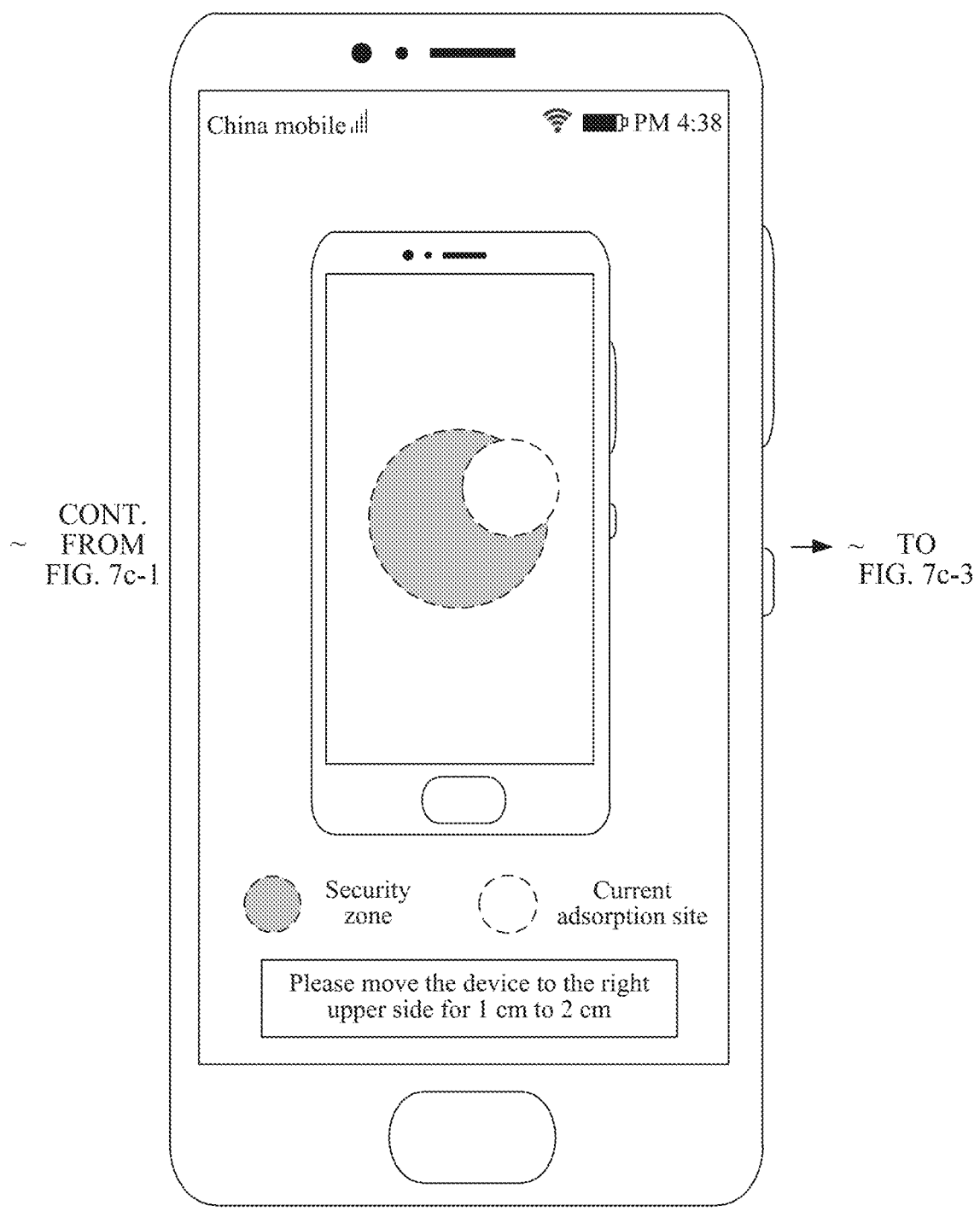
Figures 3, 7C:
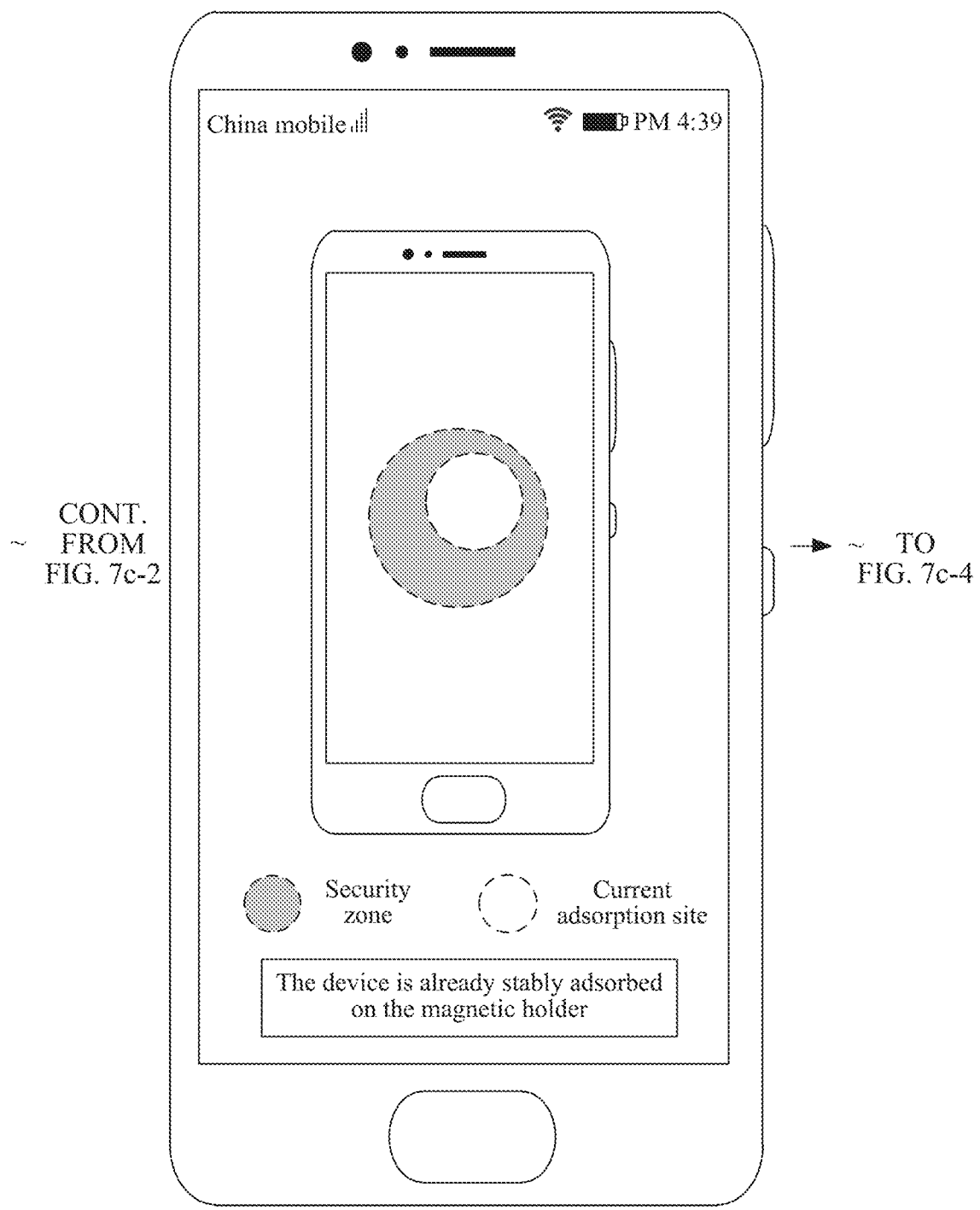
Figures 4, 7C:
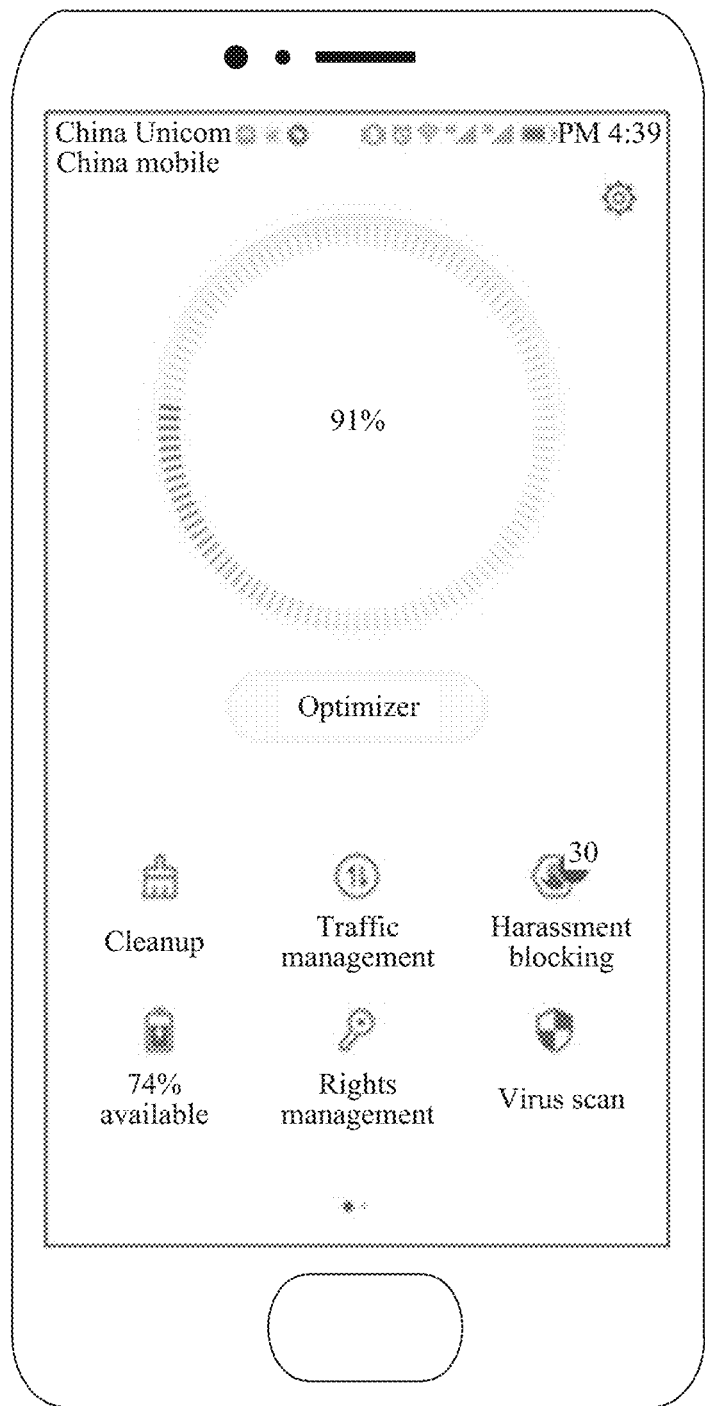

For example, as shown in FIG. 7c-1 to FIG. 7c-4, the portable device displays an application interface on the display. The portable device detects that a parameter related to a magnetic induction intensity deviates from a preset threshold range, stops displaying the interaction interface when, before, or after outputting a voice prompt, and displays, on the display, the text indicating the moving direction, the security zone, and the current adsorption site of the portable device, where the text, the security zone, and the current adsorption site are shown in FIG. 4c-1 to FIG. 4c-4. The portable device detects that the parameter related to the magnetic induction intensity is in the preset threshold range, displays the security zone and a current updated adsorption site of the portable device on the display, displays the prompt information "the device is already stably absorbed on the magnetic holder", and displays the application interface.

Alternatively, the portable device detects that the parameter related to the magnetic induction intensity deviates from the threshold range, displays, on the display, the current adsorption site of the portable device on the magnetic holder and the security zone. The user moves the location of the portable device, but a parameter that is related to the magnetic induction intensity and that is of a portable device whose location has been moved still deviates from the threshold range. Therefore, the portable device displays the updated adsorption site and the security zone on the display. Then the user moves the portable device again to a proper location, and when detecting that the parameter related to the magnetic induction intensity is in the threshold range, the portable device does not display the updated adsorption site and the security zone any more, but displays the interaction interface, or outputs the prompt information and displays the interaction interface.

Figures 1, 7D:
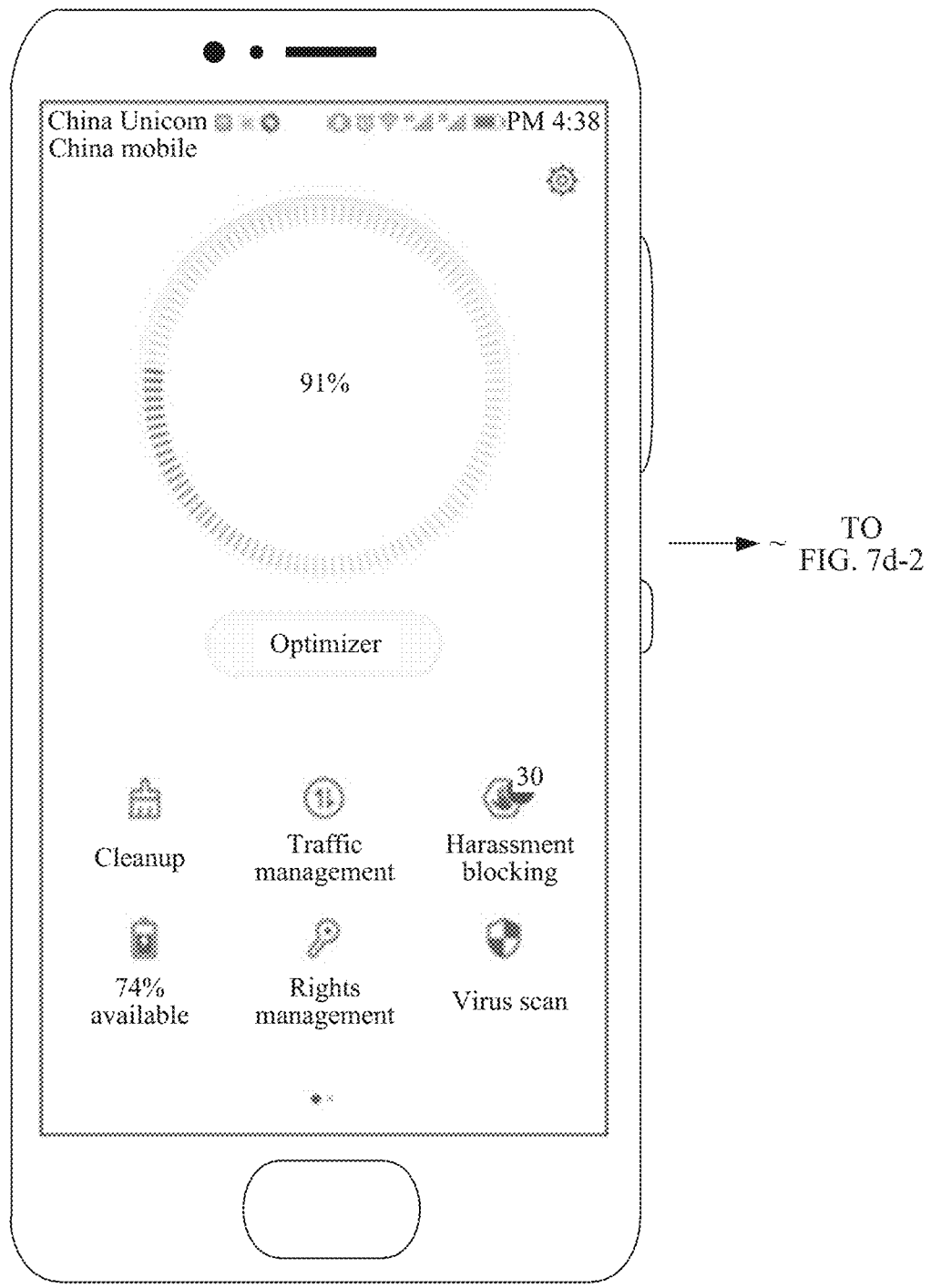
Figures 2, 7D:
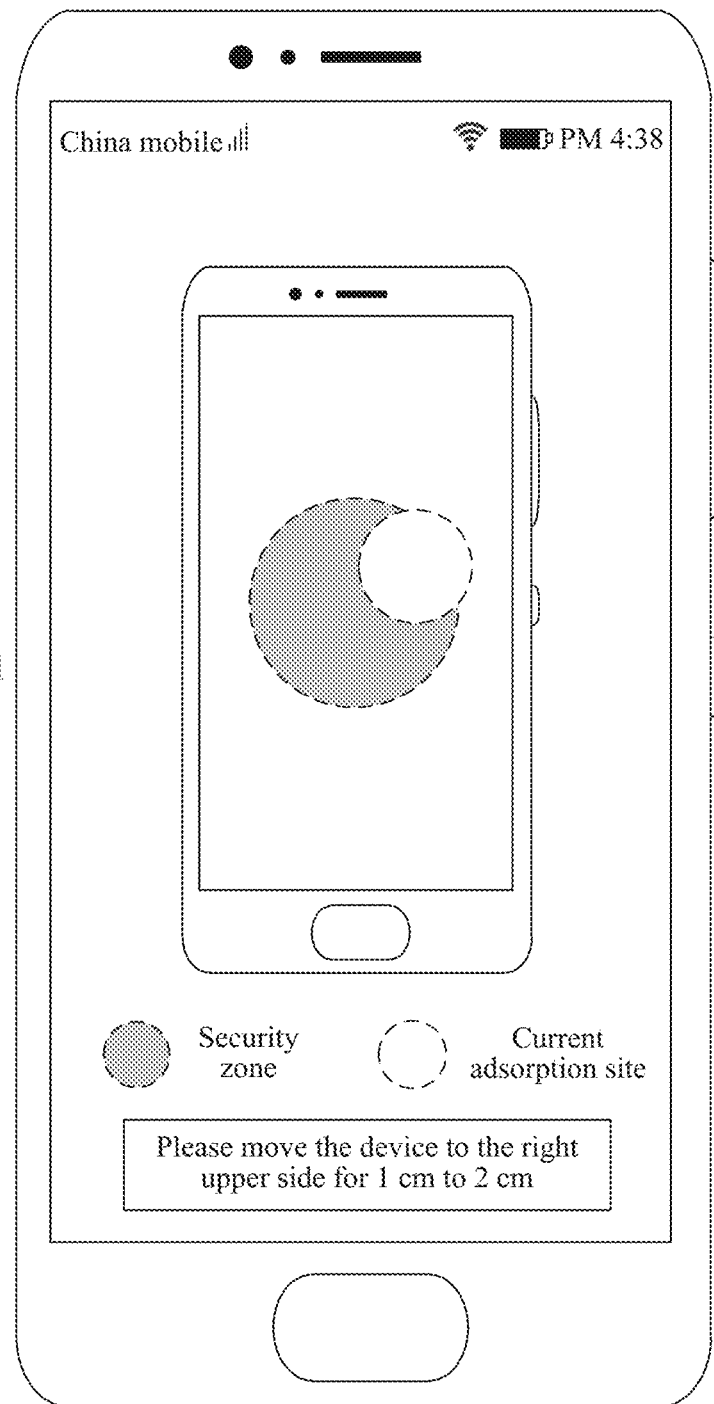
Figures 3, 7D:
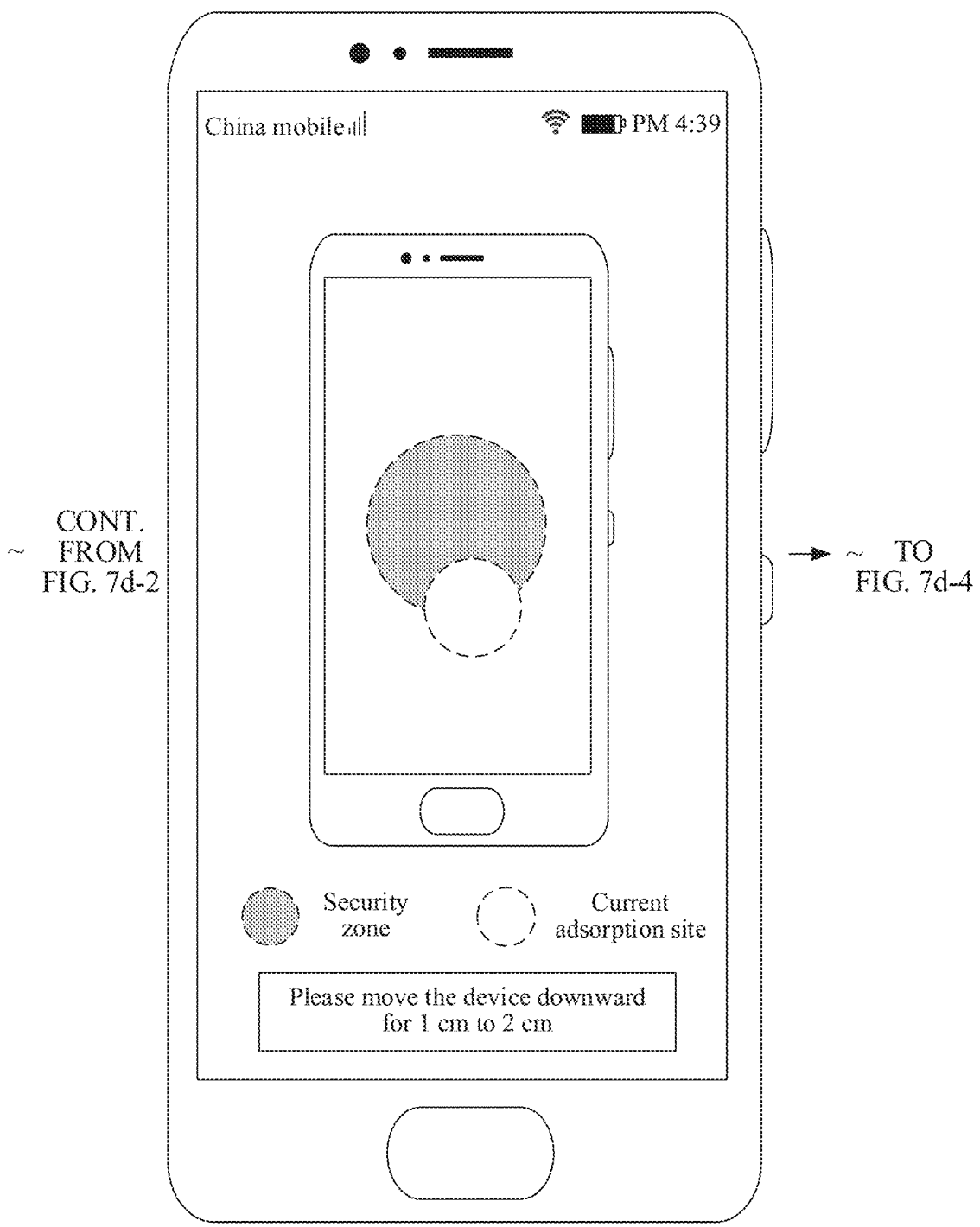
Figures 4, 7D:
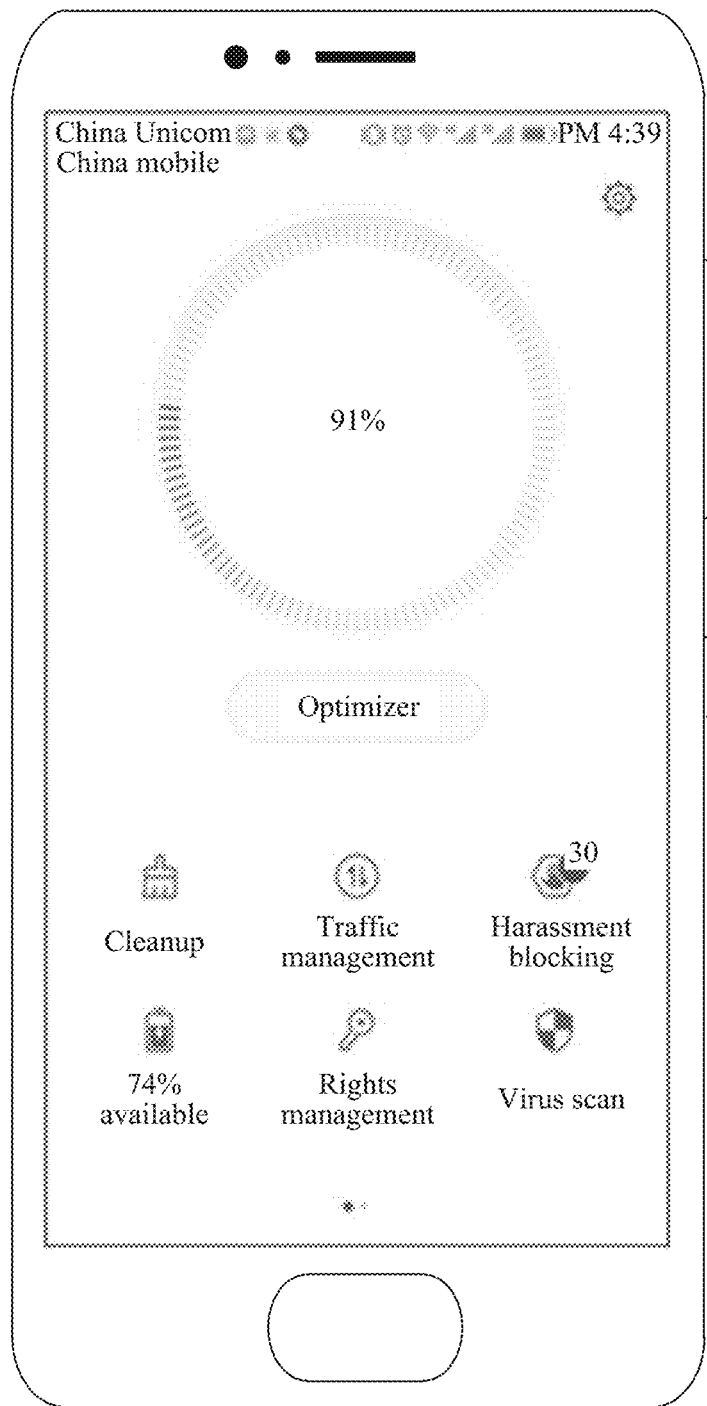

For example, as shown in FIG. 7d-1 to FIG. 7d-4, the portable device displays an application interface on the display. The portable device detects that a parameter related to a magnetic induction intensity deviates from a preset threshold range, and when, before, or after outputting a voice prompt, displays, on the display, the text indicating the moving direction, the security zone, and the current adsorption site of the portable device, where the text, the security zone, and the current adsorption site are shown in FIG. 4d-1 to FIG. 4d-4. The user moves a location of the portable device, but a parameter that is related to the magnetic induction intensity and that is of a portable device whose location has been moved still deviates from the threshold range. Therefore, the portable device displays, on the display, a text "please move the device downward for 1 cm to 2 cm" that indicates a moving direction and that is updated, an updated adsorption site, and the security zone. Then the user moves the portable device again to a proper location, and the portable device detects that the parameter related to the magnetic induction intensity is in the threshold range, and displays the application interface.

Step S520 may further be: The portable device detects that the parameter related to the magnetic induction intensity deviates from the preset threshold range, and further outputs the prompt information when, before, or after outputting the voice prompt. Correspondingly, step S530 may be: The portable device stops displaying the prompt information about moving the portable device when detecting that the parameter related to the magnetic induction intensity is in the preset threshold range.

Figure 7E:
FIG. 7e is a schematic diagram of yet still another interface change of a display according to an embodiment of this application.

For example, as shown in FIG. 7e, the portable device displays an unlock interface on the display. The portable device detects that a parameter related to a magnetic induction intensity deviates from a preset threshold range, when, before, or after outputting a voice prompt, displays a text "please move the device to the right upper side for 1 cm to 2 cm" indicating a moving direction, on an upper side of the interaction interface, and stops displaying the prompt information about moving the portable device when detecting that the parameter related to the magnetic induction intensity is in the preset threshold range.

In addition, in step S520 and step S530, when outputting the prompt information, where the outputting the prompt information includes outputting the voice prompt and displaying the prompt information on the display, the portable device may be in a locked state or an unlocked state.

By using the prompt method that is provided in the embodiments of this application and that is applied to the portable device adsorbed on the magnetic holder, the display of the portable device is in the interaction interface, and the portable device determines, by detecting that the parameter related to the magnetic induction intensity deviates from the preset threshold range, that absorption of the portable device on the magnetic holder is unstable, and then outputs the voice prompt. The portable device stops displaying the interaction interface when, before, or after outputting the voice prompt, and displays, on the display, the prompt information about moving the portable device, so that a user can move the portable device in time. Therefore, the portable device can be stably adsorbed on the magnetic holder, thereby effectively preventing the portable device from sliding down from the magnetic holder.

In the foregoing implementations, step S220 and step S230 both include that the portable device detects that the parameter related to the magnetic induction intensity deviates from the preset threshold range, and step S520 and step S530 both include that the portable device detects that the parameter related to the magnetic induction intensity is in the preset threshold range. The following describes how the portable device detects that the parameter related to the magnetic induction intensity deviates from the preset threshold range or is in the preset threshold range.

Figure 8:
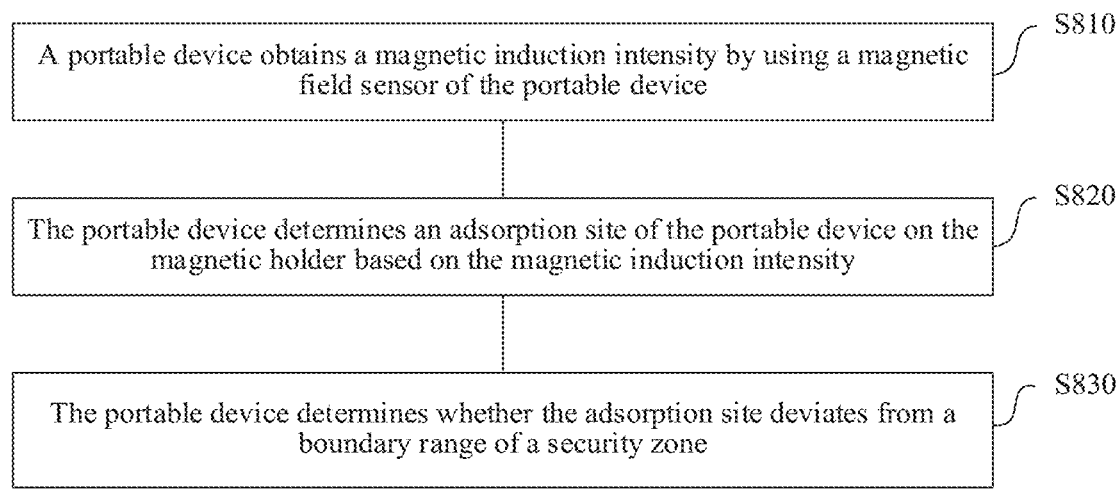
FIG. 8 is a flowchart of a detection method according to an embodiment of this application.

FIG. 8 is a flowchart of a detection method according to an embodiment of this application. In this embodiment, a parameter related to a magnetic induction intensity may be an adsorption site of a portable device, and a preset threshold range may be a boundary range of a security zone. As shown in FIG. 8, the method includes the following steps.

Step S810. The portable device obtains the magnetic induction intensity by using a magnetic field sensor of the portable device.

The magnetic induction intensity is a physical quantity describing magnetic field strength and a magnetic field direction, and is a vector. A magnetic field exists around magnets included in a magnetic holder. The magnetic field is a vector field continuously distributed in a space area, and different location points in this space area have different magnetic induction intensity vectors.

The magnetic field sensor detects a magnetic field in which the magnetic field sensor is located, by using a magnetic sensitive element and a transforming element that are included in the magnetic field sensor. The magnetic sensitive element can sensitively sense a change in the magnetic field in which the magnetic sensitive element is located, and responds to the change. The transforming element can output the response of the magnetic sensitive element, and convert the response into a group of digital signals suitable for transmission and measurement. The group of digital signal may include component values of the magnetic induction intensity in a plurality of directions. For example, the plurality of directions may be an axis of an X-axis, a Y-axis, and a Z-axis in a Cartesian coordinate system shown in FIG. 9. For example, the magnetic induction intensity detected by the magnetic field sensor is ($M_X$, $M_Y$, $M_Z$). Alternatively, the plurality of directions is an axis of a coordinate axis in another coordinate system. In addition, the magnetic induction intensity measured by the magnetic field sensor may be a magnetic induction intensity at one moment, and may also be a magnetic induction intensity within a period of time.

The magnetic field that exists around the magnetic field sensor includes a magnetic field generated by the magnetic holder, and usually further includes other magnetic fields, for example, a geomagnetic field and a magnetic field that is generated by a magnetic part inside the portable device, and the magnetic induction intensity caused by the magnetic fields may change regularly in a period of time, Therefore, when obtaining the magnetic induction intensity by using the magnetic field sensor of the portable device, the portable device may obtain the magnetic induction intensity at one moment, and may also obtain the magnetic induction intensity within a period of time, and calculate an average value of the magnetic induction intensity in the period of time, to improve accuracy of the obtained magnetic induction intensity.

Step S820. The portable device determines an adsorption site of the portable device on the magnetic holder based on the magnetic induction intensity.

For example, the adsorption site may be represented by relative displacement vectors of the portable device and the magnetic holder. The portable device may determine the relative displacement vector of the portable device and the magnetic holder based on the obtained magnetic induction intensity and a function relationship between the magnetic induction intensity and the relative displacement vector.

The magnets in the magnetic holder are a magnetic field source, and a magnetic field generated by the magnets in the magnetic holder is a vector field continuously distributed in a space area, and different location points in this space area have different magnetic induction intensities. When the magnetic field generated by the magnets in the holder is constant, a magnetic induction intensity at any point in the space may only be determined. To be specific, the magnetic induction intensity at any point in the space and a relative location vector of the point and the magnets in the holder have a one-to-one correspondence.

The magnets in the magnetic holder may be a magnet. A magnetic field generated by the magnet is related to factors such as a shape, a dimension, and a component of the magnet. When the factors do not change, distribution of the magnetic fields generated by the magnets in the space is constant. The magnets in the magnetic holder may also be an energized coil, and a magnetic field generated by the coil is related to factors such as a quantity, a dimension, a component, and a current of the coil. When the factors do not change, the magnetic field generated by the magnets in the space is also constant.

The magnetic field sensor of the portable device is an object of a certain dimension, a location in which the magnetic field sensor is located is an area, and the magnetic induction intensity detected by the magnetic field sensor is a comprehensive expression of a magnetic induction intensity vector of a location area in which the magnetic field sensor is located.

Because the location of the magnets in the magnetic holder is fixed and the location of the magnetic field sensor in the portable device is also fixed, the magnetic field induction intensity $(M_X, M_Y, M_Z)$ that is at a location in which the magnetic field sensor is located and that is detected by the magnetic field sensor and the relative displacement vector $(R_X, R_Y, R_Z)$ of the portable device including the magnetic field sensor and the magnetic holder have a one-to-one correspondence, and a function expression may be $(R_X, R_Y, R_Z)=f(M_X, M_Y, M_Z)$. Therefore, the portable device may determine the relative location vector of the portable device and the magnetic holder based on the function relationship and the magnetic induction intensity detected by the magnetic field sensor.

Figure 10A:
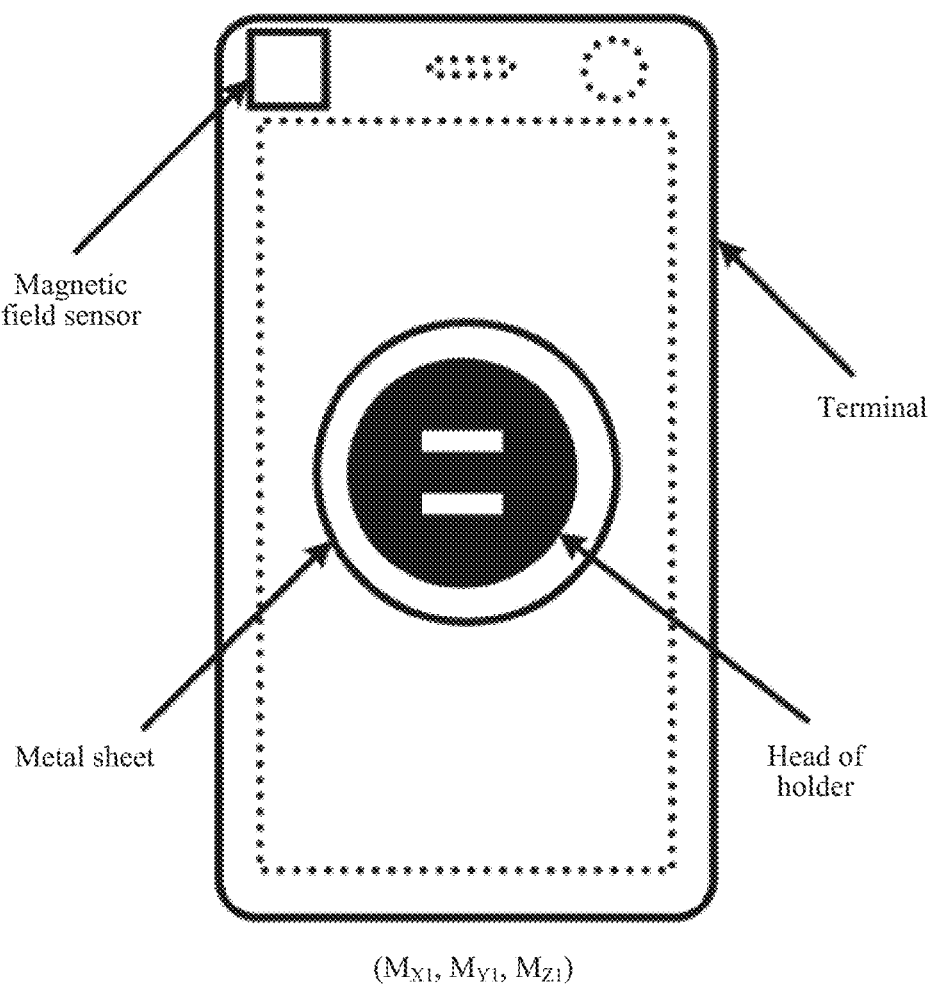
FIG. 10a is a schematic diagram showing that a portable device and a magnetic holder have different relative locations according to an embodiment of this application.
Figure 10B:
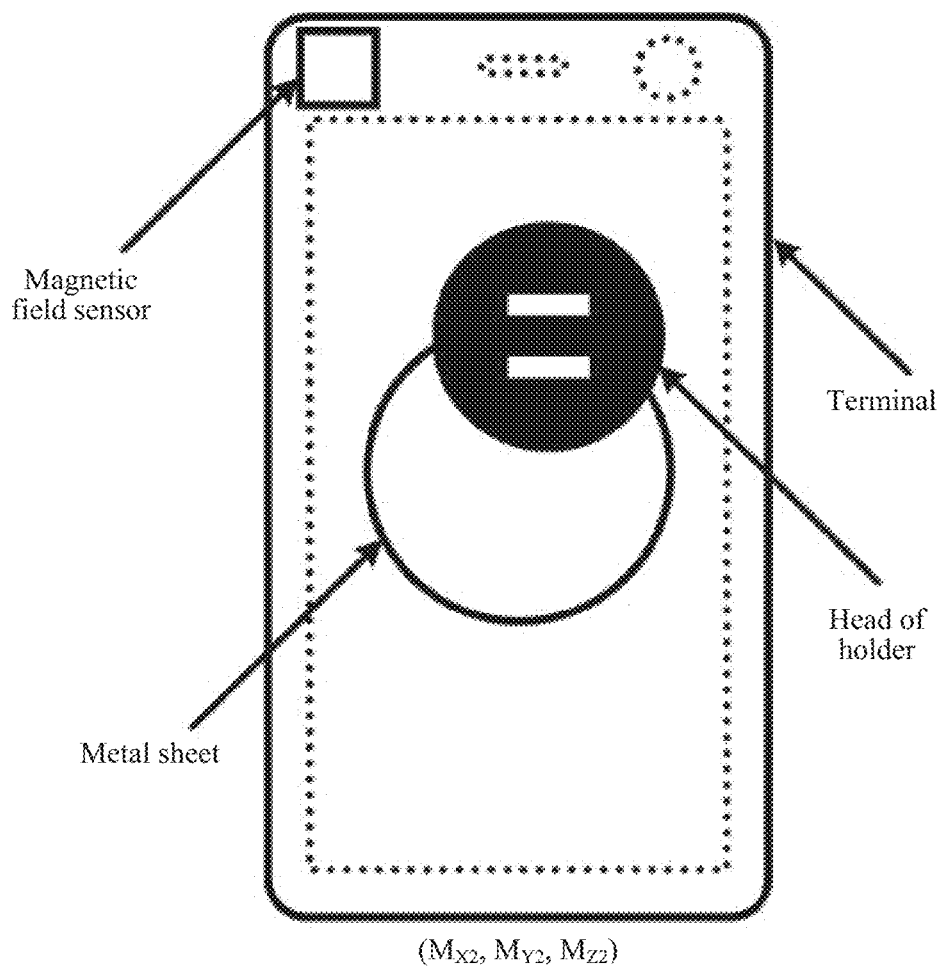
FIG. 10b is a schematic diagram showing that a portable device and a magnetic holder have different relative locations according to an embodiment of this application.
Figure 10C:
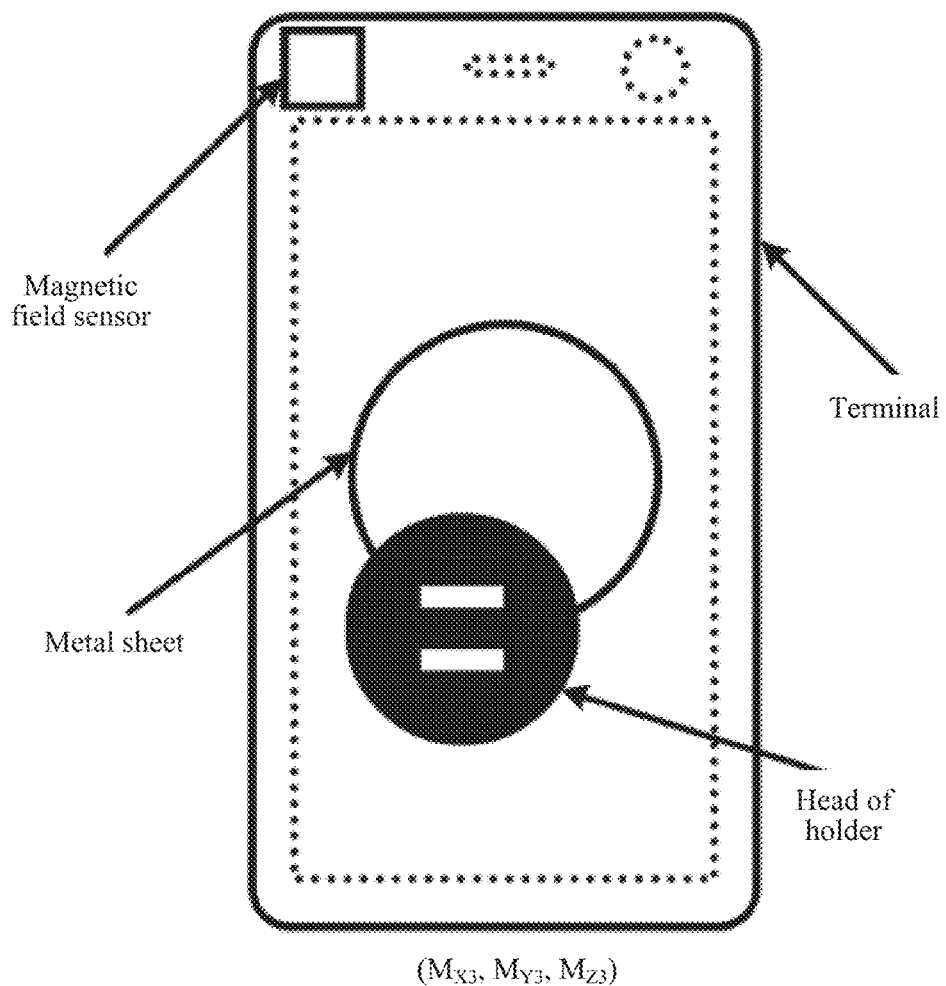
FIG. 10c is a schematic diagram showing that a portable device and a magnetic holder have different relative locations according to an embodiment of this application.

In an example, as shown in FIG. 10a, FIG. 10b, and FIG. 10c, viewing from a housing on a back facet of the portable device, the magnetic field sensor is located on the left upper side of the portable device. The portable device and the magnetic holder including the magnets perform magnetic adsorption by using a circular metal sheet bounded on the housing of the portable device. A circle center of the circular metal sheet is located on a center line of the back facet of the portable device, the magnet of the holder is located at a head position of the magnetic holder (the head position of the magnetic holder is referred to as a head of the holder for short below), and a shape of the head of the holder is a circle. In FIG. 10a, a circle center of the head of the holder overlaps with the circle center of the metal sheet, and the magnetic induction intensity that is detected by the magnetic field sensor and that is at the location in which the magnetic field sensor is located is $(M_{X1}, M_{Y1}, M_{Z1})$. In FIG. 10b, the head of the holder is located at the right upper side of the metal sheet, and the magnetic induction intensity that is detected by the magnetic field sensor and that is at the location in which the magnetic field sensor is located is $(M_{X2}, M_{Y2}, M_{Z2})$. In FIG. 10c, the head of the holder is located at the left bottom side of the metal sheet, and the magnetic induction intensity that is detected by the magnetic field sensor and that is at the location in which the magnetic field sensor is located is $(M_{X3}, M_{Y3}, M_{Z3})$. Based on the magnetic induction intensity $(M_{X1}, M_{Y1}, M_{Z1})$, $(M_{X2}, M_{Y2}, M_{Z2})$, and $(M_{X3}, M_{Y3}, M_{Z3})$ that are detected by the magnetic field sensor at different locations, and the function relationship $(R_X, R_Y, R_Z)=f(M_X, M_Y, M_Z)$ of the relative location vector of the portable device and the magnetic holder, it may be obtained that the relative displacement vectors of the portable device and the magnetic holder are separately $(R_{X1}, R_{Y1}, R_{Z1})$, $(R_{X2}, R_{Y2}, R_{Z2})$, and $(R_{X3}, R_{Y3}, R_{Z3})$.

Step S830. The portable device determines whether the adsorption site deviates from the boundary range of the security zone.

In this step, the security zone may be obtained through a test, and a shape of the security zone may be set to a shape such as a circle, a quadrate, a rectangularity, a sector, or a trapezoid. The shape of the security zone may be set before the test, or may be set after the test based on a test result. The test may include: after selecting the magnetic holder and the portable device on which the metal sheet is adsorbed, placing the portable device on the holder, applying a load whose intensity is Q on an integral part including the portable device and the holder, and determining the security zone based on a location in which relative offset does not appear on the portable device and the holder under the load at a probability greater than P. That the relative offset appears on the portable device and the holder may include that the portable device looses or falls down from the holder. A type of the load may be vibration, an instantaneous force, an instantaneous torque, and the like. The intensity Q of the load and the probability P may be set based on a test standard (for example, a national standard or an industrial standard). The security zone may be represented by using the relative displacement vector of the holder and the portable device.

For example, the security zone is set to be a circle. Specifically, the circle center of the metal sheet is set to be a center, and the circular area having a radius of $D_0$ is the security zone. The test of determining the security zone may include: fixing the magnetic holder on a shock testing machine through a holder seat of the magnetic holder, and bounding the circular metal sheet on a center location of the housing on the back facet of the portable device. To be specific, the circle center of the circular metal sheet is located at a center line of the back facet of the portable device. In addition, the portable device is placed on the circular head of the holder, and a specific placing location of the portable device on the holder may be adjusted continuously based on the test. Then a shock load having an intensity of 10 N is applied on the holder on which the portable device is placed, and a distance between the circle center of the metal sheet and the circle center of the head of the holder is adjusted continuously, to determine a longest distance between the circle center of the metal sheet and the circle center of the head of the holder when the portable device does not fall down from the holder at a probability greater than 95% under an instantaneous shock load of 10 N, and the radius $D_0$ of the security zone is determined based on the distance.

Figure 11A:
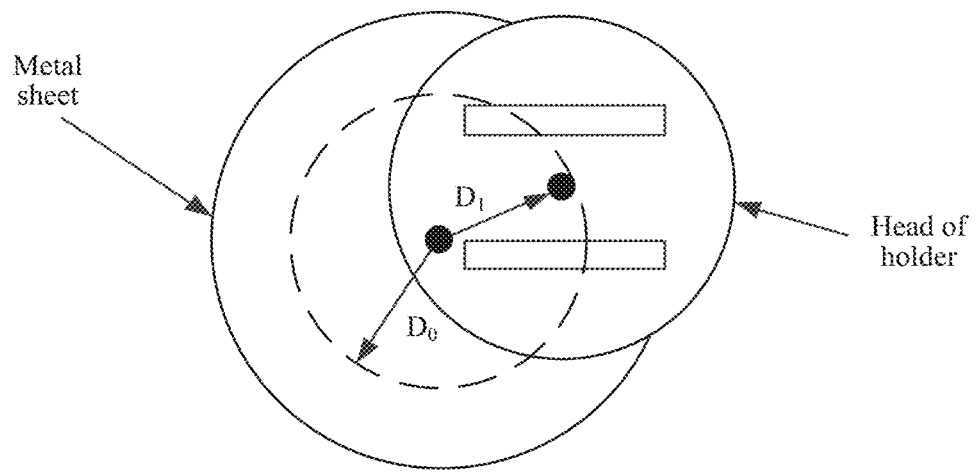
FIG. 11a is a schematic diagram showing that a portable device is adsorbed on a security zone on a magnetic holder according to an embodiment of this application.
Figure 11B:
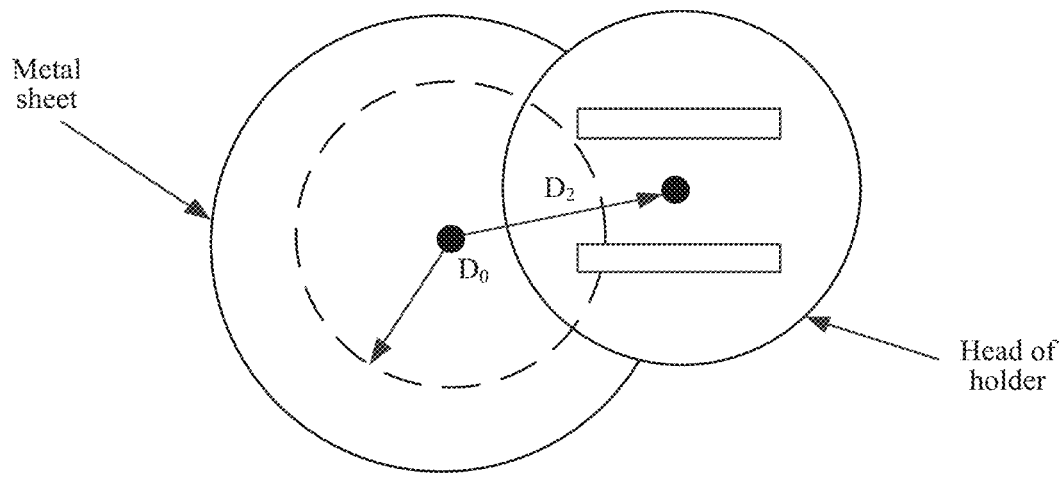
FIG. 11b is a schematic diagram showing that a portable device is adsorbed on a security zone on a magnetic holder according to an embodiment of this application.

In an example, as shown in FIG. 11a and FIG. 11b, the head of the holder of the magnetic holder and the metal sheet attached on the portable device are both circular. A security zone in which the portable device and the holder perform magnetic adsorption is a circular area in which the center of the metal sheet is the circle center and $D_0$ is the radius. The adsorption site that is determined by the portable device and in which the portable device is on the magnetic holder may be represented by a distance D between the circle center of the metal sheet and the circle center of the head of the holder. For example, the portable device may calculate the distance D between the circle center of the metal sheet and the circle center of the head of the holder based on the relative location vector that is determined by the portable device and that is of the portable device and the magnetic holder. Then the portable device determines whether the portable device deviates from the boundary range of the security zone based on the radius $D_0$ of the security zone and the adsorption site D. In FIG. 11a, the adsorption site of the portable device is D1, and the portable device determines that D1<$D_0$. To be specific, the adsorption site of the portable device is in the boundary range of the security zone. In FIG. 11b, the adsorption site is D2, and the portable device determines that D2>$D_0$. To be specific, the adsorption site of the portable device deviates from the boundary range of the security zone.

Figure 11C:
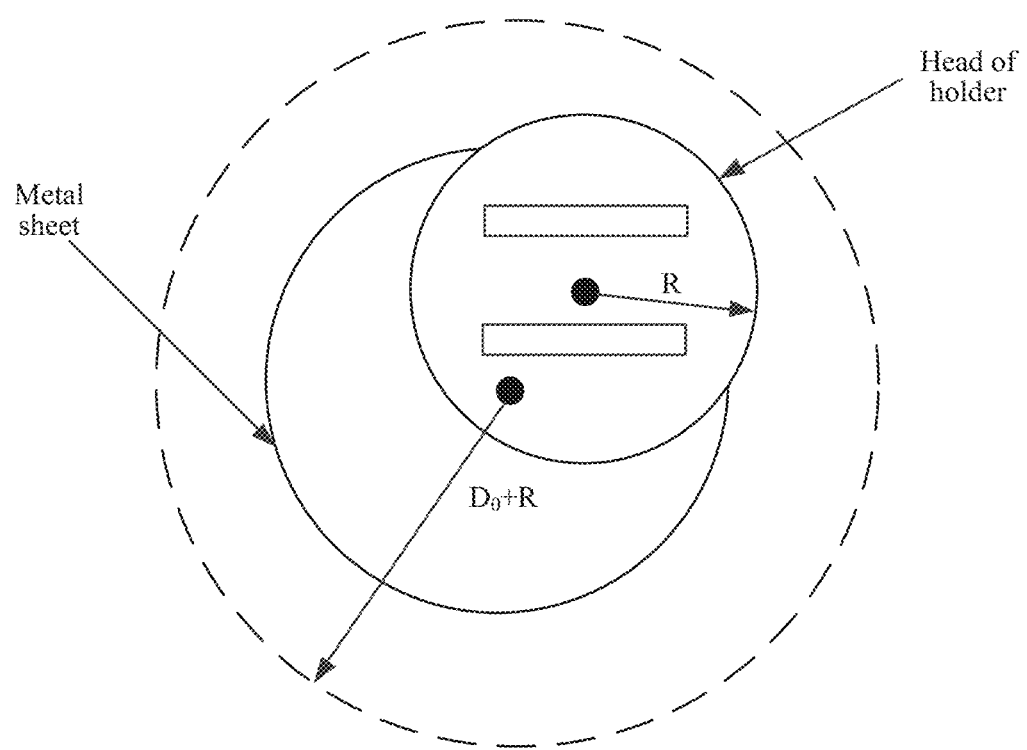
FIG. 11c is a schematic diagram showing that a portable device is adsorbed on a security zone of a magnetic holder according to an embodiment of this application.

In another example, as shown in FIG. 11c and FIG. 11d, the radius of the head of the holder is R, and a security zone in which the portable device and the holder perform magnetic adsorption is a circular area in which the center of the metal sheet is the circle center and ($D_0$+R) is the radius. The adsorption site of the portable device may be represented by the location of the head of the holder. For example, in FIG. 11c, an entire part of the head of the holder is located in the security zone. To be specific, the adsorption site of the portable device is in the boundary range of the security zone. In FIG. 11d, a part of the head of the holder is located outside the security zone. To be specific, the adsorption site of the portable device deviates from the boundary range of the security zone.

In this embodiment of this application, optionally, before step S810, the method may further include step S800: Receive a first indication message input by a user, where the message is used to instruct the portable device to detect whether a parameter related to a magnetic induction intensity deviates from a preset threshold range.

The user may input the indication message in a plurality of manners. For example, the user may input the indication message by tapping or touching a button (the button may be virtual or physical) of the portable device or a display; the user may input the indication message in a manner of voice input; or the user may input the indication message by controlling a moving track of the portable device.

In this manner, the portable device may obtain the magnetic induction intensity by using the magnetic field sensor of the portable device after receiving the indication message input by the user, so that a working time of the magnetic field sensor is reduced, thereby prolonging an operating time of the magnetic field sensor and saving power of the portable device.

Optionally, after step S830, the method may further include: receiving, by the portable device, a second indication message input by the user, where the indication message is used to instruct the portable device to stop determining whether the adsorption site deviates from the boundary range of the security zone.

Optionally, before step S820, the method may further include a predetermining step: determining, by the portable device, whether there is a need to detect whether the adsorption site deviates from the boundary range of the security zone. In addition, the predetermining step may include: determining, by the portable device, whether the portable device collides with the holder, and further determining whether the action of collision is the magnetic adsorption when the portable device determines that the portable device collides with the holder. If the action is the magnetic adsorption, whether the adsorption site deviates from the boundary range of the security zone needs to be detected. If the action is not the magnetic adsorption, whether the adsorption site deviates from the boundary range of the security zone does not need to be detected.

In this manner, if not receiving the indication message input by the user, the portable device further automatically detects whether the adsorption site deviates from the boundary range of the security zone when determining that whether the adsorption site deviates from the boundary range of the security zone needs to be detected, thereby reducing operations of the user, and improving user experience.

For example, the determining, by the portable device, whether the portable device collides with the holder may include: reading, by the portable device, acceleration data obtained by an acceleration sensor of the portable device; determining whether the acceleration data matches a collision model; determining that the portable device collides with the holder if the acceleration data matches the collision model; and determining that the portable device does not collide with the holder if the acceleration data does not match the collision model.

Figure 9:
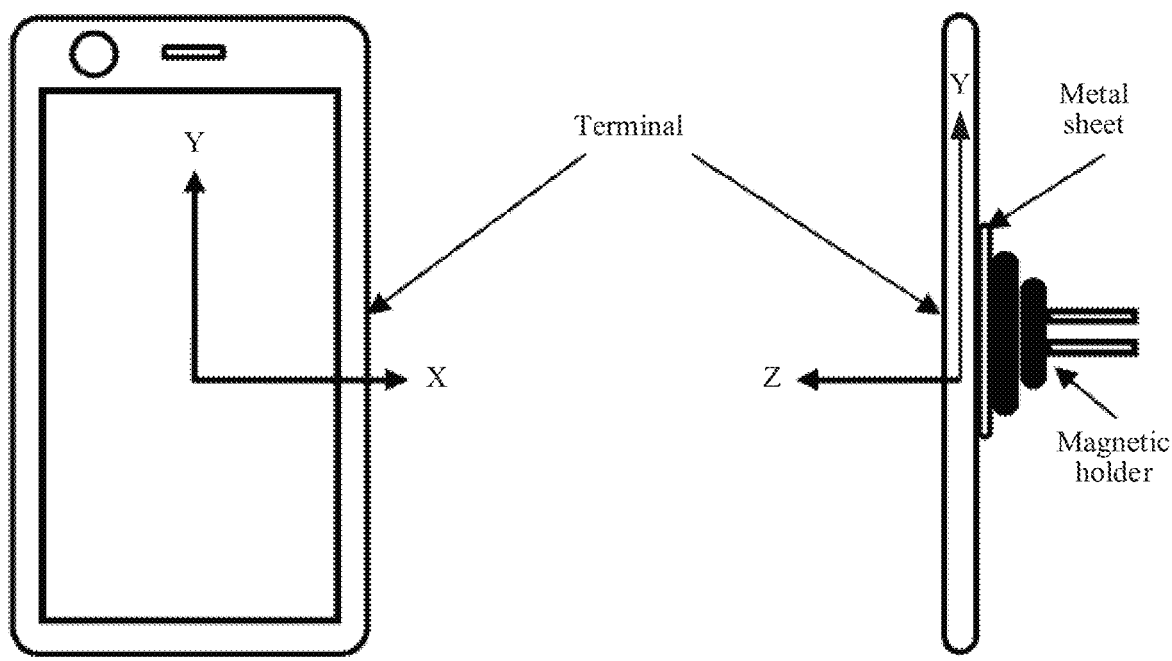
FIG. 9 is a schematic diagram of a coordinate axis definition of a portable device according to an embodiment of this application.

In an example, the acceleration data obtained by the acceleration sensor includes acceleration components in a plurality of directions and combination values of different components of the acceleration data, and the plurality of directions may be directions of an X-axis, a Y-axis, and a Z-axis in a Cartesian coordinate system shown in FIG. 9. The collision model includes feature values of an acceleration generated by the portable device in a process of the portable device colliding with the holder. In addition, the feature values of the acceleration include feature values of acceleration components in a plurality of directions, and a combination of feature values of different acceleration components. The determining, by the portable device, whether the acceleration data matches the collision model may include determining whether the acceleration components and the combination values in the acceleration data match the feature values and the combination of feature values of the acceleration components in the collision model. If the acceleration data does not match the collision model, it is determined that the portable device does not collide with the holder. If the acceleration data matches the collision model, it is determined that the portable device collides with the holder. Because the acceleration data generated when the portable device collides with another object may also match a model of which the portable device collides with the holder, for example, when the user puts the portable device in a pocket of clothes, the portable device collides with a key of the portable device in the pocket, the acceleration data generated through collision may match the collision model. Therefore, when determining that the portable device collides with the holder, whether the action is the magnetic adsorption needs to be further determined.

For example, when determining the action of which the portable device collides with the holder, that the portable device further determines whether the collision action is the magnetic adsorption performed by the portable device and the holder may include: obtaining, by the portable device, the magnetic induction intensity by using the magnetic field sensor of the portable device when determining that the portable device collides with the holder, obtaining a variation of the magnetic induction intensity before the collision and after the collision based on the obtained magnetic induction intensity, comparing the variation with a preset threshold, and determining a size relationship between the difference and the threshold.

For example, the variations of the magnetic induction intensity obtained by the portable device may be a variation of modulus of the magnetic induction intensity. If it is determined that the variation is greater than the threshold, it may be determined that the collision action is the magnetic adsorption. To be specific, the portable device and the holder perform magnetic adsorption. If the variation is not greater than the threshold, it may be determined that the collision action is not the magnetic adsorption. To be specific, the portable device and the holder do not perform magnetic adsorption.

For another example, the variation of the magnetic induction intensity obtained by the portable device may be variations of component values of the magnetic induction intensity in the plurality of directions, and variations of component values in each of the plurality of directions correspond to one preset threshold. If it is determined that a variation of a component value in at least one of the plurality of directions is less than a threshold corresponding to the variation in the at least one direction, it may be determined that the collision action is not the magnetic adsorption, to be specific, the portable device and the holder do not perform magnetic adsorption; or if it is determined that variations of the component values in each of the plurality of directions are not less than the threshold corresponding to the variation in the at least one direction, it may be determined that the collision action is the magnetic adsorption, to be specific, the portable device and the holder perform magnetic adsorption.

That the portable device obtains the magnetic induction intensity by using the magnetic field sensor of the portable device and obtains the variation of the magnetic induction intensity before the collision and after the collision based on the obtained magnetic induction intensity may be that the portable device obtains the magnetic induction intensity before the collision and after the collision by using the magnetic field sensor of the portable device, and calculates the variation of the magnetic induction intensity before the collision and after the collision based on the magnetic induction intensity. Alternatively, the portable device directly measures the variation of the magnetic induction intensity before the collision and after the collision by using the magnetic field sensor of the portable device.

Setting of the threshold. Because a magnetic field exists around the magnets in the holder, and the magnetic field is a vector field continuously distributed in a space area, different location points in the space area have different magnetic induction intensity, in a process of closing the magnetic holder by the portable device to colliding with the magnetic holder, a relative location of the portable device and the magnetic holder changes. Correspondingly, the portable device may set the threshold based on a change of the magnetic induction intensity that is detected by the magnetic field sensor and that is before the portable device and the holder perform the magnetic adsorption and after the portable device and the holder perform the magnetic adsorption.

In an example, the preset threshold is $M_0$. When it is determined that the portable device collides with the holder, the portable device obtains that a modulus of a magnetic induction intensity at a moment $t_1$ before the collision is $M_{t1}$, and a modulus of a magnetic induction intensity at a moment $t_2$ after the collision is $M_{t2}$, and calculates that a difference between the two modulus is $\Delta M$. Then the portable device compares $\Delta M$ with the threshold $M_0$. When $\Delta M > M_0$, the portable device may determine that the collision action is the magnetic adsorption. To be specific, the portable device and the holder perform the magnetic adsorption. When $\Delta M \leq M_0$, the portable device may determine that the collision action is not the magnetic adsorption. To be specific, the portable device and the holder do not perform the magnetic adsorption.

According to the detection method provided in this embodiment of this application, the portable device obtains the magnetic induction intensity by using the magnetic field sensor of the portable device, determines the adsorption site of the portable device on the magnetic holder through the magnetic induction intensity, and then detects whether the adsorption site deviates from the boundary range of the security zone, thereby determining stability of adsorption of the portable device on the magnetic holder.

FIG. 12 is a flowchart of another detection method according to an embodiment of this application. 1n this embodiment, a parameter related to a magnetic induction intensity may include component values of the magnetic induction intensity in a plurality of directions, and component values in each direction among the component values in the plurality of directions may correspond to one preset threshold range. As shown in FIG. 12, the method includes the following steps.

Step S1210. A portable device obtains component values of a magnetic induction intensity in a plurality of directions by using a magnetic field sensor of the portable device.

For a description of step S1210, refer to the description of step S810 in the foregoing embodiments, and details are not described herein again.

Step S1220. Determine whether component values in each direction among the component values in the plurality of directions deviate from the preset threshold range corresponding to a component value in at least one direction.

For example, if a component value in at least one direction among the component values in the plurality of directions deviates from the preset threshold range corresponding to the component value in the at least one direction, it is determined that the parameter related to the magnetic induction intensity deviates from the preset threshold range. If component values in each direction among the component values in the plurality of directions are in a preset threshold range corresponding to a component value in a corresponding direction, it is determined that the parameter related to the magnetic induction intensity is in the preset threshold range. In an example, the magnetic induction intensity obtained by the portable device by using the magnetic field sensor is $(M_X, M_Y, M_Z)$, a preset threshold range corresponding to a component value of the magnetic induction intensity in an X-axis is $[M_{Xmin}, M_{Xmax}]$, a preset threshold range corresponding to a component value of the magnetic induction intensity in a Y-axis is $[M_{Ymin}, M_{Ymax}]$, and a preset threshold range corresponding to a component value of the magnetic induction intensity in a Z-axis is $[M_{Zmin}, M_{Zmax}]$. In this case, if $M_{Xmin} \leq M_X \leq M_{Xmax}$, $M_{Ymin} \leq M_Y \leq M_{Ymax}$, and $M_{Zmin} \leq M_Z \leq M_{Zmax}$, it is determined that the parameter related to the magnetic induction intensity is in the preset threshold range. In this case, adsorption of the portable device on a magnetic holder is stable. If $M_X < M_{Xmin}$, $M_{Ymin} \leq M_Y \leq M_{Ymax}$, and $M_{Zmin} \leq M_Z \leq M_{Zmax}$; $M_X < M_{Xmin}$, $M_Y < M_{Ymin}$, and $M_Z < M_{Zmax}$; or the like, it is determined that the parameter related to the magnetic induction intensity deviates from the preset threshold range. In this case, adsorption of the portable device on the magnetic holder is unstable.

For example, the preset threshold range corresponding to component values in each direction among the component values in the plurality of directions may be set by the portable device based on a determined security zone. The security zone may be determined by a test, and for a description related to the test, refer to the related description in step S830, and details are not described herein again. After determining the security zone, the portable device may sample the magnetic induction intensity in the security zone by using the magnetic field sensor, and set, based on a sampling result, a threshold range corresponding to the component values in each direction.

Figure 13:
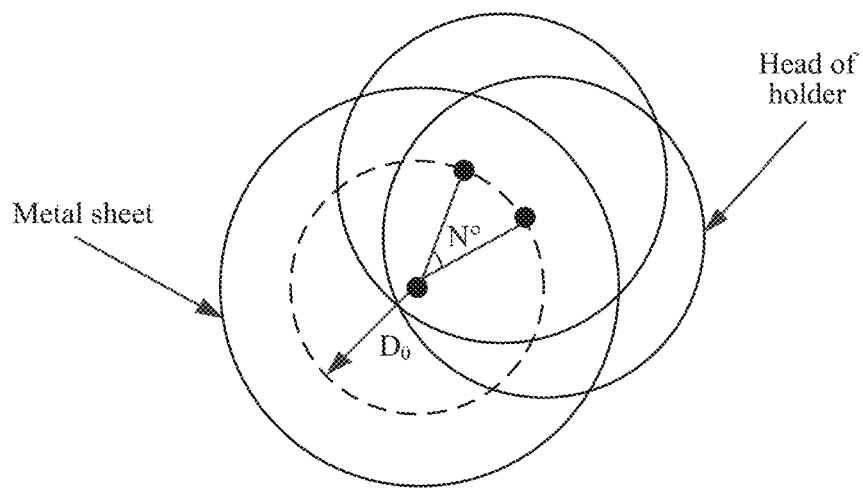
FIG. 13 is a schematic diagram of a sampling site of a magnetic induction intensity according to an embodiment of this application.

In an example, as shown in FIG. 13, a circular metal sheet is attached on the portable device, and a shape of a head of the holder is a circle. A security zone in which the portable device is adsorbed on the magnetic holder is a circular area in which a center of the metal sheet is a circle center and $D_0$ is a radius. In this case, the portable device is placed on the holder, and the magnetic induction intensity is sampled by using the magnetic field sensor of the portable device. In a sampling process, a plurality of collection points needs to be sampled. Therefore, a relative location of the portable device and the holder may be changed for a plurality of times. For example, the circle center of the head of the holder is moved for a cycle on a circumference in which the center of the metal sheet is the circle center and $D_0$ is the radius, and a moving interval is N°. To be specific, the circle center of the head of the holder is moved N° each time.

The magnetic induction intensity obtained by sampling may include component values in an X-axis, a Y-axis, and a Z-axis in a Cartesian coordinate system. Then the preset threshold range corresponding to the component values in each direction is set based on the component values that are in the plurality of directions and that are obtained through sampling. That the preset threshold range corresponding to the component values in each direction is set may specifically include: selecting a maximum value $M_{Xmax}$ and a minimum value $M_{Xmin}$ of the component values of the magnetic induction intensity in the X-axis, a maximum value $M_{Ymax}$ and a minimum value $M_{Ymin}$ of the component values of the magnetic induction intensity in the Y-axis, and a maximum value $M_{Zmax}$ and a minimum value $M_{Zmin}$ of the component values of the magnetic induction intensity in the Z-axis, from the magnetic induction intensity obtained through sampling. Correspondingly, a value range $[M_{Xmin}, M_{Xmax}]$ of the component values of the magnetic induction intensity in the X-axis, a value range $[M_{Ymin}, M_{Ymax}]$ of the component values of the magnetic induction intensity in the Y-axis, and a value range $[M_{Zmin}, M_{Zmax}]$ of the component values of the magnetic induction intensity in the Y-axis are obtained.

According to the another detection method provided in this application, the portable device obtains the component values of the magnetic induction intensity in the plurality of directions by using the magnetic field sensor, and determines whether component values in each direction among the component values of the magnetic induction intensity in the plurality of directions deviate from a preset threshold range corresponding to a corresponding component value, thereby determining stability of adsorption of the portable device on the magnetic holder.

Figure 14:
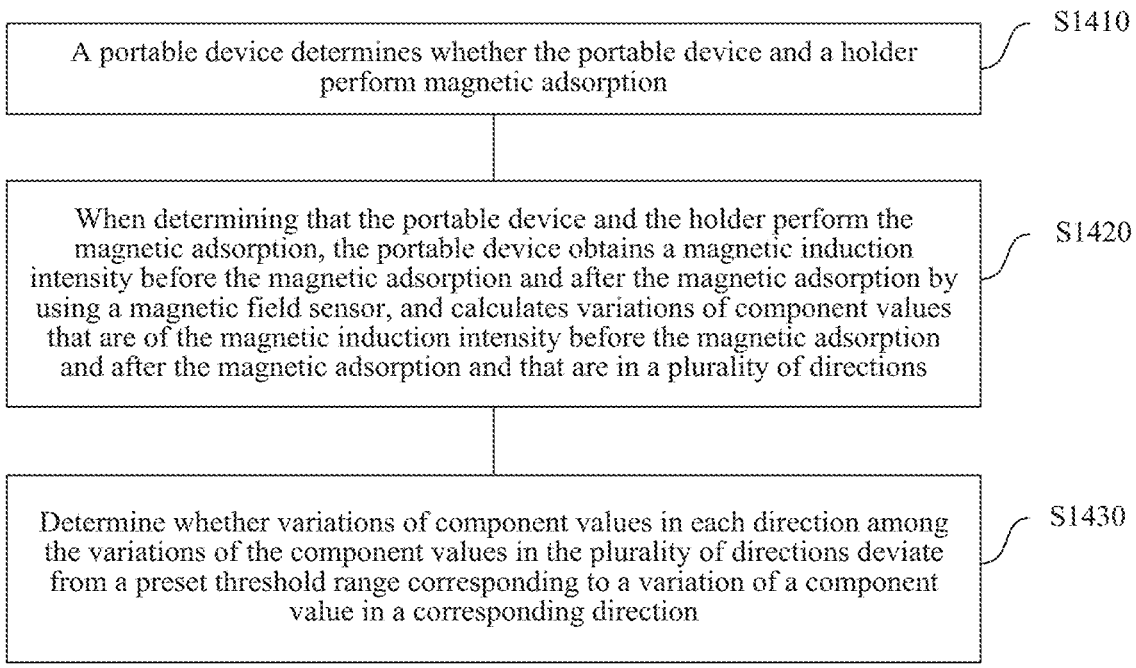
FIG. 14 is a flowchart of still another detection method according to an embodiment of this application.

FIG. 14 is a flowchart of still another detection method according to an embodiment of this application. In this embodiment of this application, a parameter related to a magnetic induction intensity includes variations of component values of the magnetic induction intensity in a plurality of directions, and variations of component values in each direction among the variations of the component values in the plurality of directions correspond to one preset threshold range. As shown in FIG. 14, the method includes the following steps.

Step S1410. A portable device determines whether the portable device and a holder perform magnetic adsorption.

For description of step S1410, refer to description of the predetermining step in the embodiments shown in FIG. 8, and details are not described herein again.

Step S1420. When determining that the portable device and the holder perform the magnetic adsorption, the portable device obtains a magnetic induction intensity before the magnetic adsorption and after the magnetic adsorption by using a magnetic field sensor of the portable device, and calculates variations of component values that are of the magnetic induction intensity before the magnetic adsorption and after the magnetic adsorption and that are in a plurality of directions.

For example, that the portable device calculates the variations of the component values that are of the magnetic induction intensity before the magnetic adsorption and after the magnetic adsorption and that are in the plurality of directions may include that the portable device calculates the component values that are a magnetic induction intensity before the magnetic adsorption and that are in a plurality of directions and variations of the component values that are of the magnetic induction intensity that keeps a stable state after the magnetic adsorption and that are in the plurality of directions.

Whether the magnetic induction intensity after the magnetic adsorption keeps the stable state may be determined by calculating a standard deviation of modulus of the magnetic induction intensity in a period of time. If the standard deviation of the modulus of the magnetic induction intensity in the period of time is greater than a preset value, it indicates that the magnetic induction intensity in the period of time is not stable enough. If the standard deviation of the magnetic induction intensity in the period of time is less than or equal to the preset value, it indicates that the magnetic induction intensity keeps a stable state in the period of time. An average value of component values that are of a magnetic induction intensity at a moment in the magnetic induction intensity in the period of time and that is in a plurality of directions or an average value of component values in each direction among the component values of the magnetic induction intensity in the plurality of directions in the period of time is selected, to obtain a variation between the average value and component values that are of the magnetic induction intensity before the magnetic adsorption and that are in the plurality of directions.

For example, after determining, at a moment t, that the portable device and the holder perform the magnetic adsorption, the portable device reads a magnetic induction intensity that is obtained by the magnetic field sensor and that is at a moment $t_1$ before the moment t, and a magnetic induction intensity at a time segment $\Delta t_2$ after the moment t. The time segment $\Delta t_2$ includes data at a plurality of moments, where the plurality of moments may include $t_2, t_3, t_4, \ldots, t_n$, where $n \geq 2$. A magnetic induction intensity at at least two consecutive moments are selected from the plurality of moments, and a standard deviation of a modulus of the selected magnetic induction intensity is calculated. For example, magnetic induction intensities at the moments $t_3, t_4, t_5,$ and $t_6$ are selected, and a standard deviation of a modulus of the magnetic induction intensity is calculated. If the standard deviation obtained through calculation is less than or equal to the preset value, it indicates that the magnetic induction intensity is stable in the period of time. An average value of component values that are of a magnetic induction intensity at any moment in the period of time and that are in a plurality of directions, or an average value of component values in each direction among the component values of the four magnetic induction intensities in the plurality of directions is selected, to obtain a variation between the average value and a component value that is of the magnetic induction intensity before the magnetic adsorption and that is in the plurality of directions.

Step S1430. The portable device determines, based on the variations of the component values in the plurality of directions, whether variations of the component values in each direction among the variations of the component values in the plurality of directions deviate from the threshold range corresponding to a variation of a component value in a corresponding direction.

For example, the magnetic induction intensity includes component values of magnetic induction intensity in an X-axis, a Y-axis, and a Z-axis in a Cartesian coordinate system, and a variation of the component values that are of the magnetic induction intensity before the magnetic adsorption and after the magnetic adsorption and that are in the plurality of directions is $(\Delta M_X, \Delta M_Y, \Delta M_Z)$. A preset threshold range corresponding to a variation of a component value of the magnetic induction intensity in the X-axis is $[\Delta M_{Xmin},$ $\Delta M_{Xmax}$], a preset threshold range corresponding to a variation of a component value of the magnetic induction intensity in the Y-axis is [$\Delta M_{Ymin}$, $\Delta M_{Ymax}$], and a preset threshold range corresponding to a variation of a value of the magnetic induction intensity in the Z-axis is LAM [$\Delta M_{Zmin}$, $\Delta M_{Zmax}$]. In this case, if a variation of the component values that are of the magnetic induction intensity before the magnetic adsorption and after the magnetic adsorption and that are in each direction is in the preset threshold range corresponding to the variations of the component values in at least one direction, to be specific, if $\Delta M_{Xmin} \leq \Delta M_X \leq \Delta M_{Xmax}$, $\Delta M_{Ymin} \leq \Delta M_Y \leq \Delta M_{Ymax}$, and $\Delta M_{Zmin} \leq \Delta M_Z \leq \Delta M_{Zmax}$, it is determined that adsorption of the portable device on the magnetic holder is stable. If a variation of a component value in at least one direction among the variations of the component values in the plurality of directions deviates from the preset threshold range corresponding to the variation of the component value in the at least one direction, to be specific, $\Delta M_X < \Delta M_{Xmin}$, $\Delta M_{Ymin} \leq \Delta M_Y \leq \Delta M_{Ymax}$, and $\Delta M_{Zmin} \leq \Delta M_Z \leq \Delta M_{Zmax}$, $\Delta M_X < \Delta M_{Xmin}$, $\Delta M_Y < \Delta M_{Ymin}$, and $\Delta M_Z < \Delta M_{Zmax}$, and the like, it is determined that the adsorption of the portable device on the magnetic holder is unstable.

For example, the preset threshold range corresponding to the variations of the component values of the magnetic induction intensity in each direction may be preset by the portable device based on a security zone. The security zone may be determined by a test, and for description related to the test, refer to the foregoing embodiments, and details are not described herein again. After determining the security zone, the portable device may sample the magnetic induction intensity in the security zone by using the magnetic field sensor, and set, based on a sampling result, a threshold range corresponding to the variations of the component values of the magnetic induction intensity in each direction.

In an example, as shown in FIG. 13, for a portable device on which a circular metal sheet is attached and a magnetic holder whose head of the holder is a circle, a security zone in which the portable device and the holder perform the magnetic adsorption is a circular area in which a center of the metal sheet is a circle center and $D_0$ is the radius. In this case, the portable device is placed on the holder, and the magnetic induction intensity is sampled by using the magnetic field sensor of the portable device. A specific placing manner may be moving the circle center of the head of the holder for a cycle, that is, 360° on a circumference in which the center of the metal sheet is the circle center and $D_0$ is the radius. A moving manner may be that N° (for example, 5° or 10°) is an interval, to be specific, the circle center of the head of the holder is moved N° each time. At the same time, the magnetic induction intensity before the portable device and the holder perform the magnetic adsorption and after the portable device and the holder perform the magnetic adsorption is sampled.

The magnetic induction intensity obtained by sampling may include component values in an X-axis, a Y-axis, and a Z-axis in a Cartesian coordinate system. Then the preset threshold range corresponding to the variations of the component values in each direction is set based on the variations of the component values that are in the plurality of directions and that are obtained through sampling. That the preset threshold range corresponding to the variations of the component values in each direction is set may specifically include separately calculating the variations of the component values of the magnetic induction intensity in the X-axis, the Y-axis, and the Z-axis, in the magnetic induction intensity. A maximum value $\Delta M_{Xmax}$ and a minimum value $\Delta M_{Xmin}$ of the variations of the component values of the magnetic induction intensity in the X-axis, a maximum value $\Delta M_{Ymax}$ and a minimum value $\Delta M_{Ymin}$ of the variations of the component values of the magnetic induction intensity in the Y-axis, and a maximum value $\Delta M_{Zmax}$ and a minimum value $\Delta M_{Zmin}$ of the variations of the component values of the magnetic induction intensity in the Z-axis are selected from the variations obtained through calculation. Correspondingly, a value range [$\Delta M_{Xmin}$, $\Delta M_{Xmax}$] of the variations of the component values of the magnetic induction intensity in the X-axis, a value range [$\Delta M_{Ymin}$, $\Delta M_{Ymax}$] of the variations of the component values of the magnetic induction intensity in the Y-axis, and a value range [$\Delta M_{Zmin}$, $\Delta M_{Zmax}$] of the variations of the component values of the magnetic induction intensity in the Y-axis are obtained.

According to the detection method provided in this application, the portable device obtains the variations of the component values of the magnetic induction intensity in the plurality of directions by using the magnetic field sensor, and determines whether the variations of the component values of the magnetic induction intensity in the plurality of directions deviates from a preset threshold range corresponding to the variations of the component values, thereby determining stability of adsorption of the portable device on the magnetic holder.

Figure 15:
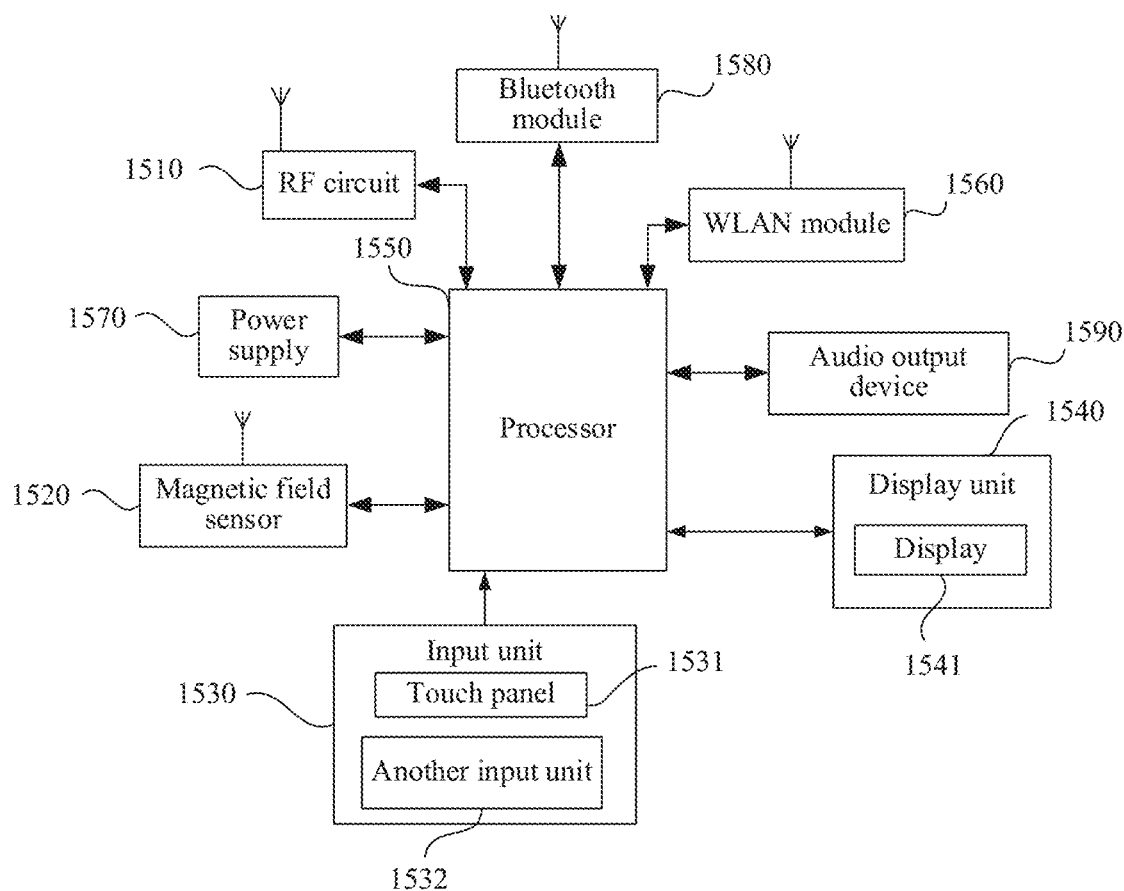
FIG. 15 is a schematic structural diagram of a portable device according to an embodiment of this application.

FIG. 15 is a schematic structural diagram of a portable device according to an embodiment of this application. As shown in FIG. 15, the portable device includes components such as a radio frequency (Radio Frequency, RF) circuit 1510, a magnetic field sensor 1520, an input unit 1530, a display unit 1540, a processor 1550, a wireless local area network (Wireless Local Area Networks, WLAN) module 1560, a power supply 1570, a Bluetooth module 1580, and an audio output unit 1590. A person skilled in the art may understand that a structure of the portable device shown in FIG. 15 does not constitute any limitation to the portable device, and may include more or fewer components than those shown in the figure, or some components may be combined, or a different component deployment may be used.

The RF circuit 1510 may be configured to send and receive information, for example, connect to a mobile broadband. Usually, the RF circuit 1510 includes but is not limited to an antenna, at least one amplifier, a transceiver, a coupler, a low noise amplifier (Low Noise Amplifier, LNA), a duplexes, and the like. In addition, the RF circuit 1510 may further forward a mobile bandwidth service to the WLAN module 1560, so that the mobile bandwidth service is forwarded to another portable device through the WLAN module 1560. Wireless communication may use any communications standard or protocol, including but not limited to: global system for mobile communications (Global System of Mobile communication, GSM), general packet radio service (General Packet Radio Service, GPRS), code division multiple access (Code Division Multiple Access, CDMA), wideband code division multiple access (Wideband Code Division Multiple Access, WCDMA), long term evolution (Long Term Evolution, LTE), a 5G communications system, an email, a short messaging service (Short Messaging Service, SMS), and the like.

The magnetic field sensor 1520 may include a magnetic sensitive element and a signal processing circuit, where the magnetic sensitive element is configured to sense a magnetic induction intensity, and the signal processing circuit is configured to convert the sensed magnetic induction intensity into a digital signal.

The input unit 1530 may be configured to receive digital or character information input by a user, where the digital or character information includes an instruction of turning on a WLAN hotspot, an instruction of selecting a portable device sharing the WLAN hotspot, and the like. Specifically, the input unit 1530 may include a touch panel 1531 and another input device 1532. The touch panel 1531, also referred to as a touchscreen, may collect a touch operation of a user on or near the touch panel 1531 (such as an operation of the user on the touch panel 1531 or near the touch panel 1531 by using any suitable object or accessory such as a finger or a stylus), and drive a corresponding connection apparatus based on a preset program. Optionally, the touch panel 631 may include two parts: a touch detection apparatus and a touch controller. The touch detection apparatus detects a touch location of the user, detects a signal generated by the touch operation, and transfers the signal to the touch controller. The touch controller receives touch information from the touch detection apparatus, converts the touch information into touch point coordinates, and then sends the touch point coordinates to the processor 1550. Moreover, the touch controller can receive and execute a command sent by the processor 1550. In addition, the input unit 1530 may implement the touch panel 1531 by using various types, such as a resistive type, a capacitance type, an infrared type, and a surface sound wave type. In addition to the touch panel 1531, the input unit 1530 may further include the another input device 1532. Specifically, the another input device 1532 may include but is not limited to one or more of a physical keyboard, a functional key (such as a volume control key or a switch key), a trackball, a mouse, and a joystick.

The display unit 1540 may be configured to display information input by the user or information provided for the user, and various menus of the portable device. The display unit 1540 may include a display 1541. Optionally, the display 1541 may be configured by using a form such as a liquid crystal display (Liquid Crystal Display, LCD) or an organic light-emitting diode (Organic Light-Emitting Diode, OLED). Further, the touch panel 1531 may cover the display 1541. After detecting a touch operation on or near the touch panel 1531, the touch panel 1531 transfers the touch operation to the processor 1550, to determine a type of the touch event. Then, the processor 1550 provides a corresponding visual output on the display 1541 based on the type of the touch event. Although in FIG. 15, the touch panel 1531 and the display 1541 are used as two separate parts to implement input and output functions of the portable device, in some embodiments, the touch panel 1531 and the display 1541 may be integrated to implement the input and output functions of the portable device.

The processor 1550 may integrate an application processor and a modem processor. The application processor mainly processes an operating system, a user interface, an application program, and the like. The modem processor mainly processes wireless communication. It may be understood that the foregoing modem processor may alternatively not be integrated into the processor 1550.

The WLAN module 1560 may be configured to help the user to receive and send an e-mail, browse a webpage, access streaming media, and the like. The WLAN module 1560 provides wireless broadband WLAN Internet access to the user. The WLAN belongs to a short distance radio transmission technology. The portable device may access the WLAN hotspot by using the WLAN module 1560, and may also turn the WLAN hotspot on by using the WLAN module 1560, and forward the mobile bandwidth service to the another portable device. The WLAN module 1560 may further broadcast or scan Wi-Fi, to implement wireless communication with the another portable device nearby.

The portable device further includes the power supply 1570 (such as a battery) for supplying power to various components. Optionally, the power supply may be logically connected to the processor 1550 by using a power management system, thereby implementing functions such as management of charging, discharging, and power consumption by using the power management system.

The Bluetooth module 1570 may be a Bluetooth low energy (Bluetooth Low Energy, BLE) device, a traditional Bluetooth device, or a dual band Bluetooth device supporting the traditional Bluetooth and the BLE. The Bluetooth module 1570 establishes a BLE connection or a traditional Bluetooth connection with a Bluetooth module of the another portable device. The Bluetooth module 1570 may further broadcast or scan the BR or the BLE, to implement wireless communication with the another portable device nearby.

The audio output unit 1590 may be a speaker, a receiver, an external headset, or the like, and is configured to output audio.

Although not shown, the portable device may further include a camera, a memory, and the like, and details are not described herein again.

For example, the magnetic field sensor 1520 includes a magnetic sensitive element and a signal processing circuit, where the magnetic sensitive element is configured to sense a magnetic induction intensity that is near the portable device and that is generated by a magnetic holder, and the signal processing circuit is configured to convert the sensed magnetic induction intensity into a digital signal.

The processor 1550 is configured to: control the display to be off, determine, based on the digital signal, a parameter related to the magnetic induction intensity, when detecting that the parameter related to the magnetic induction intensity deviates from a preset threshold range, lighten the display of the portable device when, before, or after outputting a voice prompt by using the audio output unit 1590, and display, on the display, prompt information about moving the portable device.

For example, the parameter related to the magnetic induction intensity includes an adsorption site, and the preset threshold range includes a boundary range of a security zone; and that the processor 1550 is configured to detect that the parameter related to the magnetic induction intensity deviates from the preset threshold range includes:

obtaining, by using the magnetic field sensor 1520, the magnetic induction intensity generated by the magnetic holder, and determining the adsorption site based on the magnetic induction intensity; and determining that the adsorption site deviates from the boundary range of the security zone.

For example, the parameter related to the magnetic induction intensity includes component values of the magnetic induction intensity in a plurality of directions, and component values in each direction among the component values in the plurality of directions correspond to one preset threshold range; and that the processor 1550 is configured to detect that the parameter related to the magnetic induction intensity deviates from the preset threshold range includes:

obtaining the component values of the magnetic induction intensity in the plurality of directions by using the magnetic field sensor 1520; determining that a component value in at least one direction among the component values in the plurality of directions deviates from the preset threshold range corresponding to the component value in the at least one direction.

For example, the parameter related to the magnetic induction intensity includes variations of component values of the magnetic induction intensity in a plurality of directions, and variations of component values in each direction among the variations of the component values in the plurality of directions correspond to one preset threshold range; and that the processor 1550 is configured to detect that the parameter related to the magnetic induction intensity deviates from the preset threshold range includes:

obtaining the variations of the component values of the magnetic induction intensity in the plurality of directions by using the magnetic field sensor 1520; determining that a variation of a component value in at least one direction among the variations of the component values in the plurality of directions deviates from the preset threshold range corresponding to the variation of the component value in the at least one direction.

For example, that the processor 1550 displays the prompt information about moving the portable device, on the display includes: displaying, by the processor 1550, a security zone and a current adsorption site of the portable device on the display; displaying, by the processor 1550, a text indicating a moving direction or a graph representation indicating a moving direction, on the display; or displaying, by the processor 1550 on the display, a text indicating a moving direction or a graph representation indicating a moving direction, the security zone, and a current adsorption site of the portable device.

For example, the processor 1550 is further configured to: turn the display off when the processor 1550 detects that the parameter related to the magnetic induction intensity is in the preset threshold range and after outputs the prompt information by using at least one of the audio output unit 1590 and the display; or turn the display off when the processor 1550 detects that the parameter related to the magnetic induction intensity is in the preset threshold range.

For example, when the processor 1550 outputs the prompt information by using at least one of the audio output unit 1590 and the display, the portable device is in a locked state; or when the processor 1550 outputs the prompt information by using at least one of the audio output unit 1590 and the display, the portable device is in an unlocked state.

Figure 16:
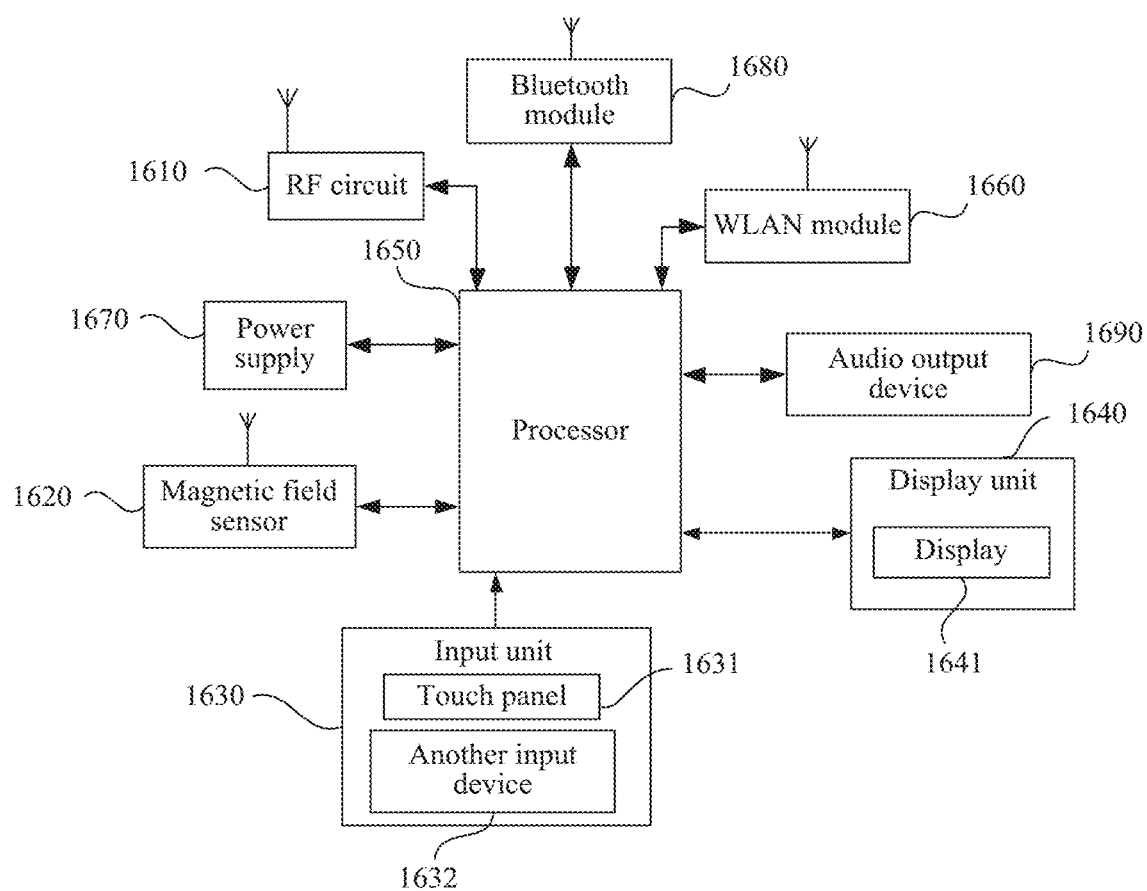
FIG. 16 is a schematic structural diagram of another portable device according to an embodiment of this application.

FIG. 16 is a schematic structural diagram of a portable device according to an embodiment of this application. As shown in FIG. 16, the portable device includes components such as a radio frequency (Radio Frequency, RF) circuit 1610, a magnetic field sensor 1620, an input unit 1630, a display unit 1640, a processor 1650, a wireless local area network (Wireless Local Area Networks, WLAN) module 1660, a power supply 1670, a Bluetooth module 1680, and an audio output unit 1690. A person skilled in the art may understand that a structure of the portable device shown in FIG. 16 does not constitute any limitation to the portable device, and may include more or fewer components than those shown in the figure, or some components may be combined, or a different component deployment may be used.

The RF circuit 1610 may be configured to send and receive information, for example, connect to a mobile broadband. Usually, the RE circuit 1610 includes but is not limited to an antenna, at least one amplifier, a transceiver, a coupler, a low noise amplifier (Low Noise Amplifier, LNA), a duplexes, and the like. In addition, the RF circuit 1610 may further forward a mobile bandwidth service to the WLAN module 1660, so that the mobile bandwidth service is forwarded to another portable device through the WLAN module 1660. Wireless communication may use any communications standard or protocol, including but not limited to: global system for mobile communications (Global System of Mobile communication, GSM), general packet radio service (General Packet Radio Service, GPRS), code division multiple access (Code Division Multiple Access, CDMA), wideband code division multiple access (Wideband Code Division Multiple Access, WCDMA), long term evolution (Long Term Evolution, LIE), 5G communications system, email, short messaging service (Short Messaging Service, SMS), and the like.

The magnetic field sensor 1620 may include a magnetic sensitive element and a signal processing circuit, where the magnetic sensitive element is configured to sense a magnetic induction intensity, and the signal processing circuit is configured to convert the sensed magnetic induction intensity into a digital signal.

The input unit 1630 may be configured to receive digital or character information input by a user, where the digital or character information includes an instruction of turning on a WLAN hotspot, an instruction of selecting a portable device sharing the WLAN hotspot, and the like. Specifically, the input unit 1630 may include a touch panel 1631 and another input device 1632. The touch panel 1631, also referred to as a touchscreen, may collect a touch operation of a user on or near the touch panel 1631 (such as an operation of the user on the touch panel 1631 or near the touch panel 1631 by using any suitable object or accessory such as a finger or a stylus), and drive a corresponding connection apparatus based on a preset program. Optionally, the touch panel 631 may include two parts: a touch detection apparatus and a touch controller. The touch detection apparatus detects a touch location of the user, detects a signal generated by the touch operation, and transfers the signal to the touch controller. The touch controller receives touch information from the touch detection apparatus, converts the touch information into touch point coordinates, and then sends the touch point coordinates to the processor 1650. Moreover, the touch controller can receive and execute a command sent by the processor 1650. In addition, the input unit 1630 may implement the touch panel 1631 by using various types, such as a resistive type, a capacitance type, an infrared type, and a surface sound wave type. In addition to the touch panel 1631, the input unit 1630 may further include the another input device 1632. Specifically, the another input device 1632 may include but is not limited to one or more of a physical keyboard, a functional key (such as a volume control key or a switch key), a trackball, a mouse, and a joystick.

The display unit 1640 may be configured to display information input by the user or information provided for the user, and various menus of the portable device. The display unit 1640 may include a display 1641. Optionally, the display 1641 may be configured by using a form such as a liquid crystal display (Liquid Crystal Display, LCD) or an organic light-emitting diode (Organic Light-Emitting Diode, OLED). Further, the touch panel 1631 may cover the display 1641. After detecting a touch operation on or near the touch panel 1631, the touch panel 1631 transfers the touch operation to the processor 1650, to determine a type of the touch event. Then, the processor 1650 provides a corresponding visual output on the display 1641 based on the type of the touch event. Although in FIG. 16, the touch panel 1631 and the display 1641 are used as two separate parts to implement input and output functions of the portable device, in some embodiments, the touch panel 1631 and the display 1641 may be integrated to implement the input and output functions of the portable device.

The processor 1650 may integrate an application processor and a modem processor. The application processor mainly processes an operating system, a user interface, an application program, and the like. The modem processor mainly processes wireless communication. It may be understood that the foregoing modem processor may alternatively not be integrated into the processor 1650.

The WLAN module 1660 may be configured to help the user to receive and send an e-mail, browse a webpage, access streaming media, and the like. The WLAN module 1560 provides wireless broadband WLAN Internet access to the user. The WLAN belongs to a short distance radio transmission technology. The portable device may access the WLAN hotspot by using the WLAN module 1660, and may also turn the WLAN hotspot on by using the WLAN module 1660, and forward the mobile bandwidth service to the another portable device. The WLAN module 1660 may further broadcast or scan Wi-Fi, to implement wireless communication with the another portable device nearby.

The portable device further includes the power supply 1670 (such as a battery) for supplying power to various components. Optionally, the power supply may be logically connected to the processor 1650 by using a power management system, thereby implementing functions such as management of charging, discharging, and power consumption by using the power management system.

The Bluetooth module 1670 may be a Bluetooth low energy (Bluetooth Low Energy, BLE) device, a traditional Bluetooth device, or a dual band Bluetooth device supporting the traditional Bluetooth and the BLE, The Bluetooth module 1670 establishes a BLE connection or a traditional Bluetooth connection with a Bluetooth module of the another portable device. The Bluetooth module 1670 may further broadcast or scan the BR or the BLE, to implement wireless communication with the another portable device nearby.

The audio output unit 1690 may be a speaker, a receiver, an external headset, or the like, and is configured to output audio.

Although not shown, the portable device may further include a camera, a memory, and the like, and details are not described herein again.

For example, the magnetic field sensor 1620 includes a magnetic sensitive element and a signal processing circuit, where the magnetic sensitive element is configured to sense a magnetic induction intensity that is near the portable device and that is generated by a magnetic holder, and the signal processing circuit is configured to convert the sensed magnetic induction intensity into a digital signal.

The processor 1650 is configured to: display an interaction interface of the portable device on the display, where the interaction interface includes an unlock interface, a standby screen, a lock screen, a non-home screen, a home screen, or an application interface, determine, based on the digital signal, a parameter related to the magnetic induction intensity, when detecting that the parameter related to the magnetic induction intensity deviates from a preset threshold range, skip displaying the interaction interface of the portable device on the display when, before, or after outputting a voice prompt by using the audio output unit 1690, and display, on the display, prompt information about moving the portable device.

For example, the parameter related to the magnetic induction intensity includes an adsorption site, and the preset threshold range includes a boundary range of a security zone; and that the processor 1650 is configured to detect that the parameter related to the magnetic induction intensity deviates from the preset threshold range includes:

obtaining, by using the magnetic field sensor 1620, the magnetic induction intensity generated by the magnetic holder, and determining the adsorption site based on the magnetic induction intensity; and determining that the adsorption site deviates from the boundary range of the security zone.

For example, the parameter related to the magnetic induction intensity includes component values of the magnetic induction intensity in a plurality of directions, and component values in each direction among the component values in the plurality of directions correspond to one preset threshold range; and that the processor 1650 is configured to detect that the parameter related to the magnetic induction intensity deviates front the preset threshold range includes:

obtaining, by using the magnetic field sensor 1620, the component values of the magnetic induction intensity in the plurality of directions; and determining that a component value in at least one direction among the component values in the plurality of directions deviates from the preset threshold range corresponding to the component value in the at least one direction.

For example, the parameter related to the magnetic induction intensity includes variations of component values of the magnetic induction intensity in a plurality of directions, and variations of component values in each direction among the variations of the component values in the plurality of directions correspond to one preset threshold range; and that the processor 1650 is configured to detect that the parameter related to the magnetic induction intensity deviates from the preset threshold range includes:

obtaining, by using the magnetic field sensor 1620, the variations of the component values of the magnetic induction intensity in the plurality of directions; and determining that a variation of a component value in at least one direction among the component values in the plurality of directions deviates from the preset threshold range corresponding to the variation of the component value in the at least one direction.

For example, that the processor 1650 displays the prompt information about moving the portable device, on the display includes:

displaying, by the processor 1650, the security zone and a current adsorption site of the portable device on the display;

displaying, by the processor 1650, a text indicating a moving direction or a graph representation indicating a moving direction, on the display; or displaying, by the processor 1650 on the display, a text indicating a moving direction or a graph representation indicating a moving direction, the security zone, and a current adsorption site of the portable device.

For example, the processor 1650 is further configured to:

display the interaction interface of the portable device when the processor 1650 detects that the parameter related to the magnetic induction intensity is in the preset threshold range and after outputting the prompt information by using at least one of the audio output unit 1690 and the display; or display the interaction interface of the portable device when the processor 1650 detects that the parameter related to the magnetic induction intensity is in the preset threshold range.

For example, when the processor 1650 outputs the prompt information by using at least one of the audio output unit 1690 and the display, the portable device is in a locked state; or when the processor 1650 outputs the prompt information by using at least one of the audio output unit 1690 and the display, the portable device is in an unlocked state.

An embodiment of this application provides a portable device. The device exists in a form of a chip product a structure of the device includes a processor and a memory, the memory is configured to couple to the processor and store a program instruction and data of the device, and the processor is configured to implement the program instruction stored in the memory, so that the device implements a data processing function in the prompt method shown in FIG. 2.

An embodiment of this application provides another portable device. The device exists in a form of a chip product, a structure of the device includes a processor and a memory, the memory is configured to couple to the processor and store a program instruction and data of the device, and the processor is configured to implement the program instruction stored in the memory, so that the device implements a data processing function in the prompt method shown in FIG. 5.

An embodiment of this application provides a computer-readable storage medium. The storage medium includes an instruction, where when the instruction is run on a portable device, the portable device is enabled to perform the prompt method shown in FIG. 2.

An embodiment of this application provides another computer-readable storage medium. The storage medium includes an instruction, where when the instruction is run on a portable device, the portable device is enabled to perform the prompt method shown in FIG. 5.

An embodiment of this application provides a computer program product, including an instruction, where when the instruction is run on a portable device, the portable device is enabled to perform the prompt method shown in FIG. 2.

An embodiment of this application provides another computer program product, including an instruction, where when the instruction is run on a portable device, the portable device is enabled to perform the prompt method shown in FIG. 5.

An embodiment of this application provides a graphical user interface on a portable device. The portable device includes a display, a memory, a plurality of application programs; and one or more processors configured to execute one or more programs stored in the memory, and the graphical user interface includes a user interface displayed in the method that is shown in FIG. 2 and that is according to the claims.

An embodiment of this application provides a graphical user interface on a portable device. The portable device includes a display, a memory, a plurality of application programs; and one or more processors configured to execute one or more programs stored in the memory, and the graphical user interface includes a user interface displayed in the method that is shown in FIG. 5 and that is according to the claims.

Steps of methods or algorithms described in the embodiments disclosed in this specification may be implemented by hardware, a software module executed by a processor, or a combination thereof. The software module may be configured in a random access memory (RAM), a memory, a read-only memory (ROM), an electrically programmable ROM, an electrically erasable programmable ROM, a register, a hard disk, a removable disk, a CD-ROM, or a storage medium in any other forms well-known in the art.

In the foregoing specific implementations, the objective, technical solutions, and beneficial effects of this application are further described in detail. It should be understood that the foregoing descriptions are merely specific implementations of this application, but are not intended to limit the protection scope of this application. Any modification, equivalent replacement, or improvement made within the spirit and principle of this application shall fall within the protection scope of this application.

What is claimed is:

1. A prompt method implemented by a portable device adsorbed on a magnetic holder, comprising:
   controlling a display of the portable device to be in an off state;
   detecting that a parameter related to a magnetic induction intensity indicative of adsorption between the portable device and the magnetic holder deviates from a preset threshold range;
   activating the display of the portable device and outputting a voice prompt; and
   displaying, on the display, prompt information for moving the portable device.

2. The prompt method of claim 1, wherein the parameter comprises an adsorption site, wherein the preset threshold range comprises a boundary range of a security zone, and wherein the prompt method further comprises:
   obtaining the magnetic induction intensity using a magnetic field sensor of the portable device;
   determining the adsorption site based on the magnetic induction intensity; and
   determining that the adsorption site deviates from the boundary range of the security zone.

3. The prompt method of claim 1, wherein the parameter comprises component values of the magnetic induction intensity in a plurality of directions, wherein each of the component values corresponds to one preset threshold range, and wherein the prompt method further comprises:
   obtaining the component values using a magnetic field sensor of the portable device; and
   determining that a component value in a direction among the component values deviates from a preset threshold range corresponding to the component value in the direction.

4. The prompt method of claim 1, wherein the parameter comprises variations of component values of the magnetic induction intensity in a plurality of directions, wherein each of the variations of component values corresponds to one preset threshold range, and wherein the prompt method further comprises:
   obtaining the variations of the component values using a magnetic field sensor of the portable device; and
   determining that a variation of a component value in a direction among the variations of the component values deviates from a preset threshold range corresponding to the variation of the component value in the direction.

5. The prompt method of claim 1, further comprising:
   displaying a security zone and a current adsorption site of the portable device on the display;
   displaying a text or a graph representation indicating a moving direction on the display; or
   displaying, on the display, the text indicating the moving direction or a second graph representation indicating the moving direction, the security zone, and the current adsorption site of the portable device.

6. The prompt method of claim 5, further comprising:
turning off the display when the parameter is in the preset threshold range and after outputting prompt information; or
turning off the display when the parameter is in the preset threshold range.

7. A portable device, comprising:
a display;
an audio output apparatus;
a magnetic field sensor comprising:
   a magnetic sensitive element configured to sense a magnetic induction intensity proximate to the portable device from a magnetic holder; and
   a signal processing circuit coupled to the magnetic sensitive element and configured to convert the magnetic induction intensity into a digital signal;
a processor coupled to the display, the audio output apparatus, and the magnetic field sensor, wherein the processor is configured to:
   control the display to be in an off state;
   determine, based on the digital signal, a parameter related to the magnetic induction intensity indicative of adsorption between the portable device and the magnetic holder;
   detect that the parameter related to the magnetic induction intensity deviates from a preset threshold range;
   activate the display of the portable device and output a voice prompt using the audio output apparatus; and
   display, on the display, prompt information for moving the portable device.

8. The portable device of claim 7, wherein the parameter comprises an adsorption site, wherein the preset threshold range comprises a boundary range of a security zone, and wherein the processor is further configured to:
   obtain, using the magnetic field sensor, the magnetic induction intensity from the magnetic holder;
   determine the adsorption site based on the magnetic induction intensity; and
   determine that the adsorption site deviates from the boundary range of the security zone.

9. The portable device of claim 7, wherein the parameter comprises component values of the magnetic induction intensity in a plurality of directions, wherein each of the component values corresponds to one preset threshold range, and wherein the processor is further configured to:
   obtain, using the magnetic field sensor, the component values; and
   determine that a component value in a direction among the component values deviates from a preset threshold range.

10. The portable device of claim 7, wherein the parameter comprises variations of component values of the magnetic induction intensity in a plurality of directions, wherein each of the variations of component values corresponds to one preset threshold range, and wherein the processor is further configured to:
   obtain, using the magnetic field sensor, the variations of the component values; and
   determine that a variation of a component value in a direction among the variations of the component values deviates from a preset threshold range.

11. The portable device of claim 7, wherein the processor is further configured to:
   display, on the display, a security zone and a current adsorption site of the portable device;
   display, on the display, a text indicating a moving direction or a graph representation indicating a moving direction; or
   display, on the display, a text indicating the moving direction or a graph representation indicating a moving direction, the security zone, and a current adsorption site of the portable device.

12. The portable device of claim 11, wherein the processor is further configured to:
   turn off the display after detecting that the parameter is in the preset threshold range and after outputting prompt information; or
   turn off the display when detecting that the parameter is in the preset threshold range.

13. The portable device of claim 12, wherein the processor is further configured to output the prompt information using at least one of the audio output apparatus or the display, and wherein the portable device is in a locked state.

14. A portable device, comprising:
a display;
an audio output apparatus;
a magnetic field sensor comprising:
   a magnetic sensitive element configured to sense a magnetic induction intensity proximate to the portable device and of a magnetic holder; and
   a signal processing circuit coupled to the magnetic sensitive element and configured to convert the magnetic induction intensity into a digital signal;
a processor coupled to the display, the audio output apparatus, and the magnetic field sensor, wherein the processor is configured to:
   display an interaction interface of the portable device on the display, wherein the interaction interface comprises an unlock interface, a home screen, a standby screen, a lock screen, a non-home screen, or an application interface;
   determine, based on the digital signal, a parameter related to the magnetic induction intensity indicative of adsorption between the portable device and the magnetic holder;
   detect that the parameter related to the magnetic induction intensity deviates from a preset threshold range;
   skip displaying, in response to the detecting, the interaction interface of the portable device on the display and output a voice prompt using the audio output apparatus; and
   display, on the display, prompt information about moving the portable device.

15. The portable device of claim 14, wherein the parameter comprises an adsorption site, wherein the preset threshold range comprises a boundary range of a security zone, and wherein the processor is further configured to:
   obtain, using the magnetic field sensor, the magnetic induction intensity from the magnetic holder;
   determine the adsorption site based on the magnetic induction intensity; and
   determine that the adsorption site deviates from the boundary range of the security zone.

16. The portable device of claim 14, wherein the parameter comprises component values of the magnetic induction intensity in a plurality of directions, wherein each of the component values corresponds to one preset threshold range, and wherein the processor is further configured to:
   obtain, using the magnetic field sensor, the component values; and determine that a component value in a direction among the component values deviates from a preset threshold range corresponding to the component value in the direction.

17. The portable device of claim 14, wherein the parameter comprises variations of component values of the magnetic induction intensity in a plurality of directions, wherein each of the variations of component values corresponds to one preset threshold range, and wherein the processor is further configured to:
  obtain, using the magnetic field sensor, the variations of the component values of the magnetic induction intensity in the plurality of directions; and
  determine that a variation of a component value in a direction among the component values deviates from a preset threshold range corresponding to the variation of the component value in the direction.

18. The portable device of claim 14, wherein the processor is further configured to:
  display a security zone and a current adsorption site of the portable device on the display;
  display, on the display, a text or a graph representation indicating a moving direction; or
  display, on the display, a text indicating a moving direction or a graph representation indicating a moving direction, the security zone, and a current adsorption site of the portable device.

19. The portable device of claim 18, wherein the processor is further configured to:
  display the interaction interface of the portable device after detecting that the parameter is in the preset threshold range and after outputting prompt information using at least one of the audio output apparatus or the display; or
  display the interaction interface of the portable device when detecting that the parameter is in the preset threshold range.

20. The portable device of claim 19, wherein the processor is further configured to output the prompt information using at least one of the audio output apparatus or the display, and wherein the portable device is in a locked state.

* * * * *